(12) United States Patent
Stannard et al.

(10) Patent No.: US 8,620,286 B2
(45) Date of Patent: Dec. 31, 2013

(54) METHOD AND SYSTEM FOR PROMOTING AND TRANSFERRING LICENSED CONTENT AND APPLICATIONS

(75) Inventors: Liam Stannard, San Jose, CA (US);
Brandon Huff, Bonny Doon, CA (US);
Jason Burns, Roseville, CA (US);
Bryan Taketa, San Jose, CA (US);
Richard Onyon, Jr., San Jose, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 586 days.

(21) Appl. No.: 12/286,040

(22) Filed: Sep. 26, 2008

(65) Prior Publication Data

US 2009/0106110 A1 Apr. 23, 2009

Related U.S. Application Data

(63) Continuation-in-part of application No. 12/011,399, filed on Jan. 25, 2008, and application No. 12/286,040, which is a continuation-in-part of application No. 12/151,440, filed on May 6, 2008, now Pat. No. 7,643,824, which is a continuation of application No. 10/789,816, filed on Feb. 27, 2004, now Pat. No. 7,505,762.

(60) Provisional application No. 60/995,789, filed on Sep. 28, 2007, provisional application No. 60/897,789, filed on Jan. 26, 2007, provisional application No. 60/937,314, filed on Jun. 26, 2007.

(51) Int. Cl.
*H04M 3/42* (2006.01)

(52) U.S. Cl.
USPC .................. 455/414.2; 705/14.49; 705/14.67

(58) Field of Classification Search
USPC ........... 455/414.1, 414.2, 418–419, 410–411; 705/14.49, 14.67, 1.1
See application file for complete search history.

(56) References Cited

U.S. PATENT DOCUMENTS

| | | | |
|---|---|---|---|
| 4,887,212 A | 12/1989 | Zamora et al. | 364/419 |
| 5,111,398 A | 5/1992 | Nunberg et al. | 364/419 |

(Continued)

FOREIGN PATENT DOCUMENTS

| | | | | |
|---|---|---|---|---|
| CH | 2003-122958 | 7/2006 | ............... | H04Q 7/38 |
| CN | 1202662 | 12/1998 | ............. | G06F 17/30 |

(Continued)

OTHER PUBLICATIONS

Anonymous: "Download filter for MMS", Research Disclosure, Mason Publications, Hampshire, GB, vol. 457, No. 28, May 1, 2002, XP007130322, ISSN: 0374-4353.

(Continued)

*Primary Examiner* — San Htun
*Assistant Examiner* — Nathan Taylor
(74) *Attorney, Agent, or Firm* — Haverstock & Owens LLP

(57) ABSTRACT

In accordance with the invention, digital content is able to be better promoted on mobile phones and other electronic devices. The digital content and/or references to the digital content are stored on a server device which is accessible by the mobile phones or electronic devices. In operation, a user of a mobile device acquires digital content. When the user obtains a second mobile device, to facilitate and promote the same or similar digital content on the second mobile device, the digital content or references stored on a server device are able to be used to present the possibility of acquisition of the digital content for the second mobile device.

28 Claims, 38 Drawing Sheets

(56) References Cited

U.S. PATENT DOCUMENTS

| | | | | |
|---|---|---|---|---|
| 5,115,466 | A | 5/1992 | Presttun | |
| 5,130,993 | A | 7/1992 | Gutman et al. | 371/42 |
| 5,146,221 | A | 9/1992 | Whiting et al. | 341/67 |
| 5,204,902 | A | 4/1993 | Reeds et al. | |
| 5,329,619 | A | 7/1994 | Page et al. | 395/200 |
| 5,392,390 | A | 2/1995 | Crozier | 395/161 |
| 5,418,854 | A | 5/1995 | Kaufman et al. | 713/156 |
| 5,418,908 | A | 5/1995 | Keller et al. | 395/200 |
| 5,425,079 | A | 6/1995 | Noda et al. | |
| 5,483,352 | A | 1/1996 | Fukuyama | 358/402 |
| 5,485,161 | A | 1/1996 | Vaughn | 342/357.13 |
| 5,509,070 | A * | 4/1996 | Schull | 705/54 |
| 5,519,433 | A | 5/1996 | Lappington et al. | 725/110 |
| 5,519,606 | A | 5/1996 | Frid-Nielsen et al. | 364/401 |
| 5,543,789 | A | 8/1996 | Behr et al. | 340/995 |
| 5,544,061 | A | 8/1996 | Morimoto et al. | 340/995 |
| 5,561,446 | A | 10/1996 | Montlick | 345/173 |
| 5,574,906 | A | 11/1996 | Morris | 395/601 |
| 5,579,489 | A | 11/1996 | Dornier et al. | |
| 5,588,009 | A | 12/1996 | Will | 371/33 |
| 5,592,470 | A | 1/1997 | Rudrapatna et al. | |
| 5,623,406 | A | 4/1997 | Ichbiah | 364/999.999 |
| 5,623,661 | A | 4/1997 | Hon | 395/601 |
| 5,628,005 | A | 5/1997 | Hurvig | 395/608 |
| 5,630,081 | A | 5/1997 | Rybicki et al. | 395/348 |
| 5,638,508 | A | 6/1997 | Kanai et al. | 714/20 |
| 5,640,577 | A | 6/1997 | Scharmer | 395/765 |
| 5,644,709 | A | 7/1997 | Austin | |
| 5,647,002 | A | 7/1997 | Brunson | 380/49 |
| 5,649,195 | A | 7/1997 | Scott et al. | 395/617 |
| 5,650,800 | A | 7/1997 | Benson | |
| 5,657,372 | A | 8/1997 | Ahlberg | |
| 5,666,397 | A | 9/1997 | Lamons et al. | |
| 5,666,553 | A | 9/1997 | Crozier | 395/803 |
| 5,682,524 | A | 10/1997 | Freund et al. | 395/605 |
| 5,684,990 | A | 11/1997 | Boothby | 395/619 |
| 5,694,596 | A | 12/1997 | Campbell | 395/610 |
| 5,699,255 | A | 12/1997 | Ellis et al. | 701/212 |
| 5,701,423 | A | 12/1997 | Crozier | 395/335 |
| 5,706,509 | A | 1/1998 | Man-Hak Tso | 395/617 |
| 5,710,922 | A | 1/1998 | Alley et al. | 395/617 |
| 5,727,202 | A | 3/1998 | Kucala | 395/610 |
| 5,727,950 | A | 3/1998 | Cook et al. | 434/350 |
| 5,729,735 | A | 3/1998 | Meyering | 395/610 |
| 5,729,739 | A | 3/1998 | Cantin et al. | 395/614 |
| 5,729,743 | A | 3/1998 | Squibb | 395/619 |
| 5,742,792 | A | 4/1998 | Yanai et al. | 395/489 |
| 5,745,750 | A | 4/1998 | Porcaro | 707/102 |
| 5,745,906 | A | 4/1998 | Squibb | 707/203 |
| 5,757,920 | A | 5/1998 | Misra et al. | 380/25 |
| 5,758,150 | A | 5/1998 | Bell et al. | 395/610 |
| 5,758,354 | A | 5/1998 | Huang et al. | |
| 5,758,355 | A | 5/1998 | Buchanan | 707/201 |
| 5,764,899 | A | 6/1998 | Eggleston et al. | 709/203 |
| 5,768,480 | A | 6/1998 | Crawford, Jr. et al. | |
| 5,768,597 | A | 6/1998 | Simm | 395/712 |
| 5,771,354 | A | 6/1998 | Crawford | 395/200.59 |
| 5,778,346 | A | 7/1998 | Frid-Nielsen et al. | 705/9 |
| 5,778,361 | A | 7/1998 | Nanjo et al. | 707/500 |
| 5,778,367 | A | 7/1998 | Wesinger et al. | 395/10 |
| 5,778,388 | A | 7/1998 | Kawamura et al. | 707/203 |
| 5,781,901 | A | 7/1998 | Kuzma | 707/10 |
| 5,787,247 | A | 7/1998 | Norin et al. | 395/200.5 |
| 5,787,262 | A | 7/1998 | Shakib et al. | 395/200.35 |
| 5,794,228 | A | 8/1998 | French et al. | 707/2 |
| 5,804,803 | A | 9/1998 | Cragun et al. | 235/375 |
| 5,809,497 | A | 9/1998 | Freund et al. | 707/2 |
| 5,812,773 | A | 9/1998 | Norin | 395/200.34 |
| 5,812,793 | A | 9/1998 | Shakib et al. | 395/200.31 |
| 5,818,437 | A | 10/1998 | Grover et al. | 345/811 |
| 5,826,245 | A | 10/1998 | Sandberg-Diment | 705/44 |
| 5,828,376 | A | 10/1998 | Solimene et al. | |
| 5,832,489 | A | 11/1998 | Kucala | 707/10 |
| 5,832,518 | A | 11/1998 | Mastors | 707/202 |
| 5,832,519 | A | 11/1998 | Bowen et al. | 707/203 |
| 5,832,520 | A | 11/1998 | Miller | |
| 5,845,283 | A | 12/1998 | Williams et al. | 707/101 |
| 5,859,973 | A | 1/1999 | Carpenter | 395/200.33 |
| 5,864,864 | A | 1/1999 | Lerner | 707/102 |
| 5,875,296 | A | 2/1999 | Shi et al. | 395/188.01 |
| 5,884,323 | A | 3/1999 | Hawkins et al. | 707/201 |
| 5,884,325 | A | 3/1999 | Bauer et al. | 707/201 |
| 5,893,119 | A | 4/1999 | Squibb | 707/203 |
| 5,896,321 | A | 4/1999 | Miller | 365/189.01 |
| 5,897,640 | A | 4/1999 | Veghte et al. | 707/202 |
| 5,897,642 | A | 4/1999 | Capossela et al. | 707/203 |
| 5,903,723 | A | 5/1999 | Beck et al. | 709/203 |
| 5,907,793 | A | 5/1999 | Reams | 455/3.1 |
| 5,909,568 | A | 6/1999 | Nason | |
| 5,923,756 | A | 7/1999 | Shambroom | 713/156 |
| 5,923,848 | A | 7/1999 | Goodhand et al. | 395/200.49 |
| 5,926,816 | A | 7/1999 | Bauer et al. | 707/8 |
| 5,933,653 | A | 8/1999 | Ofek | 395/826 |
| 5,933,778 | A | 8/1999 | Buhrmann et al. | |
| 5,933,816 | A | 8/1999 | Zeanah et al. | 705/35 |
| 5,935,262 | A | 8/1999 | Barrett et al. | 714/46 |
| 5,937,405 | A | 8/1999 | Campbell | 707/10 |
| 5,941,944 | A | 8/1999 | Messerly | 709/203 |
| 5,943,676 | A | 8/1999 | Boothby | 707/201 |
| 5,944,787 | A | 8/1999 | Zoken | 709/206 |
| 5,946,615 | A | 8/1999 | Holmes et al. | 455/412 |
| 5,948,066 | A | 9/1999 | Whalen et al. | 709/229 |
| 5,950,193 | A | 9/1999 | Kulkarni | |
| 5,951,636 | A | 9/1999 | Zerber | 709/202 |
| 5,961,572 | A | 10/1999 | Craport et al. | 340/990 |
| 5,961,590 | A | 10/1999 | Mendez et al. | 709/206 |
| 5,966,717 | A | 10/1999 | Sass | |
| 5,968,131 | A | 10/1999 | Mendez et al. | 709/246 |
| 5,970,149 | A | 10/1999 | Johnson | 714/46 |
| 5,970,490 | A | 10/1999 | Morgenstern | 707/10 |
| 5,971,277 | A | 10/1999 | Cragun et al. | 235/462.01 |
| 5,974,238 | A | 10/1999 | Chase, Jr. | 395/200.78 |
| 5,974,563 | A | 10/1999 | Beeler, Jr. | 714/5 |
| 5,987,381 | A | 11/1999 | Oshizawa | 340/990 |
| 5,987,609 | A | 11/1999 | Hasebe | 726/35 |
| 5,995,118 | A | 11/1999 | Masuda | 345/467 |
| 6,000,000 | A | 12/1999 | Hawkins et al. | 707/201 |
| 6,006,215 | A | 12/1999 | Retallick | 707/2 |
| 6,006,274 | A | 12/1999 | Hawkins et al. | 709/248 |
| 6,009,462 | A | 12/1999 | Birrell et al. | 709/206 |
| 6,012,063 | A | 1/2000 | Bodnar | 707/101 |
| 6,012,088 | A | 1/2000 | Li et al. | 709/219 |
| 6,014,695 | A | 1/2000 | Yamashita et al. | |
| 6,016,394 | A | 1/2000 | Walker | 717/104 |
| 6,016,478 | A | 1/2000 | Zhang et al. | 705/9 |
| 6,023,620 | A | 2/2000 | Hansson | |
| 6,023,708 | A | 2/2000 | Mendez et al. | 707/203 |
| 6,023,723 | A | 2/2000 | McCormick et al. | 709/206 |
| 6,026,414 | A | 2/2000 | Anglin | 707/204 |
| 6,034,621 | A | 3/2000 | Kaufman | 340/825.44 |
| 6,038,665 | A | 3/2000 | Bolt et al. | 713/176 |
| 6,044,381 | A | 3/2000 | Boothby et al. | 707/201 |
| 6,049,776 | A | 4/2000 | Donnelly et al. | 705/8 |
| 6,052,735 | A | 4/2000 | Ulrich et al. | 709/236 |
| 6,058,399 | A | 5/2000 | Morag et al. | 707/201 |
| 6,061,790 | A | 5/2000 | Bodnar | 713/171 |
| 6,061,796 | A | 5/2000 | Chen et al. | 713/201 |
| 6,063,134 | A | 5/2000 | Peters et al. | |
| 6,064,880 | A | 5/2000 | Alanara | 455/419 |
| 6,065,018 | A | 5/2000 | Beier et al. | 707/202 |
| 6,067,582 | A * | 5/2000 | Smith et al. | 710/5 |
| 6,073,133 | A | 6/2000 | Chrabaszcz | 707/10 |
| 6,076,109 | A | 6/2000 | Kikinis | 709/228 |
| 6,078,960 | A | 6/2000 | Ballard | 709/229 |
| 6,081,900 | A | 6/2000 | Subramaniam et al. | 713/201 |
| 6,094,618 | A | 7/2000 | Harada | 701/207 |
| 6,101,480 | A | 8/2000 | Conmy et al. | 705/9 |
| 6,108,330 | A | 8/2000 | Bhatia et al. | 370/352 |
| 6,108,703 | A | 8/2000 | Leighton et al. | 709/226 |
| 6,112,024 | A | 8/2000 | Almond et al. | |
| 6,115,797 | A | 9/2000 | Kanda et al. | |
| 6,131,096 | A | 10/2000 | Ng et al. | 707/10 |
| 6,131,116 | A | 10/2000 | Riggins et al. | 709/219 |
| 6,141,011 | A | 10/2000 | Bodnar et al. | 345/357 |

(56) References Cited

U.S. PATENT DOCUMENTS

| | | | |
|---|---|---|---|
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,145,088 A | 11/2000 | Stevens | |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A | 12/2000 | Kishi | 706/16 |
| 6,163,779 A | 12/2000 | Mantha et al. | 707/100 |
| 6,163,844 A | 12/2000 | Duncan et al. | 713/201 |
| 6,167,120 A | 12/2000 | Kikinis | 379/90.01 |
| 6,173,310 B1 | 1/2001 | Yost et al. | 709/201 |
| 6,173,311 B1 | 1/2001 | Hassett et al. | 709/202 |
| 6,182,117 B1 | 1/2001 | Christie et al. | 709/205 |
| 6,182,141 B1 | 1/2001 | Blum et al. | 709/227 |
| 6,185,598 B1 | 2/2001 | Farber et al. | 709/200 |
| 6,189,030 B1 | 2/2001 | Kirsch et al. | 709/224 |
| 6,189,096 B1 | 2/2001 | Haverty | 713/155 |
| 6,195,695 B1 | 2/2001 | Cheston et al. | 709/221 |
| 6,195,794 B1 | 2/2001 | Buxton | 717/11 |
| 6,202,085 B1 | 3/2001 | Benson et al. | 709/205 |
| 6,205,448 B1 | 3/2001 | Kruglikov et al. | 707/200 |
| 6,209,034 B1 | 3/2001 | Gladwin et al. | |
| 6,212,529 B1 | 4/2001 | Boothby et al. | 707/201 |
| 6,212,556 B1 | 4/2001 | Arunachalam | |
| 6,216,131 B1 | 4/2001 | Liu et al. | 707/102 |
| 6,219,680 B1 | 4/2001 | Bernardo et al. | 707/501 |
| 6,219,694 B1 | 4/2001 | Lazaridis et al. | 709/206 |
| 6,223,187 B1 | 4/2001 | Boothby et al. | 707/201 |
| 6,226,650 B1 | 5/2001 | Mahajan et al. | 707/201 |
| 6,233,565 B1 | 5/2001 | Lewis et al. | 705/35 |
| 6,233,589 B1 | 5/2001 | Balcha et al. | 707/203 |
| 6,243,760 B1 | 6/2001 | Armbruster et al. | 709/243 |
| 6,246,889 B1 | 6/2001 | Boltz | |
| 6,247,048 B1 | 6/2001 | Greer et al. | 709/219 |
| 6,247,135 B1 | 6/2001 | Feague | 713/400 |
| 6,249,690 B1 | 6/2001 | Mashiko | |
| 6,252,547 B1 | 6/2001 | Perry et al. | 342/357.06 |
| 6,255,989 B1 | 7/2001 | Munson et al. | 342/357.13 |
| 6,256,750 B1 | 7/2001 | Takeda | 714/11 |
| 6,260,124 B1 | 7/2001 | Crockett et al. | 711/162 |
| 6,272,545 B1 | 8/2001 | Flanagin et al. | 709/228 |
| 6,275,831 B1 | 8/2001 | Bodnar et al. | 707/201 |
| 6,278,941 B1 | 8/2001 | Yokoyama | 701/209 |
| 6,282,435 B1 | 8/2001 | Wagner et al. | 455/566 |
| 6,282,698 B1 | 8/2001 | Baker et al. | 717/1 |
| 6,285,889 B1 | 9/2001 | Nykanen et al. | 455/557 |
| 6,286,029 B1 | 9/2001 | Delph | |
| 6,286,053 B1 | 9/2001 | Van Peursem et al. | 709/999.999 |
| 6,286,085 B1 | 9/2001 | Jouenne et al. | 711/162 |
| 6,289,212 B1 | 9/2001 | Stein et al. | |
| 6,292,743 B1 | 9/2001 | Pu et al. | 455/456 |
| 6,292,905 B1 | 9/2001 | Wallach et al. | 714/4 |
| 6,295,502 B1 | 9/2001 | Hancock et al. | 701/209 |
| 6,295,541 B1 | 9/2001 | Bodnar et al. | 707/203 |
| 6,304,881 B1 | 10/2001 | Halim et al. | 707/201 |
| 6,317,755 B1 | 11/2001 | Rakers et al. | 707/204 |
| 6,321,236 B1 | 11/2001 | Zollinger et al. | 707/201 |
| 6,324,467 B1 | 11/2001 | Machii et al. | 701/200 |
| 6,324,526 B1 | 11/2001 | D'Agostino | 705/44 |
| 6,324,544 B1 | 11/2001 | Alam et al. | 707/201 |
| 6,327,533 B1 | 12/2001 | Chou | 340/988 |
| 6,329,680 B1 | 12/2001 | Yoshida et al. | 257/296 |
| 6,330,568 B1 | 12/2001 | Boothby et al. | 707/201 |
| 6,332,158 B1 | 12/2001 | Risley et al. | 709/219 |
| 6,333,973 B1 | 12/2001 | Smith et al. | 379/88.12 |
| 6,338,096 B1 | 1/2002 | Ukelson | 719/319 |
| 6,339,710 B1 | 1/2002 | Suzuki | 455/458 |
| 6,341,316 B1 | 1/2002 | Kloba et al. | 709/248 |
| 6,345,308 B1 | 2/2002 | Abe | 709/248 |
| 6,349,336 B1 | 2/2002 | Sit et al. | |
| 6,353,448 B1 | 3/2002 | Scarborough et al. | 345/349 |
| 6,356,910 B1 | 3/2002 | Zellweger | 707/100 |
| 6,356,961 B1 | 3/2002 | Oprescu-Surcobe | |
| 6,360,252 B1 | 3/2002 | Rudy et al. | 709/206 |
| 6,360,330 B1 | 3/2002 | Mutalik et al. | 714/4 |
| 6,363,249 B1 | 3/2002 | Nordeman et al. | 455/418 |
| 6,363,412 B1 | 3/2002 | Niwa et al. | 709/203 |
| 6,374,250 B2 | 4/2002 | Ajtai et al. | 707/101 |
| 6,381,700 B1 | 4/2002 | Yoshida | 713/201 |
| 6,389,462 B1 | 5/2002 | Cohen et al. | 709/218 |
| 6,396,482 B1 | 5/2002 | Griffin et al. | 345/169 |
| 6,397,307 B2 | 5/2002 | Ohran | 711/161 |
| 6,397,351 B1 | 5/2002 | Miller et al. | 714/13 |
| 6,401,104 B1 | 6/2002 | LaRue et al. | 707/203 |
| 6,405,218 B1 | 6/2002 | Boothby | 707/201 |
| 6,418,309 B1 | 7/2002 | Moon et al. | 455/418 |
| 6,430,289 B1 | 8/2002 | Liffick | |
| 6,434,621 B1 | 8/2002 | Pezzillo et al. | |
| 6,434,627 B1 | 8/2002 | Millet et al. | 709/245 |
| 6,437,818 B1 | 8/2002 | Ludwig et al. | 348/14.09 |
| 6,449,622 B1 | 9/2002 | LaRue et al. | 707/201 |
| 6,453,392 B1 | 9/2002 | Flynn, Jr. | 711/151 |
| 6,457,062 B1 | 9/2002 | Pivowar et al. | 709/248 |
| 6,460,036 B1 | 10/2002 | Herz | 707/10 |
| 6,462,644 B1 | 10/2002 | Howell et al. | |
| 6,463,464 B1 | 10/2002 | Lazaridis et al. | 709/207 |
| 6,466,967 B2 | 10/2002 | Landsman et al. | 709/203 |
| 6,473,621 B1 | 10/2002 | Heie | 455/466 |
| 6,480,896 B1 | 11/2002 | Brown et al. | 709/231 |
| 6,484,143 B1 | 11/2002 | Swildens et al. | 705/1 |
| 6,487,560 B1 | 11/2002 | LaRue et al. | 707/203 |
| 6,490,655 B1 | 12/2002 | Kershaw | 711/151 |
| 6,496,944 B1 | 12/2002 | Hsiao et al. | 714/15 |
| 6,499,108 B1 | 12/2002 | Johnson | 713/201 |
| 6,505,216 B1 | 1/2003 | Schutzman et al. | |
| 6,507,891 B1 | 1/2003 | Challenger et al. | 711/122 |
| 6,516,314 B1 | 2/2003 | Birkler et al. | |
| 6,516,327 B1 | 2/2003 | Zondervan et al. | 707/200 |
| 6,519,452 B1 | 2/2003 | Agostino et al. | |
| 6,523,063 B1 | 2/2003 | Hanson | 709/206 |
| 6,523,079 B2 | 2/2003 | Kikinis et al. | 710/303 |
| 6,532,588 B1 | 3/2003 | Porter | |
| 6,535,743 B1 | 3/2003 | Kennedy et al. | 455/456.1 |
| 6,535,949 B1 | 3/2003 | Parker | |
| 6,539,494 B1 | 3/2003 | Abramson et al. | 714/4 |
| 6,542,933 B1 | 4/2003 | Durst, Jr. et al. | 709/229 |
| 6,546,425 B1 | 4/2003 | Hanson et al. | 709/227 |
| 6,549,933 B1 | 4/2003 | Barrett et al. | 709/203 |
| 6,553,375 B1 | 4/2003 | Huang et al. | 707/10 |
| 6,553,410 B2 | 4/2003 | Kikinis | 709/218 |
| 6,553,413 B1 | 4/2003 | Leighton et al. | 709/219 |
| 6,564,336 B1 | 5/2003 | Majkowski | |
| 6,567,850 B1 | 5/2003 | Freishtat et al. | 709/224 |
| 6,567,857 B1 | 5/2003 | Gupta et al. | |
| 6,581,065 B1 | 6/2003 | Rodkin et al. | 707/102 |
| 6,584,454 B1 | 6/2003 | Hummel et al. | 705/59 |
| 6,589,290 B1 | 7/2003 | Maxwell et al. | 707/507 |
| 6,591,266 B1 | 7/2003 | Li et al. | 707/10 |
| 6,591,306 B1 | 7/2003 | Redlich | 709/245 |
| 6,591,362 B1 | 7/2003 | Li | 713/1 |
| 6,597,700 B2 | 7/2003 | Golikeri et al. | 370/401 |
| 6,601,143 B1 | 7/2003 | Lamparter | |
| 6,609,005 B1 | 8/2003 | Chern | 455/457 |
| 6,628,194 B1 | 9/2003 | Hellebust et al. | |
| 6,636,894 B1 | 10/2003 | Short et al. | 709/225 |
| 6,640,302 B1 | 10/2003 | Subramaniam et al. | 713/169 |
| 6,643,707 B1 | 11/2003 | Booth | 709/245 |
| 6,647,399 B2 | 11/2003 | Zaremba | |
| 6,654,746 B1 | 11/2003 | Wong et al. | 707/10 |
| 6,662,212 B1 | 12/2003 | Chandhok et al. | |
| 6,665,721 B1 | 12/2003 | Hind et al. | |
| 6,668,254 B2 | 12/2003 | Matson et al. | |
| 6,671,724 B1 | 12/2003 | Pandya et al. | 709/226 |
| 6,671,757 B1 | 12/2003 | Multer et al. | 710/100 |
| 6,684,206 B2 | 1/2004 | Chen et al. | 706/61 |
| 6,684,302 B2 | 1/2004 | Kershaw | 711/151 |
| 6,694,335 B1 | 2/2004 | Hopmann et al. | 707/200 |
| 6,694,336 B1 | 2/2004 | Multer et al. | 707/100 |
| 6,701,316 B1 | 3/2004 | Li et al. | 707/10 |
| 6,704,849 B2 | 3/2004 | Steegmans | 711/162 |
| 6,714,987 B1 | 3/2004 | Amin et al. | 709/249 |
| 6,718,336 B1 | 4/2004 | Saffer et al. | |
| 6,718,348 B1 | 4/2004 | Novak et al. | 707/201 |

(56) References Cited

U.S. PATENT DOCUMENTS

| | | |
|---|---|---|
| 6,718,390 B1 | 4/2004 | Still et al. .................. 709/229 |
| 6,725,239 B2 | 4/2004 | Sherman et al. ............. 707/201 |
| 6,728,530 B1 | 4/2004 | Heinonen et al. .......... 455/414.1 |
| 6,732,101 B1 | 5/2004 | Cook ............................. 707/10 |
| 6,732,264 B1 | 5/2004 | Sun et al. ......................... 713/2 |
| 6,738,789 B2 | 5/2004 | Multer et al. ................. 707/101 |
| 6,741,851 B1 | 5/2004 | Lee et al. |
| 6,745,040 B2 | 6/2004 | Zimmerman ................. 455/458 |
| 6,757,696 B2 | 6/2004 | Multer et al. ..................... 707/1 |
| 6,757,698 B2 * | 6/2004 | McBride et al. ...................... 1/1 |
| 6,757,712 B1 | 6/2004 | Bastian et al. ................ 709/206 |
| 6,781,575 B1 | 8/2004 | Hawkins et al. ............. 345/173 |
| 6,795,848 B1 | 9/2004 | Border et al. ................. 709/213 |
| 6,799,214 B1 | 9/2004 | Li ................................. 709/226 |
| 6,804,690 B1 | 10/2004 | Dysert et al. ................. 707/204 |
| 6,804,783 B1 | 10/2004 | Wesinger, Jr. et al. ........ 713/200 |
| 6,810,411 B1 | 10/2004 | Coughlin et al. |
| 6,812,961 B1 | 11/2004 | Parulski et al. ............. 348/231.2 |
| 6,813,487 B1 | 11/2004 | Trommelen |
| 6,816,481 B1 | 11/2004 | Adams et al. ................. 370/352 |
| 6,829,654 B1 | 12/2004 | Jungck |
| 6,836,657 B2 | 12/2004 | Ji et al. |
| 6,836,765 B1 | 12/2004 | Sussman ......................... 705/41 |
| 6,839,022 B1 | 1/2005 | Benco et al. |
| 6,839,568 B2 | 1/2005 | Suzuki ....................... 455/550.1 |
| 6,842,695 B1 | 1/2005 | Tu et al. ........................ 701/213 |
| 6,850,944 B1 | 2/2005 | MacCall et al. .............. 707/100 |
| 6,868,451 B1 | 3/2005 | Peacock ........................ 709/231 |
| 6,870,921 B1 | 3/2005 | Elsey et al. ............... 379/218.01 |
| 6,886,013 B1 | 4/2005 | Beranek .......................... 707/10 |
| 6,892,225 B1 | 5/2005 | Tu et al. ........................ 709/217 |
| 6,892,245 B1 | 5/2005 | Crump et al. ................. 709/245 |
| 6,904,449 B1 | 6/2005 | Quinones |
| 6,904,460 B1 | 6/2005 | Raciborski et al. ........... 709/224 |
| 6,920,488 B1 | 7/2005 | Le Pennec et al. ........... 709/219 |
| 6,925,476 B1 | 8/2005 | Multer .......................... 707/200 |
| 6,925,477 B1 | 8/2005 | Champagne et al. ......... 707/203 |
| 6,934,767 B1 | 8/2005 | Jellinek ......................... 709/247 |
| 6,944,651 B2 | 9/2005 | Onyon et al. ................. 709/204 |
| 6,944,676 B1 | 9/2005 | Armbruster et al. .......... 709/243 |
| 6,954,660 B2 | 10/2005 | Aoyama |
| 6,954,783 B1 | 10/2005 | Bodwell et al. .............. 709/218 |
| 6,959,331 B1 | 10/2005 | Traversat et al. |
| 6,963,914 B1 | 11/2005 | Breitbart et al. .............. 709/226 |
| 6,973,299 B2 | 12/2005 | Apfel |
| 6,975,709 B2 | 12/2005 | Wullert, II |
| 6,996,617 B1 | 2/2006 | Aiken, Jr. et al. |
| 6,996,631 B1 | 2/2006 | Aiken, Jr. et al. ............. 709/242 |
| 7,003,555 B1 | 2/2006 | Jungck .......................... 709/219 |
| 7,003,668 B2 | 2/2006 | Berson et al. ................. 713/182 |
| 7,007,041 B2 | 2/2006 | Multer et al. ................... 707/10 |
| 7,010,578 B1 | 3/2006 | Lewin et al. |
| 7,016,964 B1 | 3/2006 | Still et al. |
| 7,023,868 B2 | 4/2006 | Rabenko et al. .............. 370/419 |
| 7,024,491 B1 | 4/2006 | Hanmann et al. |
| 7,030,730 B1 | 4/2006 | Zondervan |
| 7,035,878 B1 | 4/2006 | Multer et al. ................. 707/201 |
| 7,039,656 B1 | 5/2006 | Tsai et al. ..................... 707/201 |
| 7,051,275 B2 | 5/2006 | Gupta et al. .................. 715/512 |
| 7,054,594 B2 | 5/2006 | Bloch et al. .................. 455/41.2 |
| 7,054,952 B1 | 5/2006 | Schwerdtfeger et al. |
| 7,082,476 B1 | 7/2006 | Cohen et al. |
| 7,085,817 B1 | 8/2006 | Tock et al. |
| 7,096,418 B1 | 8/2006 | Singhal et al. |
| 7,099,915 B1 | 8/2006 | Tenereillo et al. |
| 7,103,794 B2 | 9/2006 | Malcolm et al. |
| 7,107,043 B2 | 9/2006 | Aoyama |
| 7,110,954 B2 | 9/2006 | Yung et al. |
| 7,116,681 B1 | 10/2006 | Hovell et al. ................. 370/466 |
| 7,133,503 B2 | 11/2006 | Revisky |
| 7,146,161 B2 | 12/2006 | Chou |
| 7,158,805 B1 | 1/2007 | Park et al. |
| 7,159,036 B2 | 1/2007 | Hinchliffe et al. |
| 7,162,494 B2 | 1/2007 | Arellano .................... 707/104.1 |
| 7,167,728 B1 | 1/2007 | Wagner et al. ................ 455/566 |
| 7,181,628 B2 | 2/2007 | Sato et al. |
| 7,197,574 B1 | 3/2007 | Ishiyama ...................... 709/245 |
| 7,233,791 B2 | 6/2007 | Gilbert et al. ................. 455/419 |
| 7,237,027 B1 | 6/2007 | Raccah et al. |
| 7,249,175 B1 | 7/2007 | Donaldson ................... 709/225 |
| 7,269,433 B2 | 9/2007 | Vargas et al. ................. 455/502 |
| 7,284,051 B1 | 10/2007 | Okano et al. ................. 709/226 |
| 7,289,964 B1 | 10/2007 | Bowman-Amuah ............ 705/1 |
| 7,293,074 B1 | 11/2007 | Jellinek et al. ................ 709/205 |
| 7,308,651 B2 | 12/2007 | Kling et al. |
| 7,315,826 B1 | 1/2008 | Guheen et al. ................... 705/7 |
| 7,317,907 B2 | 1/2008 | Linkert et al. |
| 7,328,341 B1 | 2/2008 | Eun et al. |
| 7,343,568 B2 | 3/2008 | Jiang et al. |
| 7,349,719 B2 | 3/2008 | Buniatyan |
| 7,356,559 B1 | 4/2008 | Jacobs et al. ................. 709/203 |
| 7,363,233 B1 | 4/2008 | Levine ............................. 705/1 |
| 7,383,061 B1 | 6/2008 | Hawkins |
| 7,392,034 B2 | 6/2008 | Westman et al. ............. 455/402 |
| 7,415,486 B2 | 8/2008 | Multer et al. ................. 709/201 |
| 7,440,746 B1 | 10/2008 | Swan |
| 7,447,743 B1 | 11/2008 | Jordan, Jr. .................... 709/206 |
| 7,454,500 B1 | 11/2008 | Hsu et al. ...................... 709/226 |
| 7,499,888 B1 | 3/2009 | Tu et al. .......................... 705/44 |
| 7,505,762 B2 | 3/2009 | Onyon et al. ................. 455/419 |
| 7,519,702 B1 | 4/2009 | Allan |
| 7,539,697 B1 | 5/2009 | Akella et al. |
| 7,587,398 B1 | 9/2009 | Fredricksen et al. |
| 7,596,609 B1 | 9/2009 | Refuah et al. |
| 7,663,652 B1 | 2/2010 | Reese |
| 7,707,150 B2 | 4/2010 | Sundararajan et al. |
| 7,853,664 B1 | 12/2010 | Wang et al. |
| 8,010,095 B2 | 8/2011 | Natsuno et al. |
| 8,073,954 B1 | 12/2011 | Tu et al. |
| 8,224,308 B1 | 7/2012 | Gavrylyako et al. |
| 2001/0014893 A1 | 8/2001 | Boothby ....................... 707/201 |
| 2001/0028363 A1 | 10/2001 | Nomoto et al. |
| 2001/0034737 A1 | 10/2001 | Cane et al. |
| 2001/0044893 A1 | 11/2001 | Multer et al. ................. 707/201 |
| 2001/0047393 A1 | 11/2001 | Arner et al. |
| 2001/0047471 A1 | 11/2001 | Johnson ........................... 713/1 |
| 2001/0051920 A1 | 12/2001 | Joao et al. ....................... 705/41 |
| 2001/0056473 A1 | 12/2001 | Arneson et al. |
| 2002/0007303 A1 | 1/2002 | Brokler et al. ................. 705/10 |
| 2002/0010868 A1 | 1/2002 | Nakashima et al. .......... 713/201 |
| 2002/0016818 A1 | 2/2002 | Kirani et al. .................. 709/206 |
| 2002/0016912 A1 | 2/2002 | Johnson ........................ 713/165 |
| 2002/0023136 A1 | 2/2002 | Silver et al. |
| 2002/0032751 A1 | 3/2002 | Bharadwaj .................... 709/218 |
| 2002/0040369 A1 | 4/2002 | Multer et al. ................. 707/200 |
| 2002/0049852 A1 | 4/2002 | Lee et al. ...................... 709/231 |
| 2002/0055909 A1 | 5/2002 | Fung et al. ...................... 705/42 |
| 2002/0056011 A1 | 5/2002 | Nardone et al. .............. 709/248 |
| 2002/0059116 A1 | 5/2002 | Bulatovic et al. ............... 705/27 |
| 2002/0062365 A1 | 5/2002 | Nishikawa et al. ........... 709/223 |
| 2002/0067816 A1 | 6/2002 | Bushnell |
| 2002/0069178 A1 | 6/2002 | Hoffman |
| 2002/0072350 A1 * | 6/2002 | Fukuzato ...................... 455/412 |
| 2002/0073212 A1 | 6/2002 | Sokol et al. ................... 709/229 |
| 2002/0078075 A1 | 6/2002 | Colson et al. ................. 707/204 |
| 2002/0082995 A1 | 6/2002 | Christie .......................... 705/44 |
| 2002/0083325 A1 | 6/2002 | Mediratta et al. ............. 713/191 |
| 2002/0087588 A1 * | 7/2002 | McBride et al. .............. 707/204 |
| 2002/0091785 A1 | 7/2002 | Ohlenbusch et al. ......... 709/208 |
| 2002/0116444 A1 | 8/2002 | Chaudhri et al. ............. 709/201 |
| 2002/0118192 A1 | 8/2002 | Couckuyt et al. |
| 2002/0120600 A1 | 8/2002 | Schiavone et al. ............... 707/1 |
| 2002/0128908 A1 | 9/2002 | Levin et al. ..................... 705/14 |
| 2002/0138582 A1 | 9/2002 | Chandra et al. ............... 709/206 |
| 2002/0138765 A1 | 9/2002 | Fishman et al. .............. 713/201 |
| 2002/0152278 A1 | 10/2002 | Pontenzone et al. |
| 2002/0162011 A1 | 10/2002 | Tanaka et al. ................. 713/200 |
| 2002/0168964 A1 | 11/2002 | Kraft |
| 2002/0168975 A1 | 11/2002 | Gresham et al. |
| 2002/0194196 A1 | 12/2002 | Weinberg et al. |
| 2003/0021274 A1 | 1/2003 | Siikaniemi et al. |
| 2003/0028451 A1 | 2/2003 | Ananian ......................... 705/27 |
| 2003/0028554 A1 | 2/2003 | Koskimies et al. ........... 707/201 |
| 2003/0028603 A1 | 2/2003 | Aktas et al. |

(56) References Cited

U.S. PATENT DOCUMENTS

| | | |
|---|---|---|
| 2003/0028647 A1 | 2/2003 | Grosu |
| 2003/0037020 A1 | 2/2003 | Novak et al. ............... 707/1 |
| 2003/0043195 A1 | 3/2003 | Kling et al. |
| 2003/0046433 A1 | 3/2003 | Luzzatti et al. |
| 2003/0061163 A1 | 3/2003 | Durfield ............... 705/44 |
| 2003/0065934 A1 | 4/2003 | Angelo et al. ............... 713/200 |
| 2003/0069874 A1 | 4/2003 | Hertzog et al. ............... 707/1 |
| 2003/0084121 A1 | 5/2003 | De Boor et al. ............... 709/218 |
| 2003/0093797 A1 | 5/2003 | Bazzaz |
| 2003/0110280 A1 | 6/2003 | Hinchliffe et al. |
| 2003/0115240 A1 | 6/2003 | Cho |
| 2003/0134625 A1 | 7/2003 | Choi ............... 455/418 |
| 2003/0135463 A1 | 7/2003 | Brown et al. ............... 705/44 |
| 2003/0139172 A1 | 7/2003 | Lampela et al. ............... 455/415 |
| 2003/0158960 A1 | 8/2003 | Engberg |
| 2003/0163483 A1 | 8/2003 | Zingher et al. |
| 2003/0172236 A1 | 9/2003 | Iyengar et al. |
| 2003/0204568 A1 | 10/2003 | Bhargava et al. ............... 709/206 |
| 2003/0208546 A1 | 11/2003 | Desalvo et al. ............... 709/206 |
| 2003/0217181 A1 | 11/2003 | Kiiskinen |
| 2003/0224760 A1 | 12/2003 | Day ............... 455/412.1 |
| 2003/0229723 A1* | 12/2003 | Kangas et al. ............... 709/310 |
| 2003/0229898 A1 | 12/2003 | Babu et al. ............... 725/87 |
| 2003/0233383 A1 | 12/2003 | Koskimies ............... 707/204 |
| 2003/0236933 A1* | 12/2003 | Shigeta et al. ............... 710/72 |
| 2004/0003390 A1* | 1/2004 | Canter et al. ............... 717/178 |
| 2004/0054746 A1 | 3/2004 | Shibata ............... 709/207 |
| 2004/0058673 A1 | 3/2004 | Irlam et al. |
| 2004/0093317 A1 | 5/2004 | Swan ............... 707/10 |
| 2004/0093342 A1 | 5/2004 | Arbo et al. ............... 707/102 |
| 2004/0093385 A1 | 5/2004 | Yamagata ............... 709/206 |
| 2004/0110497 A1* | 6/2004 | Little ............... 455/418 |
| 2004/0111465 A1 | 6/2004 | Chuang et al. ............... 709/203 |
| 2004/0120477 A1 | 6/2004 | Nguyen et al. |
| 2004/0128324 A1 | 7/2004 | Sheynman et al. |
| 2004/0132428 A1 | 7/2004 | Mulligan ............... 455/411 |
| 2004/0142711 A1 | 7/2004 | Mahonen et al. ............... 455/502 |
| 2004/0148408 A1 | 7/2004 | Nadarajah |
| 2004/0162830 A1 | 8/2004 | Shirwadkar et al. ............... 707/10 |
| 2004/0192260 A1 | 9/2004 | Sugimoto et al. ............... 455/419 |
| 2004/0192282 A1 | 9/2004 | Vasudevan ............... 455/412.1 |
| 2004/0193953 A1 | 9/2004 | Callahan et al. ............... 714/15 |
| 2004/0204120 A1 | 10/2004 | Jiles |
| 2004/0224665 A1 | 11/2004 | Kokubo ............... 455/411 |
| 2004/0235523 A1 | 11/2004 | Schrire et al. ............... 455/558 |
| 2004/0267390 A1 | 12/2004 | Ben-Yaacov et al. |
| 2004/0267676 A1 | 12/2004 | Feng et al. |
| 2004/0267944 A1 | 12/2004 | Britt, Jr. ............... 709/229 |
| 2005/0021571 A1 | 1/2005 | East ............... 707/101 |
| 2005/0032527 A1 | 2/2005 | Sheha et al. ............... 455/456.1 |
| 2005/0038863 A1 | 2/2005 | Onyon et al. ............... 709/206 |
| 2005/0044404 A1 | 2/2005 | Bhansali et al. |
| 2005/0050117 A1* | 3/2005 | Seo et al. ............... 707/204 |
| 2005/0054354 A1 | 3/2005 | Roman et al. |
| 2005/0060392 A1 | 3/2005 | Goring et al. ............... 709/220 |
| 2005/0064859 A1 | 3/2005 | Kotzin et al. ............... 455/419 |
| 2005/0081152 A1 | 4/2005 | Commarford |
| 2005/0086296 A1 | 4/2005 | Chi et al. ............... 709/203 |
| 2005/0086318 A1 | 4/2005 | Aubault ............... 709/213 |
| 2005/0090253 A1 | 4/2005 | Kim et al. ............... 455/435.1 |
| 2005/0096975 A1 | 5/2005 | Moshe |
| 2005/0099963 A1 | 5/2005 | Multer et al. |
| 2005/0100150 A1 | 5/2005 | Dhara et al. ............... 379/142.01 |
| 2005/0102257 A1 | 5/2005 | Onyon et al. ............... 709/206 |
| 2005/0102328 A1 | 5/2005 | Ring et al. ............... 707/204 |
| 2005/0114470 A1 | 5/2005 | Bal |
| 2005/0131990 A1 | 6/2005 | Jewell ............... 709/201 |
| 2005/0144200 A1 | 6/2005 | Hesselink et al. |
| 2005/0144251 A1 | 6/2005 | Slate |
| 2005/0157858 A1 | 7/2005 | Rajagopalan |
| 2005/0191998 A1* | 9/2005 | Onyon et al. ............... 455/419 |
| 2005/0203971 A1 | 9/2005 | Koskimies et al. ............... 707/203 |
| 2005/0203992 A1 | 9/2005 | Tanaka et al. |
| 2005/0204001 A1 | 9/2005 | Stein et al. ............... 709/206 |
| 2005/0210101 A1 | 9/2005 | Janik ............... 709/203 |
| 2005/0216300 A1 | 9/2005 | Appelman et al. |
| 2005/0227674 A1 | 10/2005 | Kopra et al. |
| 2005/0233800 A1 | 10/2005 | Jones |
| 2005/0240494 A1 | 10/2005 | Cue et al. |
| 2005/0246325 A1 | 11/2005 | Pettinati |
| 2005/0273632 A1 | 12/2005 | Kawakami |
| 2005/0283741 A1 | 12/2005 | Balabanovic et al. |
| 2006/0021059 A1 | 1/2006 | Brown et al. ............... 455/410 |
| 2006/0035647 A1 | 2/2006 | Eisner et al. ............... 455/456.1 |
| 2006/0052091 A1* | 3/2006 | Onyon et al. ............... 455/415 |
| 2006/0095397 A1 | 5/2006 | Torres et al. |
| 2006/0129627 A1 | 6/2006 | Phillips et al. |
| 2006/0190626 A1 | 8/2006 | Bhogal et al. ............... 709/248 |
| 2006/0199599 A1 | 9/2006 | Gupta et al. |
| 2006/0212482 A1 | 9/2006 | Celik |
| 2006/0233535 A1 | 10/2006 | Pfleging et al. |
| 2006/0268842 A1 | 11/2006 | Takahashi et al. |
| 2006/0288112 A1 | 12/2006 | Soelberg et al. |
| 2007/0005504 A1 | 1/2007 | Chen et al. |
| 2007/0022469 A1 | 1/2007 | Cooper et al. |
| 2007/0043739 A1 | 2/2007 | Takai et al. |
| 2007/0047533 A1 | 3/2007 | Criddle et al. |
| 2007/0050734 A1 | 3/2007 | Busey ............... 715/853 |
| 2007/0053335 A1 | 3/2007 | Onyon et al. ............... 370/343 |
| 2007/0056043 A1 | 3/2007 | Onyon et al. ............... 713/189 |
| 2007/0061331 A1* | 3/2007 | Ramer et al. ............... 707/10 |
| 2007/0082668 A1 | 4/2007 | Silver et al. ............... 455/432.3 |
| 2007/0094042 A1* | 4/2007 | Ramer et al. ............... 705/1 |
| 2007/0127597 A1 | 6/2007 | Ammer et al. |
| 2007/0214149 A1 | 9/2007 | Bodin et al. |
| 2007/0220419 A1 | 9/2007 | Stibel et al. |
| 2007/0226272 A1 | 9/2007 | Huang et al. ............... 707/201 |
| 2007/0226783 A1 | 9/2007 | Mimlitsch |
| 2008/0005080 A1 | 1/2008 | Xiques et al. |
| 2008/0005282 A1 | 1/2008 | Gaedcke |
| 2008/0009268 A1 | 1/2008 | Ramer et al. |
| 2008/0022220 A1 | 1/2008 | Cheah ............... 715/769 |
| 2008/0027826 A1 | 1/2008 | Popick et al. |
| 2008/0039020 A1 | 2/2008 | Eskin ............... 455/41.2 |
| 2008/0051071 A1 | 2/2008 | Vishwanathan et al. |
| 2008/0051117 A1 | 2/2008 | Khare et al. |
| 2008/0059897 A1 | 3/2008 | Dilorenzo |
| 2008/0064378 A1 | 3/2008 | Kahan et al. |
| 2008/0082421 A1 | 4/2008 | Onyon et al. ............... 705/14 |
| 2008/0089299 A1 | 4/2008 | Lindsley et al. |
| 2008/0104442 A1* | 5/2008 | Diao et al. ............... 714/3 |
| 2008/0120199 A1 | 5/2008 | Pirnack et al. |
| 2008/0127289 A1 | 5/2008 | Julia et al. |
| 2008/0201362 A1 | 8/2008 | Multer et al. ............... 707/103 R |
| 2008/0208617 A1* | 8/2008 | Onyon et al. ............... 705/1 |
| 2008/0214163 A1 | 9/2008 | Onyon et al. ............... 455/414.2 |
| 2008/0214167 A1 | 9/2008 | Natsuno et al. |
| 2008/0268823 A1 | 10/2008 | Shalev et al. |
| 2008/0270805 A1 | 10/2008 | Kean |
| 2008/0294768 A1 | 11/2008 | Sampson et al. |
| 2008/0307345 A1* | 12/2008 | Hart et al. ............... 715/769 |
| 2009/0012940 A1 | 1/2009 | Ives et al. |
| 2009/0037828 A1 | 2/2009 | Waite et al. |
| 2009/0055464 A1* | 2/2009 | Multer et al. ............... 709/201 |
| 2009/0106110 A1 | 4/2009 | Stannard et al. ............... 455/419 |
| 2009/0138546 A1 | 5/2009 | Cruzada |
| 2009/0327305 A1 | 12/2009 | Roberts et al. |
| 2010/0205448 A1 | 8/2010 | Tarhan et al. |
| 2010/0251230 A1 | 9/2010 | O'Farrell et al. |
| 2011/0107203 A1 | 5/2011 | Nash et al. |
| 2011/0269424 A1* | 11/2011 | Multer et al. ............... 455/411 |
| 2012/0151346 A1 | 6/2012 | McClements, IV |

FOREIGN PATENT DOCUMENTS

| | | | |
|---|---|---|---|
| CN | 1455522 | 11/2003 | ............... H04Q 7/38 |
| CN | 1313697 A | 2/2005 | |
| EP | 0801487 A2 | 10/1997 | ............... H04L 29/06 |
| EP | 0836131 A2 | 4/1998 | ............... G06F 1/00 |
| EP | 0836301 A | 4/1998 | ............... H04L 12/58 |
| EP | 0924917 A2 | 6/1999 | ............... H04M 3/42 |
| EP | 0930593 A | 7/1999 | ............... G08B 5/22 |
| EP | 1024441 A2 | 2/2000 | ............... G06F 17/30 |
| EP | 0986225 AI | 3/2000 | ............... G06F 17/30 |

(56) References Cited

FOREIGN PATENT DOCUMENTS

| | | | | |
|---|---|---|---|---|
| EP | 1139608 | A2 | 10/2001 | ............... H04L 12/28 |
| EP | 1180890 | A2 | 2/2002 | ............... G06F 12/00 |
| EP | 1263244 | A2 | 4/2002 | ............... H04Q 3/00 |
| FR | 1998-106683 | | 12/1998 | ............... G06F 17/30 |
| GB | 2366050 | A | 6/2001 | ............... G06F 11/34 |
| JP | 7303146 | A | 11/1995 | |
| JP | 10191453 | | 7/1998 | ............... H04Q 7/38 |
| JP | 11242620 | | 9/1999 | ............... G06F 12/00 |
| JP | 11242677 | | 9/1999 | ............... G06F 12/00 |
| JP | 2000232680 | A | 8/2000 | |
| JP | 2000316053 | A | 11/2000 | |
| JP | 2002142254 | A | 5/2002 | |
| JP | 2002185575 | A | 6/2002 | |
| JP | 2002247144 | A | 8/2002 | |
| JP | 2002314689 | A | 10/2002 | |
| JP | 2003259011 | A | 9/2003 | |
| WO | WO 1997/04391 | | 2/1997 | ............... G06F 11/14 |
| WO | WO 1997/39564 | | 10/1997 | ............... H04L 12/58 |
| WO | WO 1997/41520 | | 11/1997 | ............... G06F 17/30 |
| WO | WO 1998/03005 | | 1/1998 | ............... H04M 3/42 |
| WO | WO 1998/21648 | | 5/1998 | ............... G06F 9/00 |
| WO | WO 1998/29994 | A | 7/1998 | ............... H04L 12/58 |
| WO | WO 1998/54662 | | 12/1998 | ............... G06F 17/30 |
| WO | WO 1998/56159 | A | 12/1998 | ............... H04M 7/00 |
| WO | WO 199/05813 | | 2/1999 | ............... H04L 9/00 |
| WO | WO 1999/06900 | | 2/1999 | ............... G06F 13/00 |
| WO | WO 1999/36870 | | 7/1999 | ............... G06F 17/30 |
| WO | WO 1999/40514 | | 8/1999 | ............... G06F 9/46 |
| WO | WO 1999/45451 | | 9/1999 | ............... G06F 17/30 |
| WO | WO 1999/45484 | | 9/1999 | ............... G06F 17/30 |
| WO | WO 1999/46701 | A | 9/1999 | ............... G06F 17/30 |
| WO | WO 1999/50761 | | 10/1999 | ............... G06F 17/30 |
| WO | WO 1999/65256 | | 12/1999 | ............... H04Q 7/00 |
| WO | WO 2000/11832 | | 3/2000 | |
| WO | WO 2000/16222 | | 3/2000 | ............... G06F 17/30 |
| WO | WO 2000/29998 | | 5/2000 | ............... G06F 17/60 |
| WO | 200133874 | A1 | 5/2001 | |
| WO | WO 2001/71539 | | 9/2001 | ............... G06F 17/00 |
| WO | WO 2001/80535 | A1 | 9/2001 | ............... H04M 1/64 |
| WO | 200217140 | A2 | 2/2002 | |
| WO | 2003-083716 | A1 | 10/2003 | |
| WO | WO 2005/112586 | A2 | 12/2005 | |

OTHER PUBLICATIONS

Intellisync Email Accelerator, A detailed guide to functionality—Product functionality paper, Mar. 2004, pp. 1-18.
Lee et al, "Monitoring Data Archives for Grid Environments," Jul. 2002, 10 pp.
Batista et al. "Mining Web Access Logs of an On-line Newspaper" Jul. 2002, 8 pp. http://ectrl.itc.it/rpec/.
Finnigan, Anne, "The Safe Way to Shop Online," Sep. 1998, p. 162, Good Housekeeping, v. 227 No. 3.
Chase, Larry, "Taking Transactions Online,"Oct. 1998, pp. 124-132, Target Marketing, v.21 No. 10.
Gong, Li, "Increasing Availability and Security of an Authentication Service," Jun. 1993, pp. 657-662, IEEE Journal on Selected Areas in Communications, v. 11 No. 5.
DeMaio, Harry B., "My MIPS Are Sealed," Sep./Oct. 1993, pp. 46-51, Chief Information Officer Journal, v. 5 issue 7.
Internet Mail Consortium: :vCard Overview, Oct. 13, 1998, 3 pp., Retrieved from the Internet: www.imc.org/pdi/vcardoverview.
Internet Mail Consortium: :vCard The Electronic Business Card, Jan. 1, 1997, 5 pp., Retrieved from the Internet: www.imc.org/pdi/vcardwhite.html.
Jennings, J. "SyncML DM: A SyncML Protocol for Device Management, "slide presentation, downloaded from www.openalliance.org/tech/affiliates/syncml/syncmldm__28jan02__james__jennings.pdf, Jan. 28, 2002, 23 pp.
Torio, T. "The SyncML Road Ahead—Application Development and Device Management,"slide presentation, downloaded from www.openalliance.org/tech/affiliates/syncml/syncmldm__30jan02__teemu__Toroi.pdf, Jan. 30, 2002.
Sheha, M.A.et al. "Specification and Drawings of U.U. Provisional Patent Application 60/493,704," filed Aug. 8, 2003.
FusionOne "FusionOne Unveils Integrated Carrier Product Suite to Deliver Mobility Solutions to Individuals and the Enterprise,"Press Release, Mar. 18, 2002, 3 pp.
FusionOne "FusionOne Unveils Mighty Phone™Wireless Service," Press Release,Nov. 18, 2002, 3 pp.
Business Wire, "SyncML Announces 18 New Compliant Products, SyncML DM Engineering Event Held; 99 Devices No Certified SyncML Compliant,"Press Release, Sep. 25, 2002.
Reed, Benjamin C., et al.,"Authenticating Network-Attached Storage,"IEEE, Jan.-Feb.2000, pp. 49-57.
Gaskin, J.E.:Messaging—Instant Enterprise—Once a Novelty item, IM is Becoming a More Serious Tool for Business Users, IntenetWeek, No. 810, Apr. 24, 2000, p. 55.
BusinessWire, "FusionOne Partners with WhitePages.com to Deliver Automatic Synchronization for Online Subscriber,"press release, Oct. 11, 2000.
Pabla, C. "SyncML Intensive," downloaded from www-128.ibm.com/developerworks/wireless/library/we-syncm12, Apr. 1, 2002.
Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.
Patel et al.,"The Multimedia Fax-MIME Gateway," 8440 IEEE MultiMedia No. 4, Jan. 1994, 7 pp.
Lamb et al.,"LAN-Based Office for the Enterprise, A Case Study," Advantis Company, White Plains, NY 10605, Jan. 1994 IEEE, pp. 440-447.
Starfish, "TrueSync Data Synchronization," Software, http://www.starfishsoftware.com/solutions/data/data.html, Jan., 2003.
Rou et al., "Online File Storage System,"2002 Student Conference on Research and Development Proceedings, Shah Alam, Malaysia, Nov. 7, 2002, IEEE, pp. 83-86.
Agarwal et al., " On the Scalability of Data Synchronization Protocols for PDAs and Mobile Devices," Jul. 2002, IEEE Network, pp. 22-28.

\* cited by examiner

| | | | |
|---|---|---|---|
| 15555551212<br>691A | Joe Smith<br>691B | Address@domain.com<br>691C | 3535<br>691D |
| Tetris<br>692A | 3.0<br>692B | Phone Make, Model 1<br>692C | Subscription 1<br>692D |
| Chess Game<br>693A | 1.0<br>693B | Phone Make, Model 2<br>693C | Subscription 2<br>693D |
| Train Schedule<br>694A | 3.0<br>694B | Phone Make, Model 3<br>694C | Subscription 3<br>694D |

691 → (row 1), 692 → (row 2), 693 → (row 3), 694 → (row 4), 690

Fig. 13

Music & Ringtones | MightyBackup - Mozilla Firefox

File  Edit  View  History  Bookmarks  Tools  Help

Back ▼ | ↻ | ✖ | ⇧ | Address | http://design.corp.fusionone.com/mightybackup/web/3.0/fusionone/ring ▼ | ⇧ Go

MightyBackup — 2802

Welcome Jason | Language: English | My Account | Log Out

| Contacts | Music & Ringtones — 2804 | Wallpapers — 2806 | Apps & Subscriptions — 2808 | Trash | Security | Help |

Music & Ringtones

All # A B C D E F G H I J K L M N O P Q R S T U V W X Y Z

Search: [        ]  [Search] [Clear]

1-5 of 5 Music & Ringtones                                                Page [1 ▼] of 1

| Name ▼ | Artist | Publisher | Type | Date Purchased | |
|---|---|---|---|---|---|
| 🎵 Smoked | The Crystal Method | TuneHaus | MP3 | May 17, '05 4:19pm | Buy for $0.99 |
| 🎵 Booty Drop | 69 Boyz | Ringtone Shack | Polyphonic | Jul 21, '05 11:54am | Re-deliver |
| 🎵 Breathe | The Prodigy | Ringtone Shack | Polyphonic | Feb 13, '07 7:11am | Re-deliver |
| 🎵 Mystic | Borealis | TuneHaus | MP3 | Mar 30, '06 3:41pm | Re-deliver |
| 🎵 Take Control | Jamieson | Ringtone Shack | Polyphonic | Jun 29, '06 11:01am | Re-deliver |
| 🎵 Tremor | Fat Bastard | TuneHaus | MP3 | | |

Display [10 ▼] Per Page                                                   Page [1 ▼] of 1

My Device

Motorola V3

Backed up:
- 18 Contacts
- 5 Music & Ringtones
- 4 Wallpapers
- 3 Apps & Subscriptions Capacity: 500 contacts (482 remaining)

Last backup:
May 27th, 2007 8:37pm

Featured Music

The Crystal Method 🔊
- Smoked from TuneHaus

Buy for $0.99

MightyBackup - Mozilla Firefox

File  Edit  View  History  Bookmarks  Tools  Help

Back  Address  http://  Go

Welcome, Jason (Sales ID: #123456)

Migration Portal: Store and Client Care

Migration wizard

| Migration Steps |
|---|
| 1. Choose customer |
| 2. Choose migration services |
| 3. Download, backup and purge (old phone) |
| 4. Complete ESN change |
| 5. Download (new phone) |
| 6. Confirm subscription price changes |
| 7. Restore content |

Choose customer

To begin the migration, enter the MDN for the customer's existing device and confirm that the old phone is present, active and working.

Customer's MDN:

4085551212

Customer's device:

Motorola RAZR V3m

Submit

- Return to Sales and Service Portal

Done

Fig. 46

MightyBackup - Mozilla Firefox

File  Edit  View  History  Bookmarks  Tools  Help

Back  Address  http://  Go

Welcome, Jason (Sales ID: #123456)

Migration Portal: Store and Client Care

MDN being migrated: 123456789012345678901234

Migration wizard

| Migration Steps |
|---|
| 1. Choose customer |
| 2. Choose migration services |
| 3. Download, backup and purge (old phone) |
| 4. Complete ESN change |
| 5. Download (new phone) |
| 6. Confirm subscription price changes |
| 7. Restore content |

- Return to Sales and Service Portal

Confirm subscription price changes

The subscriptions below have a new price.
Review new prices with customer and uncheck
any subscriptions they do not want to continue.

☑ Applications (Subscriptions)
  ☑ Texas Hold'em Poker        Was $1.49 - Now $1.99
  (was No Limit Poker)
  ☑ XM Radio                   Was $1.49 - Now $1.99

Total difference: $1.00

[ Continue ]

Done

Fig. 47

METHOD AND SYSTEM FOR PROMOTING AND TRANSFERRING LICENSED CONTENT AND APPLICATIONS

RELATED APPLICATIONS

This application claims priority under 35 U.S.C. §119(e) of U.S. provisional patent application Ser. No. 60/995,789, filed Sep. 28, 2007, and entitled "METHOD AND SYSTEM FOR PROMOTING DIGITAL CONTENT," which is hereby incorporated by reference in its entirety.

This application is a continuation-in-part of co-pending U.S. patent application Ser. No. 12/011,399, filed on Jan. 25, 2008, and entitled "SYSTEM OF AND METHOD FOR BACKING UP CONTENT FOR USE ON A MOBILE DEVICE," which claims priority under 35 U.S.C. §119(e) of both U.S. provisional patent application Ser. No. 60/897,789, filed Jan. 26, 2007, and titled "CONTENT LOCKER, APPLICATION AND CONTENT BACKUP," and U.S. provisional patent application Ser. No. 60/937,314, filed Jun. 26, 2007, and titled "CONTENT LOCKER, APPLICATION AND CONTENT BACKUP," all of which are hereby incorporated by reference in their entireties.

This application is a continuation-in-part of U.S. patent application Ser. No. 12/151,440, filed on May 6, 2008 now U.S. Pat. No. 7,643,824, and entitled, "WIRELESS TELEPHONE DATA BACKUP SYSTEM," which is a continuation of U.S. patent application Ser. No. 10/789,816, filed on Feb. 27, 2004 now U.S. Pat. No. 7,505,762, entitled "WIRELESS TELEPHONE DATA BACKUP SYSTEM," both of which are hereby incorporated by reference in their entireties.

FIELD OF THE INVENTION

This invention is related to transmitting content to electronic devices. More specifically, this invention is related to systems for and methods of backing up content, restoring content, updating content, storing equivalent content, and offering content including licensed content for mobile devices such as mobile phones. This is able to involve the same device or multiple devices.

BACKGROUND OF THE INVENTION

Mobile devices and other electronic devices contain ever increasing content, with upgrades, equivalents, and other content created for them each year. Mobile devices, for example, store address books, licensed applications, user-generated content such as digital images, and third-party content such as ringtones, wallpaper, and music files, to name only a few types of content. Content is not easily restored or transferred when the device is deactivated. It is difficult for a user to remember what content was stored on the device, the correct version of the content for a particular device, or even where she acquired the content. Even if she can discover all this information, the process of restoring content to the new device is still time-consuming, error prone, and tedious, and in some cases, not possible.

When restoring content to a device, the user is also unaware of upgrades to content. Unknown to the user, a content provider may have released a new version of content or an equivalent, more popular version. The user misses an opportunity to get upgraded, more desirable content, and the content provider misses an opportunity to sell, license, or offer a subscription to new content.

Users face these same problems when upgrading to a new device or other device. The new device may require different versions of content: a simple transfer of content from the old to the new mobile device will not work.

Furthermore, due to licensing restrictions, when a user wants to transfer licensed content from one device to another, a simple backup and restore to the second device is not usually permitted.

SUMMARY OF THE INVENTION

In a first aspect of the present invention, a method of providing content to a mobile device includes determining a source of the content (e.g., a content provider) and transmitting the content from the source to a storage location accessible to the mobile device, such as directly on the mobile device. Preferably, the content is transmitted wirelessly. Mobile devices include, but are not limited to, mobile telephones, personal digital assistants, and personal computers. Content includes, but is not limited to, a mobile application program, a mobile ring tone, a mobile wallpaper, video data, audio data, a digital image, a ring back tone, or a combination of these. In some embodiments, only a list of paid application details is stored on the storage location instead of the actual applications. In some embodiments, when transferring user generated content, all of the content is transferred to a storage location.

In one embodiment, the method also includes storing on the mobile device a selectable link for accessing the content on the storage location and storing data that associates the source with the content, the mobile device, or both. This data is used to determine what content has been acquired for the mobile device and the source (e.g., one or more content providers) that can be accessed to retrieve the content. The data includes a pathname to the source, such as one containing a Uniform Resource Locator, and identifiers for the content itself. The data is parsed to determine the source and the content. Preferably, the data is stored on a system remote from the mobile device, so that when the mobile device retrieves the content it contacts the system, which communicates with the source to transmit the content to the mobile device.

In one embodiment, the source is determined by querying one or more locations for the content, such as third-party content providers. The content providers respond by transmitting the content (e.g., wirelessly) to the mobile device. In one embodiment, a single aggregation interface is used to automatically retrieve content from multiple sources.

In a second aspect of the present invention, a method of accessing content from a device includes selecting on the device a link to content stored on a storage system and automatically receiving the content on the device in response to selecting the link. The storage system is remote to the device and when the link is selected, a copy of the content is transmitted from the storage system to the device.

Preferably, the content is accessed by determining that the content is not stored on the storage system and then receiving the content on the storage system. As one example, content is determined to be on the storage system using a hash. A list containing the hash for each content on the storage system is maintained. If it is determined that a hash for desired content is not in the list, it is determined that the content is not on the storage system and must be retrieved from a content provider.

In a third aspect of the present invention, a method of offering content for a first device (e.g. a device a user was using and which contains stored information including licensed content) includes storing a history of acquisitions associated with one or more entities and displaying on the first device offers for content based on the history. The one or more entities correspond to a user, to a mobile device, or to both. In other words, offers can be based on what was acquired for a particular mobile device, for a particular user, or both. The offers are for purchasing, subscribing to, licensing, upgrading, or replacing content, or any combination of these, or stored on the network.

Content is updated, in part, by transcoding or resizing using content in the history. In one embodiment, the method also includes automatically receiving replacement or updated content on the first device. Preferably, the history is stored at a content provider location but can be stored at other locations. In some embodiments, only user generated content is transcoded.

In one embodiment, the method also includes polling the content provider location for an acquisition associated with the one or more entities, automatically receiving notification from the content provider location of an acquisition for the one or more entities, storing metadata about content acquired by the one or more entities, or any combination of these. The metadata includes a name for content, a description of content, a size of content, a format of content, an encoding of content, an author of content, or any combination of these. The history includes a count of license usages or other license-related information.

In a fourth aspect of the present invention, a method of offering content for a second device (e.g. a device a user is switching to such as a newly purchased device) includes displaying a first list of content acquired for one or more entities and transmitting one or more items in the first list to a first mobile device. Preferably, from this first list, one or more of the items are selected for storing on the second device.

In one embodiment, the first list is automatically transmitted to the first mobile device. The first list is displayed, and one or more items are selected from it and transmitted to the first mobile device from a location remote to the first mobile device. The method also includes selecting a second list of mobile devices and transmitting the one or more items to the mobile devices in the second list. The first list is generated from a history of acquisitions. In some embodiments, the content list is generated for the second device based on the content on the first device and/or other data on the network such as a user's buying history and/or what his contacts have purchased.

In a fifth aspect of the present invention, a method of configuring a device includes constructing from a first device a link to content on a storage system and storing the link on a second device. Thus, the second device is configured to access the same content available to the first device. Preferably, storing the link includes storing data for selecting the content. The link, the content, or both are wirelessly transmitted from the storage system to the second device during an initial configuration of the second device. Alternatively, the link, the content, or both are stored on the second device at predetermined time intervals.

In a sixth aspect of the present invention, a mobile device includes a client module containing a link and programmed to access content using the link, preferably wirelessly. The client module is programmed to display icons for selecting replacement content for replacing content acquired for the mobile device. The replacement content includes an upgrade to content acquired for the mobile device or a different version of the content acquired for the mobile device or similar content.

In a seventh aspect of the present invention, a content management system for a mobile device includes a first content module containing content and a delivery interface programmed to transfer content from the content module to a mobile device. The delivery interface is programmed to transfer content from the content module to a mobile device using a link to the content accessible to the mobile device.

The system also includes a list of acquired content, a replacement module for mapping acquired content to replacement content, and an interface programmed to receive content from one or more sources and to poll the one or more sources to determine content acquired from the one or more sources. The interface includes a connection module for connecting to sources using Uniform Resource Indicators to the one or more sources. In one embodiment, the system also includes a parser for parsing the content to thereby determine the one or more sources. Preferably, the one or more sources are third-party sources.

In one embodiment, the system also includes an offer module for generating offers for replacement content on the mobile device. The offer module is programmed to transmit data associated with the offers to the mobile device and the mobile device is programmed to display and select the offers. The offer module is also programmed to generate the offers from a history of acquisitions for one or more entities such as users or mobile devices.

Preferably, the system also includes a metadata store containing metadata about content. Metadata includes information indicating a manufacturer of a mobile device, a version of a mobile device, operating capabilities of a mobile device, or any combination of these. The device capabilities include a screen size, a screen type, a number of pixels, Operating System (OS) type, OS version and other device capabilities.

In one embodiment, the system also includes a Web-based interface coupled to the content manager and programmed to manage the content, a multimedia content data store, a user-generated content data store, and an application data store.

In another aspect, a method of promoting the purchase of digital content configured for a particular type of wireless device comprises selecting a promotional offer from a database of promotional offers configured to the particular wireless device type and offering digital content related to the promotional offer to a user.

In another aspect, a method of acquiring promoted digital content configured for a particular type of wireless device comprises displaying one or more content promotional offers to a user, providing an interface allowing a user to select any of the one or more promotional offers and responsive to the user selecting any of the one or more promotional offers, acquiring related content from one or more content datastores and associating the content with an account of the user.

In yet another aspect, a method of promoting digital content to a user of a backup implementation during the restore operation of the backup implementation comprises initiating a data restoration process, in relation to the restore process, determining one or more promotional offers to be made available to the user, during the restore process, presenting the promotional offers to the user and presenting a user interface on a device allowing the user to choose promotional content to acquire.

In another aspect, a method of promoting digital content to users of a synchronization implementation comprises determining one or more items of digital content to offer a user, on devices participating in the synchronization implementation, retrieving promotional offers from the synchronization implementation, displaying the promotional offers to the user and allowing the user to make a selection of content to acquire and synchronizing the content to a device of the user.

In another aspect, a method of managing migrating digital content from a first wireless device to a second wireless device comprises presenting a user interface, the user interface displaying one or more steps to be performed to transfer user content from the first wireless device to the second wireless device, in response to use of the user interface, making a backup application available to the first mobile device, initiating a backup process on the first mobile device, in response to use of the user interface, making a restore application available to the second mobile device and initiating a restore process on the second mobile device.

In another aspect, a device for promoting the purchase of digital content configured for a particular type of wireless device comprises a first module for selecting a promotional offer from a database of promotional offers configured to the particular wireless device type and a second module for offering digital content related to the promotional offer to a user. In some embodiments, the promotional offers are shown only on the second device.

In yet another aspect, a system for managing migrating digital content from a first wireless device to a second wireless device comprises a user interface configured for displaying one or more steps to be performed to transfer the digital content from the first wireless device to the second wireless device, a backup application available to the first mobile device, the backup application for backing up the digital content and information related to the digital content and a restore application available to the second mobile device, the restore application configured for restoring the backed up digital content and additional content based on the information related to the digital content and other information.

In another aspect, a system for migrating digital content comprises a first device, a server operatively coupled to the first device, the server for storing and promoting digital content and a second device for receiving the digital content from the server interfaces to content provider systems.

BRIEF DESCRIPTION OF THE DRAWINGS

FIG. 13 shows user data stored at a content provider in accordance with one embodiment of the present invention.

FIGS. 28-33 illustrate an exemplary web page in accordance with embodiments of the present invention.

FIG. 46 illustrates a web page presenting an exemplary migration portal in accordance with embodiments of the present invention.

FIG. 47 illustrates a web page where the migration portal is at the step of confirming subscription price changes.

DETAILED DESCRIPTION OF THE PREFERRED EMBODIMENT

Embodiments of the present invention are directed to restoring, updating, and offering content on electronic devices/computing devices, including but not limited to mobile telephones, cellular telephones, wireless telephones, personal digital assistants, personal computers, laptop computers, gaming consoles, and the like.

In some embodiments, a transfer is from a first device and a second device. The first device and the second device do not have to be the same type of device, and even if they are the same type of device, they do not have to be the same make and model of device. In some embodiments, a transfer occurs only on one device, similar to a backup and restore on that device. In some embodiments, licensed or subscribed digital content is able to be transferred and managed across n number of devices.

Different embodiments of the present invention are able to restore content to an electronic device in different ways. In one embodiment, a link to content is stored on a mobile device, allowing the mobile device to automatically access multiple content stored at one or more remote (e.g., third-party) locations. In this way, content is accessed and stored on the mobile device only when needed, thus using memory on the mobile device more efficiently.

Other embodiments ensure continued access to subscribed content, even when the mobile device is deactivated. For example, when a mobile device is deactivated and then reactivated, or when service to one mobile device is migrated to another mobile device, the user is able to seamlessly restore access to the subscribed content.

Other embodiments allow a user to substitute content on a mobile device. As one example, when a mobile device is reactivated, the mobile device is restored with an upgrade of content previously stored on the mobile device or its equivalent. The content provider thus increases its opportunities to sell to customers content or subscriptions to content, and gives customers opportunities to get the latest version of content.

In general, the present invention ensures the integrity of customer purchase data, restores already purchased content when a handset is restored, provides customers the opportunity to upgrade applications previously stored on a handset, conserves bandwidth since content is transferred only when restored on a handset, and allows users to transfer content, upgrades, or equivalent content on new handsets. Content includes, but is not limited to, address book contact data, user-generated pictures and sound recordings, ringtones, wallpapers, videos, call logs, SMS messages, MMS messages and application data such as bookmarks, purchased or subscribed from third-party content providers, and Binary Runtime Environment for Wireless (BREW) applications purchased through a Content Provider BREW mobile shop.

Figure 1:
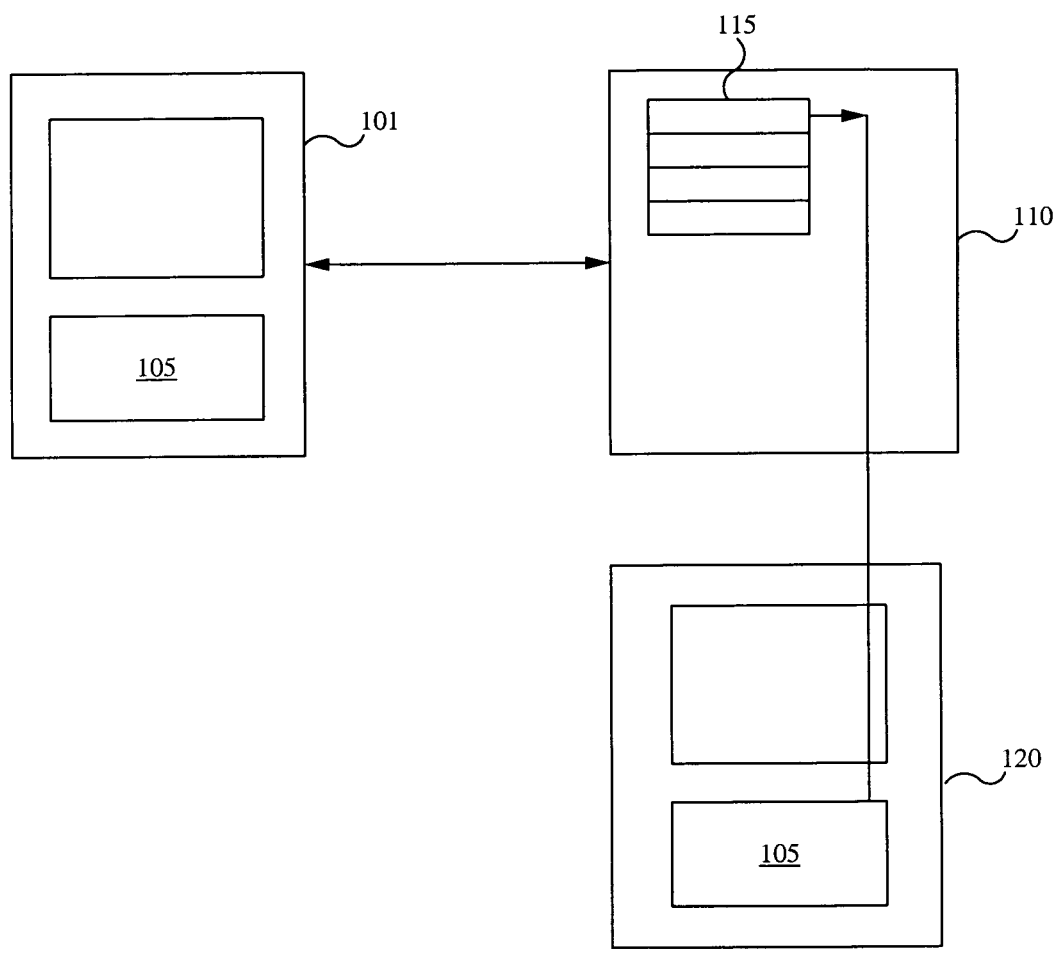
FIG. 1 shows a mobile device, a platform for restoring content, and a content provider in accordance with one embodiment of the present invention.

FIG. 1 is a high-level diagram of components of a system in accordance with one embodiment of the present invention. The system includes a mobile device 101 coupled to an intermediate platform 110, which in turn is coupled to a content provider 120. The mobile device 101 contains both user-generated and other content 105, such as ringtones, calendars, video images, audio data, wallpaper, and so on. The platform 110 stores a user record 115 that contains metadata and a link to the content 105 at a content provider 120. When the mobile device 101 must restore content 105, such as when it is reactivated or initialized, it notifies the platform 110. The platform 110 contacts the content provider 120, identifying the mobile device 101 and, using the link to the content 105, the content 105. The content provider 120 then transmits the content 105 to the mobile device 101, which restores the content 105.

During device set up, a user purchases or otherwise acquires content for the mobile device 101. When the purchase is made, the user record 115 is added to the platform 110, and the content provider 120 records that the user (identified, for example, by the telephone number of the mobile device or make and/or model of the device) has purchased the content. Any license usage counts are initialized at this stage, so that the user is able to retrieve the content 105 only the allowed number of times. An icon is stored on the mobile device 101 to access the platform 110 and thus ultimately the content provider 120, as described herein.

Advantageously, the platform 110 does not require extra storage for the content 105, storing only links to it. Preferably, content is stored at a content provider, from which the content is retrieved. This structure allows the content provider to keep track of and notify the user that updates and equivalent content, which are generally under the control of the content provider, are available. The content provider 120 is also able to substitute equivalent or updated content when available. In alternative embodiments, the content 105 is stored on the platform 110, from where it is transmitted to the mobile device 101. In some embodiments, the mobile device 101 is able to install an application or other digital content on the mobile device 101 using the links.

Figure 2:
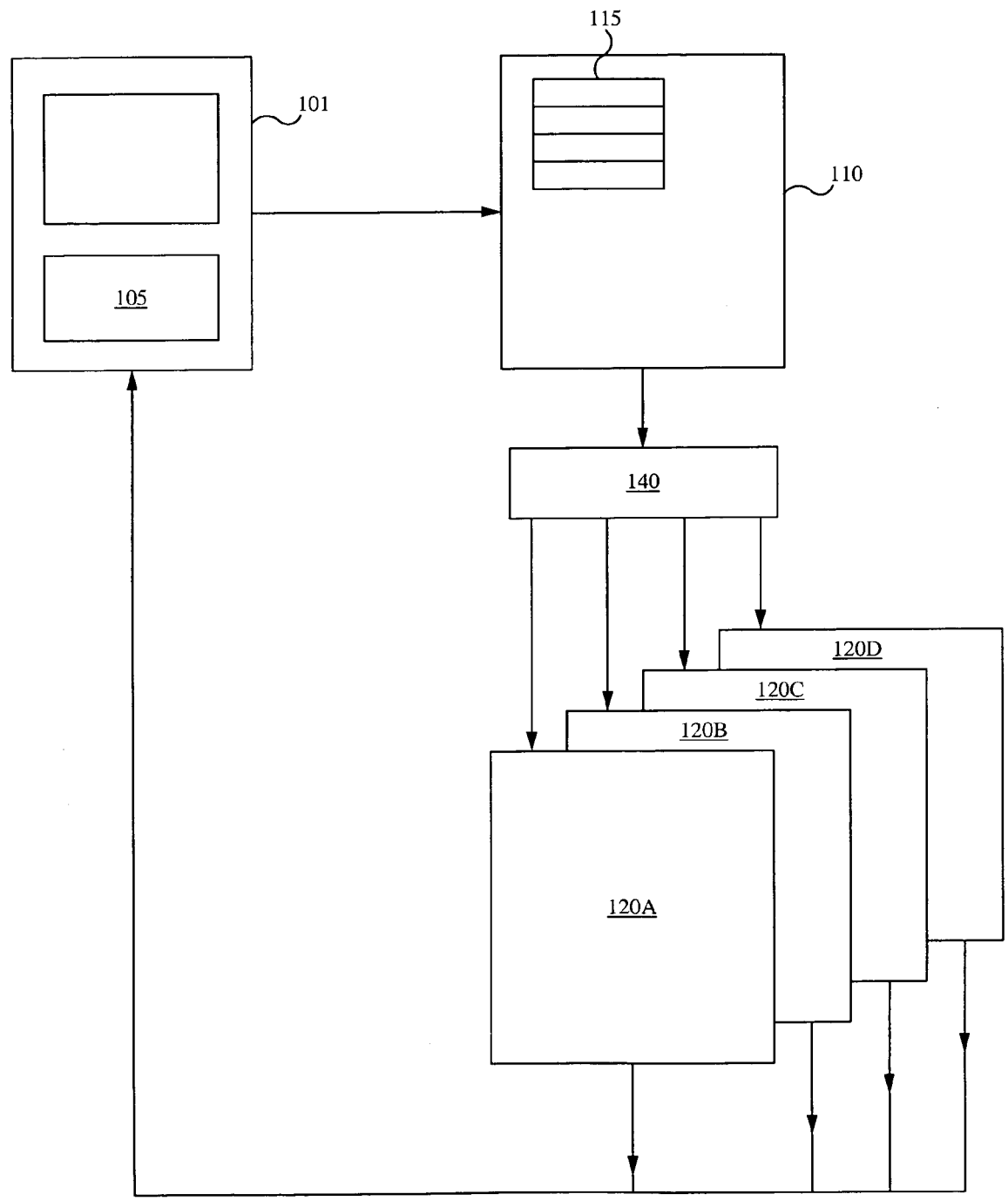
FIG. 2 shows a mobile device, a platform for restoring content, and multiple content providers in accordance with one embodiment of the present invention.

While FIG. 1 shows the mobile device 101 and platform 110 coupled to a single content provider, it will be appreciated that the mobile device 101 is able to contain content acquired from and thus to be restored by multiple content providers. Thus, FIG. 2 shows a system in which the mobile device 101 and platform 110 are both coupled to multiple content providers 120A-D, which all function similarly to the content provider 120 in FIG. 1. It will also be appreciated that while FIG. 1 shows a single user record 115, the platform 110 will generally store multiple user records, for multiple users.

Preferably, the platform 110 is coupled to the multiple content providers 120A-D through an aggregator 140, which receives a request for content from the platform 110 and routes the request to the appropriate one of the multiple content providers 120A-D containing the content sought. Alternatively, the aggregator 140 queries all content providers 120A-D, and the one content provider hosting the content sought transmits it to the mobile device 101. In a preferred embodiment, the aggregator 140 is part of the platform 110; in an alternative embodiment, the aggregator 140 and the platform 110 are separate components.

It will be appreciated that although FIGS. 1 and 2 show lines directly connecting the components (e.g., directly connecting the mobile device 101 to the platform 110), the components are preferably coupled over a wireless network, or are coupled over a wide area network such as the Internet, over a local area network, cable or any combination of these.

Figure 3:
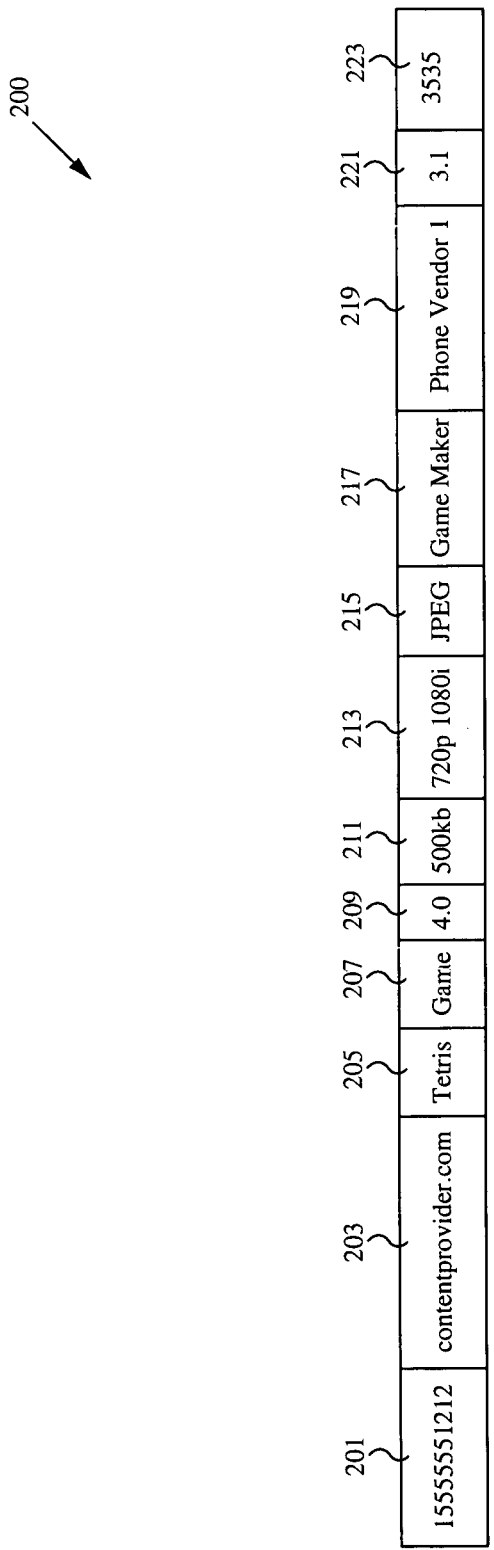
FIG. 3 shows metadata stored on the platform in FIGS. 1 and 2 and used to locate and restore content in accordance with the present invention.

FIG. 3 shows the user record 115 according to one embodiment of the present invention. The user record 115 contains an identifier of the mobile device 201 (the device number, 15555551212), a uniform resource locator (URL) of the content provider 203 (contentprovider.com), a name of the content 205 (Tetris), a classifier of the content 207 (game), a version number of the content 209 (4.0), a size of the content 211 (500 kB), a format for displaying the content on the mobile device 213 (720p 1080i), an encoding scheme for the content (JPEG) 215, an author of the content 217 (GameMaker), an identifier of the mobile device 219 (PhoneVendor1), a model of the mobile device 221 (3.1) and a catalog id 223 (3535). In some embodiments, the user record 115 also contains a device make, an operating system type/version, a screen resolution, a type of keyboard or input device and/or an operator. Those skilled in the art will recognize that the user record 115 is able to contain other metadata, a subset of the metadata shown in FIG. 3, or any combination of metadata suitable for identifying the content and communicating with the content provider 120 to transmit the content to the mobile device 101. In operation, the platform 110 parses the user record 115 to determine the source (e.g., URL 203) of the content provider from which the content is retrieved for storing on the mobile device 101.

Figure 4:
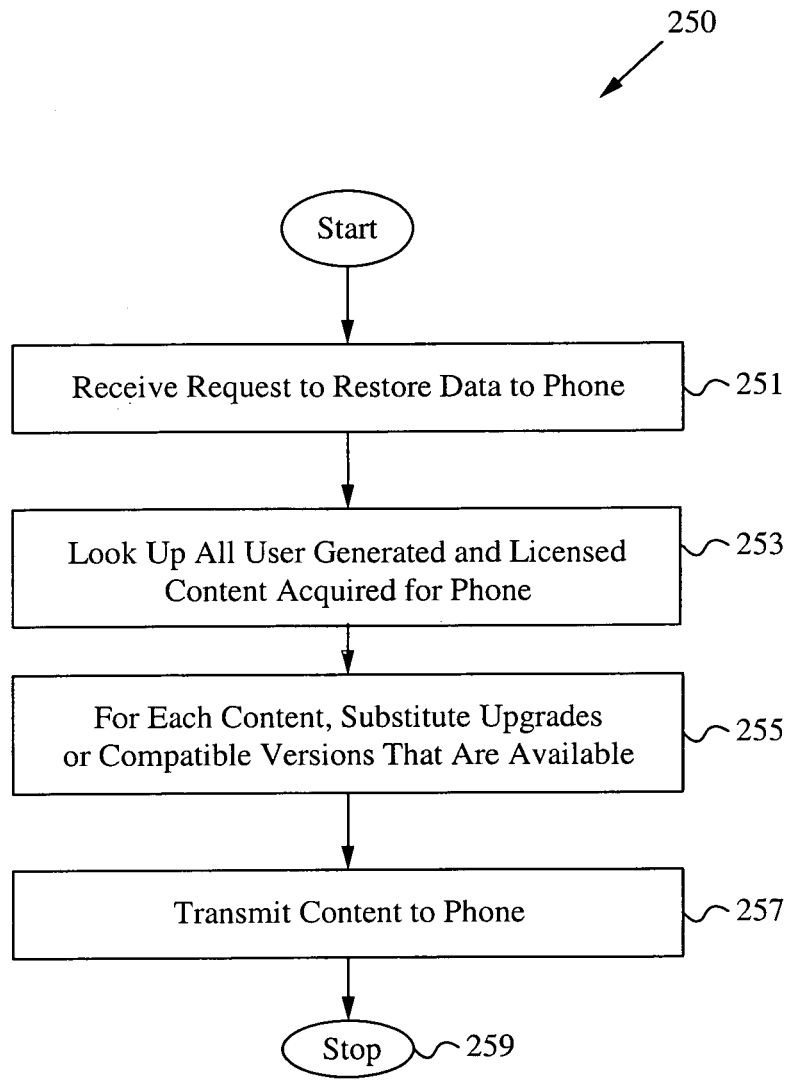
FIG. 4 is a flowchart showing the steps in a process for restoring content to a mobile device in accordance with one embodiment of the present invention.

As discussed above, in one embodiment, the aggregator 140 of FIG. 2 polls the content provider locations 120A-D to determine whether they contain content to be restored to the mobile device 101. FIG. 4 shows the steps 250 that each content provider location 120A-D takes in response to the polling. Referring to the exemplary content provider location 120A, first, in the step 251, the content provider 120A receives a request to restore content to the mobile device 101. Preferably, the request includes the telephone number of the mobile device 101; alternatively, the request includes some other identifier of the mobile device 101 or some identifier of the user of the mobile device. In the step 253, the content provider 120A looks up all the content that has been acquired for the mobile device 101. In some embodiments, the content includes user generated content and/or licensed content registered for a user. In the step 255, the content provider 120A determines whether any upgrades are available for the acquired content and substitutes upgrades or comparable versions when available. In the step 257, the content provider 120A transmits the content (including upgrades, if available) to the mobile device 101. The process ends in the step 259. It will be appreciated that new content may be resized, reformatted, or otherwise changed to ensure that it performs or is displayed properly on the mobile device 101.

Figure 5:
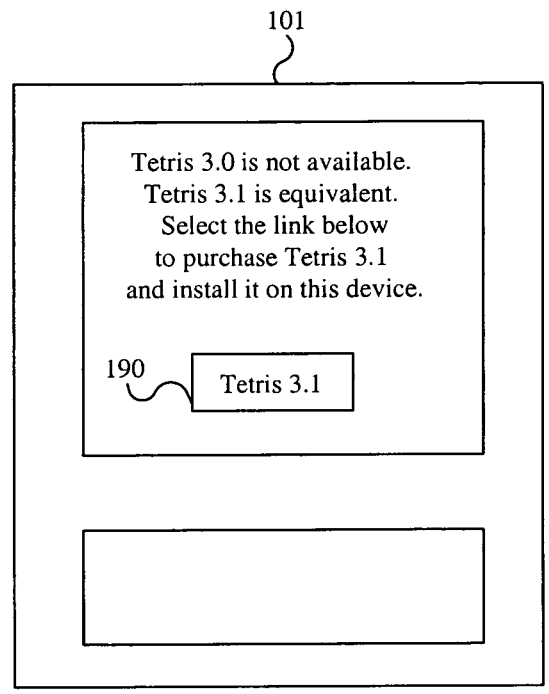
FIG. 5 shows a display on a mobile device, allowing a user to store equivalent content on the mobile device in accordance with one embodiment of the present invention.

In other embodiments, discussed below, if neither previously acquired content nor an upgrade is available, equivalent content is transmitted to the mobile device 101 in the step 257. In still other embodiments, the user of the mobile device is given the option of acquiring an upgrade or equivalent content. FIG. 5 shows the mobile device 101, with a display offering content equivalent to what was previously acquired for the mobile device 101 (Tetris 3.1) and a selectable link 190 for acquiring the equivalent content.

Figure 6:
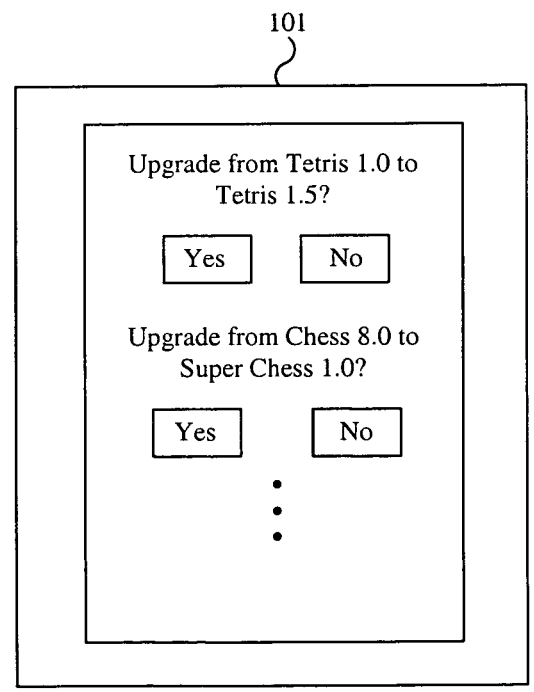
FIG. 6 shows a display on a mobile device, allowing a user to upgrade content on the mobile device in accordance with one embodiment of the present invention.

FIG. 6 shows the mobile device 101 offering a list of upgrades, which the user has the option of accepting or declining. Optionally, the user is able to pick and choose to restore paid and unpaid content.

Figure 7:
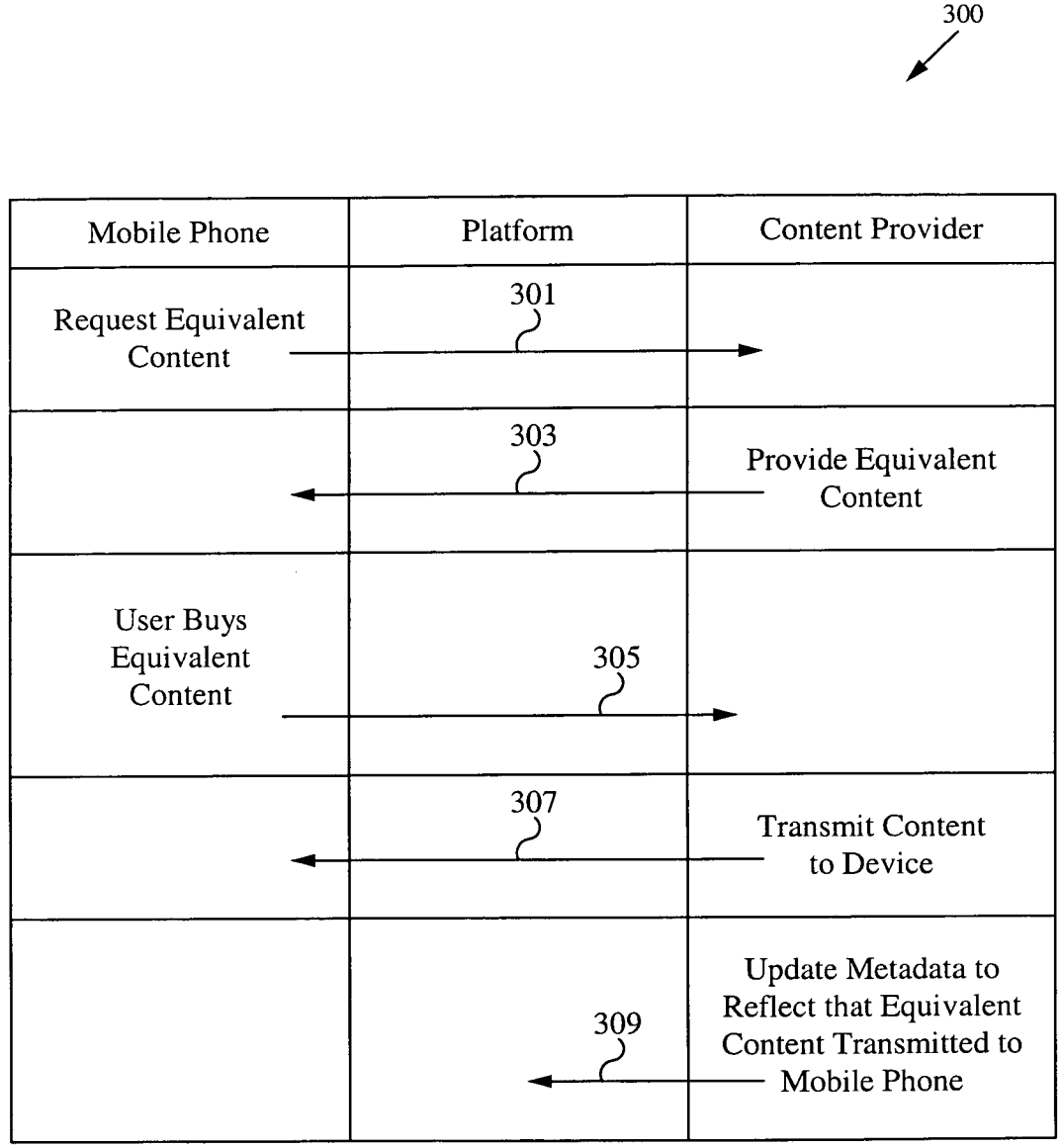
FIG. 7 is a sequence diagram showing the steps for acquiring equivalent content in accordance with one embodiment of the present invention.

FIG. 7 is a sequence diagram 300 showing user data (e.g., metadata) on the platform 110, updated when equivalent (or upgraded) content is transmitted to the mobile device 101. Preferably, the user is presented on the mobile device 101 with a list from which she can select equivalent content. After selecting equivalent content, in the step 301, the mobile device 101 transmits to the content provider 120 a request for particular equivalent content. In the step 303, the content provider 120 transmits the equivalent content to the mobile device 101. In some embodiments, in the step 305, the user buys the equivalent content. In some embodiments, in the step 307, the equivalent content is transmitted to the device 101. In the step 309, the content provider 120 transmits information (e.g., metadata) to the platform 110 to reflect that the mobile device 101 has now acquired the equivalent content (e.g., the previously acquired content has been replaced). The user record (FIG. 3) is then updated to reflect that equivalent content has been acquired.

The system must ensure that equivalent or other replacement content is selected so that it is compatible with the mobile device. Thus equivalent content must be selected so that its purpose, binary, image size and device form factor, and its encoding format are all suitable for the mobile device (e.g. a Tetris game). To this end, content providers (or intermediate platforms) maintain mapping databases that map content suitable for one device to content suitable for another device.

Preferably, a history of purchases, subscriptions, and other acquisitions are generated for the mobile device 101. As discussed below, this history is used to determine upgrades or equivalent content for the content acquired for the mobile device 101. Based on this history, the user of the mobile device 101 is offered upgrades, equivalent promotional content for content previously acquired for the mobile device 101, as well as offers for content similar or related to previously purchased content.

Figure 8A:
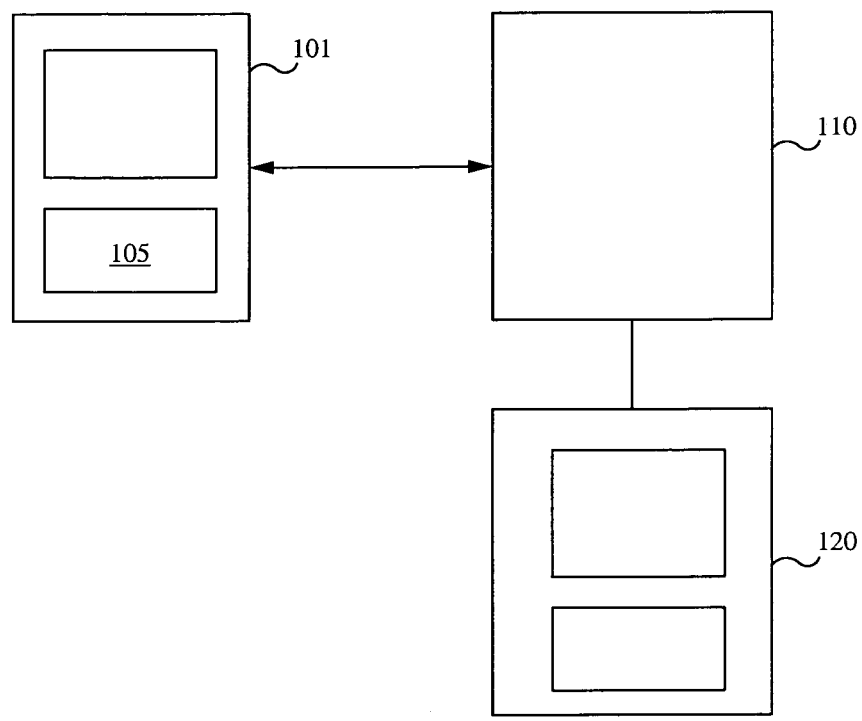
FIGS. 8A and 8B show transferring links to content from one mobile device to another in accordance with one embodiment of the present invention.
Figure 8B:
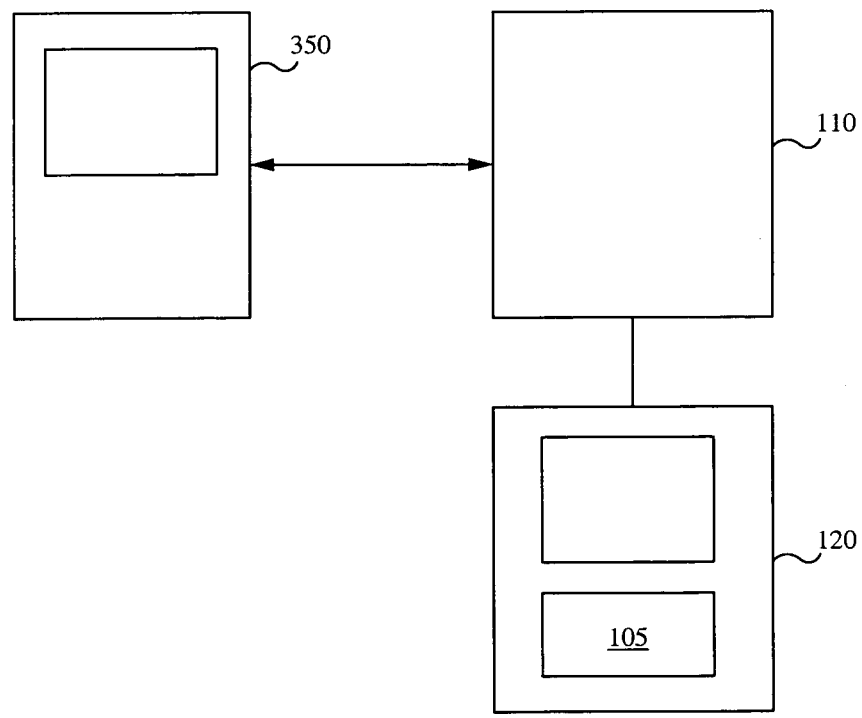

It will be appreciated that embodiments of the present invention are able to be used, not only to restore content to a mobile device, but also to migrate content from one mobile device to another. Thus, for example, a user may upgrade his mobile device and wishes to transfer content from the mobile device to a new one. FIG. 8A shows mobile device 101 coupled to the platform 110, which in turn is coupled to the content provider 120. FIG. 8B shows a mobile device 350, an upgrade of the mobile device 101, coupled to the platform 110 and the content provider 120. In one embodiment, when application on the mobile device 350 is first activated, it automatically communicates with the platform 120. The platform 120 is programmed to recognize that the mobile device 350 is an transfer of the mobile device 101 and performs the steps of "restoring" content previously acquired for the mobile device 101 to the mobile device 350, such as described above. This may occur because, for example, the mobile device 350 is given the same phone number as the mobile device 101. Alternatively, the user of the mobile device 350 identifies herself to the platform 110 and initiates "restoration" of content, such as described above.

Figure 9:
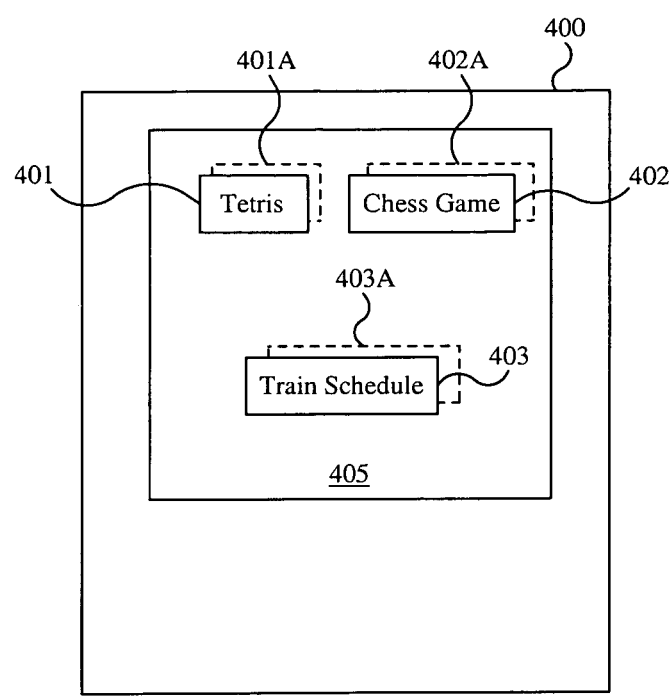
FIG. 9 shows a display on a mobile device and icons of different content and the corresponding links for acquiring the content in accordance with one embodiment of the present invention.

In still other embodiments of the invention, a mobile device is programmed to store content efficiently. In one embodiment, rather than store links to content on a remote platform (e.g., platform 110, FIG. 1), the mobile device itself stores links to content. Preferably, the content is accessed using one or more icons displayed on the mobile device. FIG. 9 shows a mobile device 400 in accordance with one embodiment of the invention. The mobile device 400 includes a display screen 405 showing icons 401 (Tetris), 402 (Chess game), and 403 (Train schedule). Each icon 401-403 has an associated link, 401A-403A, respectively, such that when one of the icons 401-403 is selected, its associated link is accessed, thereby connecting the mobile device 400 to a content provider associated with the selected content (e.g., a third-party content provider) to trigger the content provider to download the content to the mobile device 400.

As one example, the link 401A (which allows only the user to download/acquire content) associated with the icon 401 is the URL, contentprovider.com/tertris/4.0/x3535, which contains the Web address of the content provider (contentprovider.com), the name of the content to be retrieved (Tetris), the version of the content (4.0), and the content id (x3535). When contacted, the content provider parses this URL, determines what content to store on the mobile device 400, and then, using the phone number of the mobile device, transmits the content to the mobile device 400. Preferably, once the content is no longer used on the mobile device 400 (e.g., the application is closed), it is removed (in some embodiments, by a server-side application) from the mobile device 400. In this way, because the mobile device 400 does not persistently maintain all the content it has access to, it can access content larger than its available memory.

In an alternative embodiment, once the content is retrieved from the content provider, it is stored on both the mobile device 400 and on an intermediate storage location. In this way, any future retrieval of the content (which may be deleted on the mobile device after use) is from the intermediate storage location, which functions as a proxy server. In this embodiment, the link 401A is updated to refer to the intermediate storage location.

In one embodiment, the content is not automatically deleted from the mobile device after it is used. Instead, the content remains on the mobile device for future use. Again using the icon 401 and its associated link as an example, when the icon 401 is selected, the mobile device 400 is programmed to first determine whether the associated content is available on the mobile device 400. Preferably, the mobile device 400 stores a hash of the content as part of the metadata about the content. The mobile device 400 compares this hash against the hashes of all other content stored on the mobile device 400. If the mobile device 400 determines that it does not contain the content, it will retrieve the content from the content provider, as described above. Alternatively, the content is stored on an intermediate platform, which stores and uses a hash to determine available content in a similar manner. In some embodiments, an SP server negotiates compatible content with content providers. Once the relevant content is available, the list is shown on the device. When a user clocks on a link, the content is downloaded from the content provider. The content provider then updates the SP server after the download is complete.

It will be appreciated that features of each embodiments described in this application can be used on other embodiments. For example, the link 401A is able to include metadata similar to the metadata 200, which also contains an address of a third-party content provider (element 203). Similarly, when updating or changing mobile devices, the icons 401-403 and associated links 401A-403A are all able to be transferred to the new mobile device. This may occur during an initial configuration of the new mobile device.

Use Case Diagrams

Figure 10:
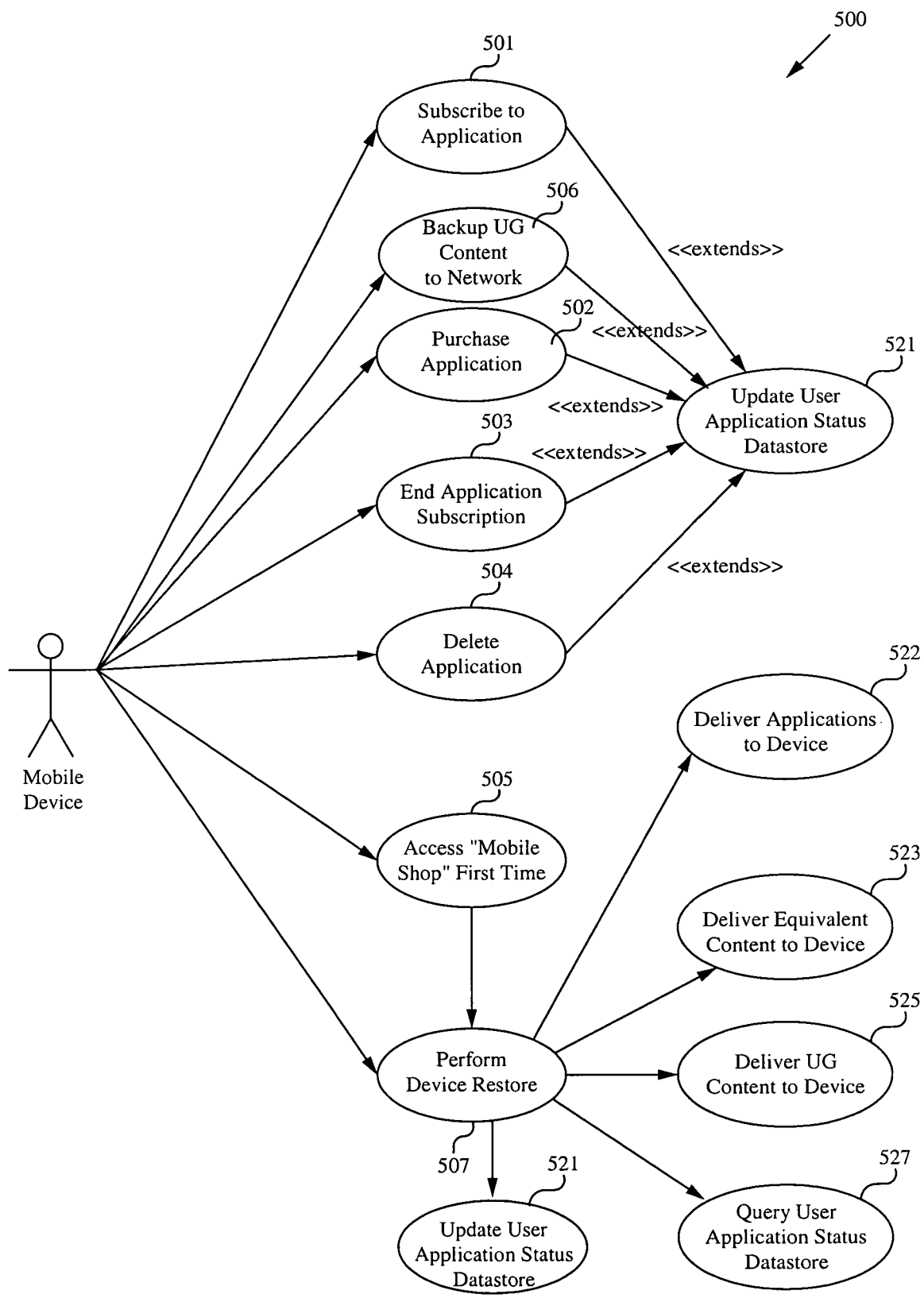
FIG. 10 is a use-case diagram for restoring/acquiring content in accordance with one embodiment of the present invention.
Figure 11:
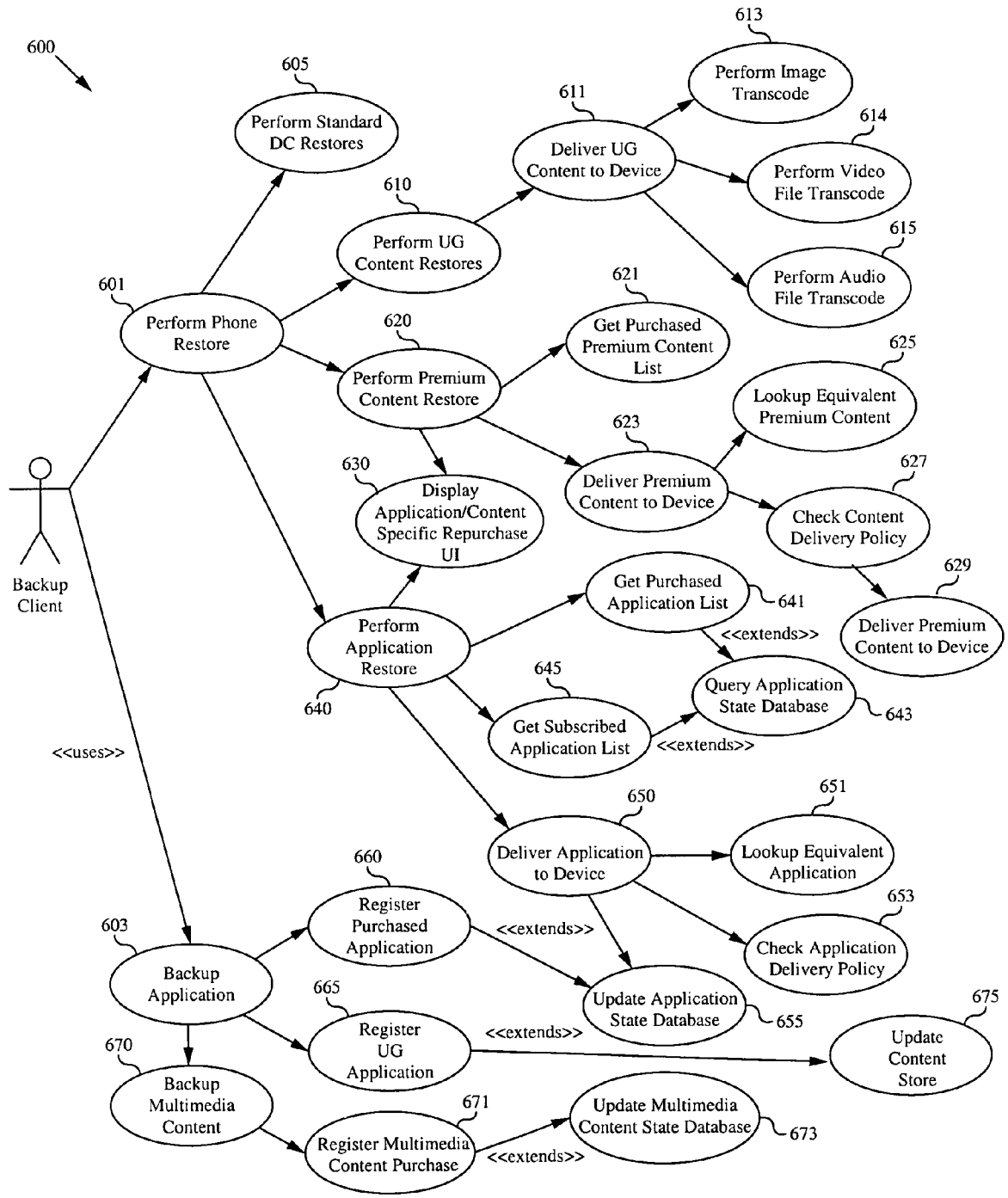
FIG. 11 is a use-case diagram for backing up content in accordance with one embodiment of the present invention.

FIGS. 10 and 11 are use-case diagrams 500 and 600, respectively, used to model backing up and restoring content in accordance with embodiments of the present invention. The use-case diagrams shown in this application use the well-known labels "uses," "extends," and "includes." To make the diagrams more readable, cases that use the relationship "uses" are left unlabeled.

Referring to FIG. 10, a mobile device is able to subscribe to an application 501, purchase an application 502, end an application subscription 503, delete an application 504, access a "mobile shop" for the first time 505, back up user generated content to the network 506 and perform a device restore 507. All of the cases 501-504 and 506 are able to be extended to update a user application status datastore 521. The case of performing a device restore is also able to deliver applications to the device 521, deliver equivalent content to the device 523, deliver user-generated (UG) content to the device 525, and query a user application status datastore 527. From the case of accessing a mobile shop for the first time 505, the system is also able to perform device restore 507 and then update a user application status datastore 521.

As illustrated in FIG. 10, any application or content purchase or subscription is reported to and maintained in the backup system datastores. When a restore is initiated, the subscribed applications, application settings, purchased multimedia content, and user-generated content are restored to the mobile device, as described herein.

One popular trigger for a mobile device restore is the initiation of the on-device mobile shop. The mobile shop application can be configured to launch the restore process when it is launched for the first time on a device. Alternatively, a stub application may be preloaded onto the device. The stub application will launch shortly after the mobile device is activated and provisioned and will prompt the user to restore applications and purchased content.

Any business logic desired may be implemented in the client: application or content-specific rules may be applied and an appropriate user interface displayed to the user. Examples of these rules and user-interfaces include automatic no-fee download and installation of subscription-based applications, reduced-fee "repurchases" prompt for pay-per-download applications and content, no-fee download of operator-determined number of previously purchased ringtones, special reduced fees for particular previously purchased ringtones, reminders about previously downloaded but deleted applications, offers to continue previously initiated but subsequently canceled application subscriptions, simple reminders (or recommended alternative applications) detailing what content the user had previously, introduce trial and preview applications.

FIG. 11 is a high-level use case diagram 600 for application and content backup and restore. As shown in the use-case diagram 600, a client is able to restore a device 601 and backup an application 603. A device can be restored by restoring standard data 605, restoring user-generated content 610, restoring premium content 620, and restoring applications 640. User-generated content restores 610 can be restored by delivering user-generated content to a device, which in turn performs image transcoding 613, video file transcoding 614, and audio file transcoding 615.

Premium content is restored 620 by getting a purchase premium content list 621, delivering premium content to the device 623, and displaying application and content specific repurchase user interface 630. Premium content is delivered to the device 623 by looking up equivalent premium content 625 and by checking a content delivery policy 627 and then delivering premium content to the device 629.

An application is restored 640 by displaying an application and content specific repurchase user interface 630, getting a purchased application list 641, getting a subscribed application list 645, and delivering the application to the device 650. Both the cases of getting a purchased application list 641 and getting a subscribed application list 645 are extended by querying the application state database 643.

Applications are delivered to a device 650 by looking up equivalent applications 651, checking the application delivery policy 653, and updating the application state database 655.

An application is backed up 603 by registering a purchased application 660, registering a subscribed application 665, and backing up multimedia content 670. A purchased application is registered 660 and a subscribed application is registered 665 by updating a content store 675. Multimedia content is backed up 670 by registering multimedia content purchase, which is extended by updating the multimedia content state database 673.

Figure 12:
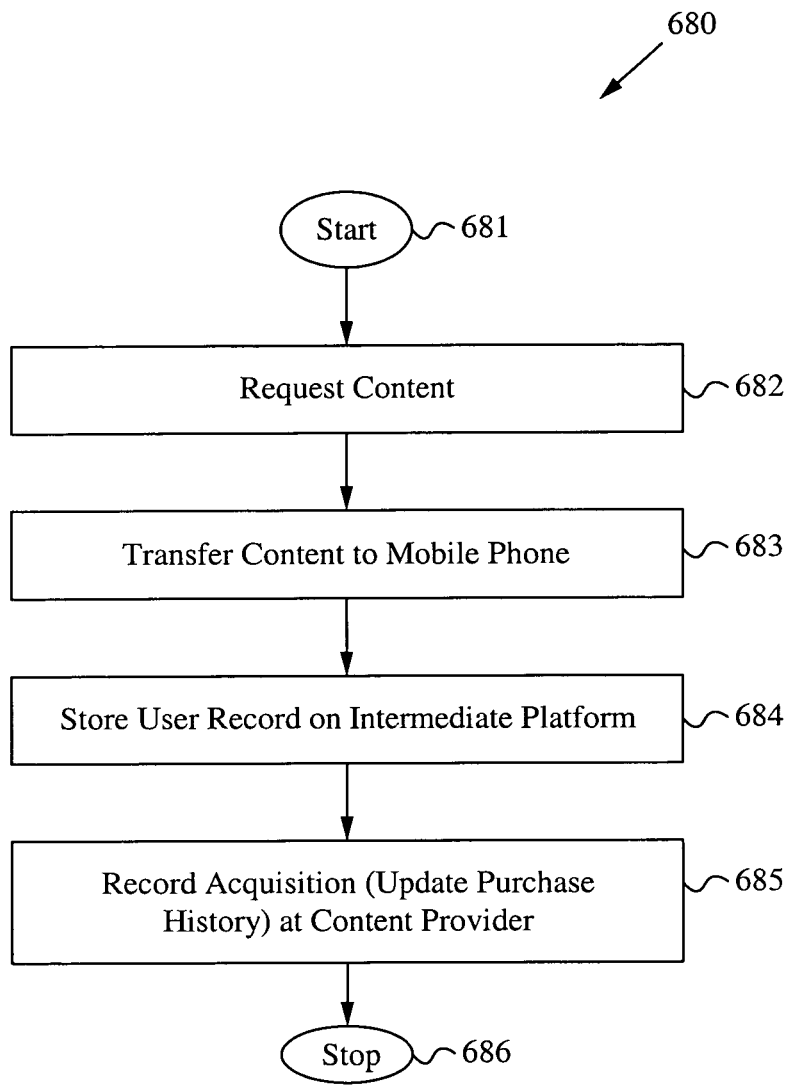
FIG. 12 shows the steps of purchasing content, transferring content, storing information for restoring content in accordance with one embodiment of the present invention.

FIG. 12 shows the steps 680 of a process for acquiring content (e.g., purchase, license, etc.) for a mobile device in accordance with one embodiment of the present invention. Referring to FIGS. 1 and 12, the process starts in the step 681, and in the step 682, the content is requested. In the step 683, the content is transferred from the content provider 120 to the mobile device 101. In the optional step 684, the user record 115 is stored on the intermediate platform 110. In the step 685, the content provider 120 records the acquisition (along with other acquisitions for the mobile device 101), used to later restore the mobile device 101. In one embodiment, the acquisition is recorded in an acquisition table, such as shown in FIG. 13. The process ends in the step 686.

FIG. 13 shows an "acquisition table" 690 maintained at the content provider 120 in accordance with one embodiment of the present invention. The acquisition table 690 contains a history of a user's past acquisitions for the mobile device 101. Individual purchases are stored in individual records of the acquisition table 690. When the content provider 120 is later polled, the acquisition table 690 can be used to determine what content the content provider 120 provided to the mobile device 101, and thus what content (or equivalents or upgrades) is to be restored to the mobile device 101.

The acquisition table 690 includes rows 691-694. The row (also referred to as a "record") 691 is used, among other things, to identify the mobile device 101. The record 691 contains a telephone number 691A (15555551212) of the mobile device 101, a name (e.g., owner) 691B associated with the mobile device ("Joe Smith"), an Internet address 691C associated with the mobile device "Address@domain.com") and a user or device identification ("3535"). The telephone number 691A, the Internet address 691C, or both can be used to transmit content to the mobile device 101 in accordance with the present invention.

The records 692-694 all contain information about previously acquired content. For example, the record 692 indicates that the game Tetris (692A), version 3.0 (692B), for the device brand Phonemake, Model 1 (692C) with a subscription 1 (692D) was acquired for the mobile device 101. Thus, for example, when Tetris 3.0 is purchased for the mobile device 101, the record 692 is added to the acquisition table 690. In a similar manner, the record 693 indicates that Chessgame (693A), version 1.0 (693B), for the device brand Phonemake, Model 2 (693C) with a subscription 2 (693D) was acquired; and the record 694 indicates that the application "Train schedule" (694A), version 3.0 (694B), for the device brand Phonemake, Model 3 (694C) with a subscription 3 (694D), was also acquired. Subscription details include billing method, acquisition date, expiration date and other information.

It will be appreciated that the acquisition table 690 is only illustrative. Those skilled in the art will recognize that acquisition tables containing other information can also be used in accordance with the present invention.

Hardware Components

FIGS. 14-17 show components used to implement embodiments of the present invention. Some of these components are described below.

Backup Client

The backup client is preloaded on the mobile device and is programmed to implement the client-side business logic required for an application and content backup and restore system. The client's primary function is to present a user interface to the user which allows the user to backup content on the device, and in the case of a device migration or new device, data loss, retrieve the content to the new device.

Content Delivery Interface

This is a server-side interface that provides programmed retrieval of the applications and premium content from a server-side database. Preferably, HTTP with a simple protocol encoded in it is used. The interface may also use opaque tokens, such as used with the Application/Multimedia Purchase and Restore Manager. Preferably, this interface is also be programmed to parse metadata to determine the source of content.

Application/Multimedia Purchase and Restore Manager

This manager interfaces with the application billing system to determine which applications a user has purchased, subscribed to, or both, what equivalent application is appropriate for a given device, and a mechanism to push that application to the backup client. Preferably, this manager generates data for offers of new content from user purchase histories enables download, and transmits these offers to the backup client. Preferably, the Restore Manager communicates with the mobile device using a wireless protocol such as Wireless Application Protocol (WAP).

Equivalent Application Mapping Datastore

An extended version of the currently available datastore, which shows which applications supersede existing applications, and which application binary is appropriate for a given mobile device. Preferably, the mapping database is populated by entries from the content providers when they submit content for inclusion on the application/content catalog and may be updated as new versions of applications are provided for new platforms. This could also be a "proxy" to a number of content provider's data stores.

"Equivalent Multimedia" Mapping Datastores

These databases map from a particular piece of content (e.g., "Who Let the Dogs Out" ringtone) to a number of platform-specific formats. The mapping datastore is utilized by the portability interface to report which instance of a piece of content is appropriate for a given platform. Preferably, if a piece of content is not available for a given platform, the mapping datastore recommends a substitute content instance, if appropriate.

User Generated Content and Application Settings Datastore

The user generated content is backed up from the device during the backup phase of the application. Actual content including metadata information is stored in this module.

Premium Content Portability Interface

This is the third-party implementation of a specified interface that allows the synchronization platform to determine which of the third-party's content a given user has purchased, metadata about the content in question (e.g., ringtone title and description), which equivalent content should be provided to the device, and a URL that the synchronization platform can access to retrieve the content from the third party.

Synchronization Server Platform Components

When contacted by the backup client at restore time, the synchronization server connects to each third-party content provider and queries its content portability interface and other interfaces to determine which content belonging to the provider should be restored to the handset. The appropriate content is retrieved over the same interface and provided to the backup client, which installs it on the handset to complete the restore process.

The synchronization server provides a standardized interface to Web sites (such as an operator's customer-facing Web sites), which enables the Web site to provide information and actionable interfaces pertaining to the user's content.

Third-Party Mapping Interface

This layer is a conduit that connects to each of the third-party content suppliers and uses their interfaces to implement the business logic in accordance with the present invention. This layer is also able to poll content providers to determine what content was provided to a particular user or mobile device.

User Purchase History Directory

The content provider purchase history databases are populated by queries by the server-side components in the course of determining which applications may be offered to a user when restoring to the new device.

Figure 14:
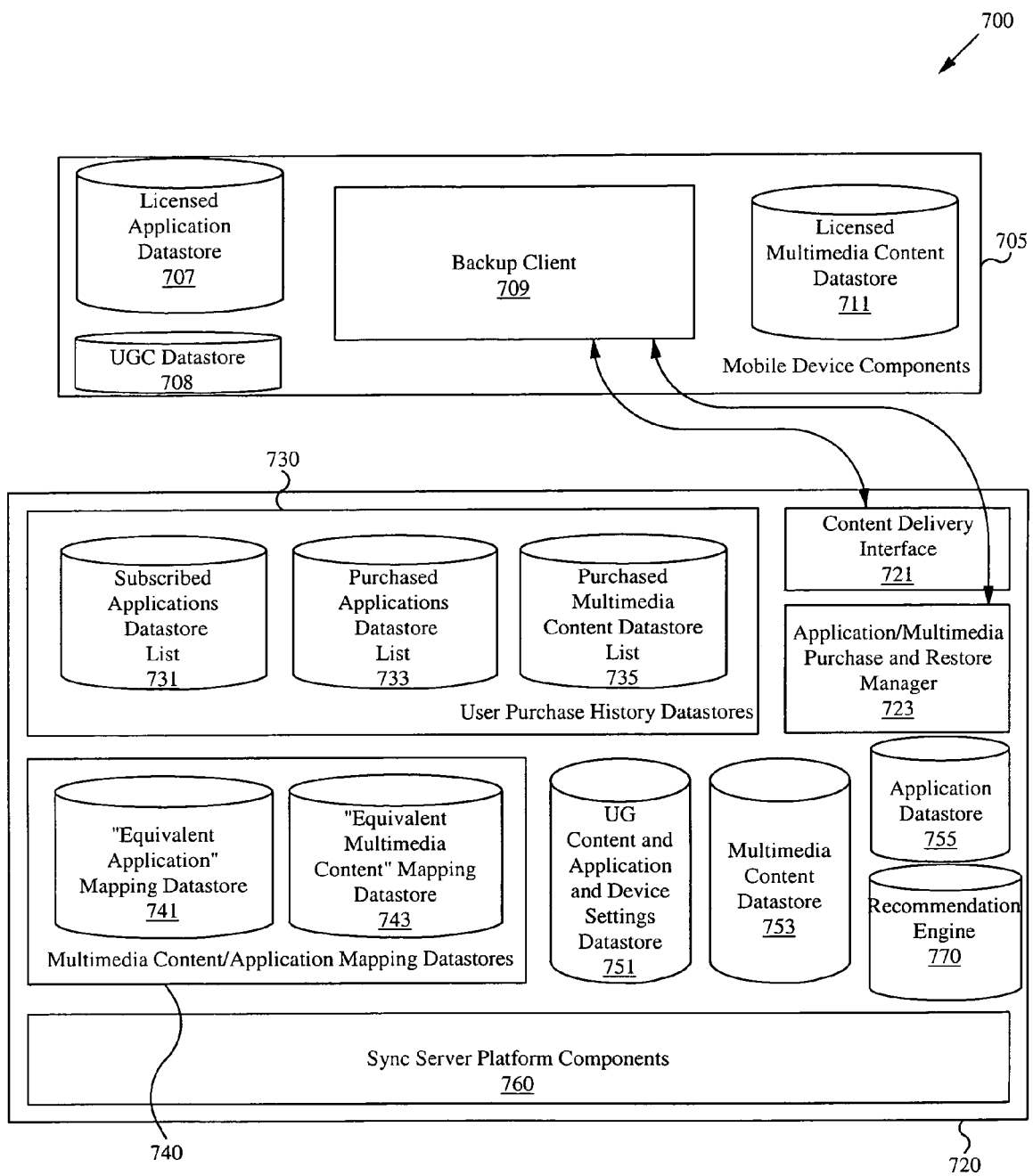
FIGS. 14-17 show components for acquiring, backing up, and restoring content in accordance with embodiments of the present invention.

FIG. 14 is a block diagram of a backup and restore system 700 in accordance with one embodiment of the present invention. The system 700 allows an operator or original device manufacturer (ODM) the ability to maintain control of the applications and multimedia content and its delivery system, while relying on the synchronization server to handle the details of what is installed on the mobile device (along with user-generated content). The system 700 includes a mobile device 705 (e.g., a mobile phone) coupled to a synchronization server platform 720. The mobile device 705 includes a backup client 709, a licensed application datastore 707, a user generated content (UGC) datastore 708, and a licensed multimedia content datastore 711. The synchronization server platform 720 includes a content delivery interface 721, an application/multimedia purchase and restore manager 723, user purchase history datastores 730, multimedia content/application mapping datastores 740, a user-generated content and application and device settings datastore 751, a multimedia content datastore 753, an application datastore 755, synchronization server platform components 760 and a recommendation engine 770.

In operation, when content is restored to the mobile device 705, the backup client 709 sends a request to restore data to the content delivery interface 721. The Application/Multimedia Purchase and Restore Manager 723 queries the user purchase history databases 730 to determine what the user has previously subscribed to (using the datastore list 731) or purchased (using the datastore lists 733 and 735). The manager 723 also queries the multimedia content/application mapping datastores 740 to determine any equivalent content, and also generates new offers, if applicable. The content delivery interface 721 responds to the mobile device 705 with a list of content to be restored, including upgrades, updates, equivalents, and new offers, if any. The client 705 responds with a list of content to be restored. The platform 720 responds with user-generated content and applications settings (to ensure that the content is formatted for use on the mobile device), as well as the multimedia content (from the datastore 753) and the application (from the datastore 755). Operation of the recommendation engine 770 is described further below.

Preferably, the content-delivery interface 721 and the backup client communicate using HTTP. It will be appreciated, however, that other protocols such as HTTPS (HTTP Secure) and Secure Sockets Layer (SSL) can also be used.

Figure 15:
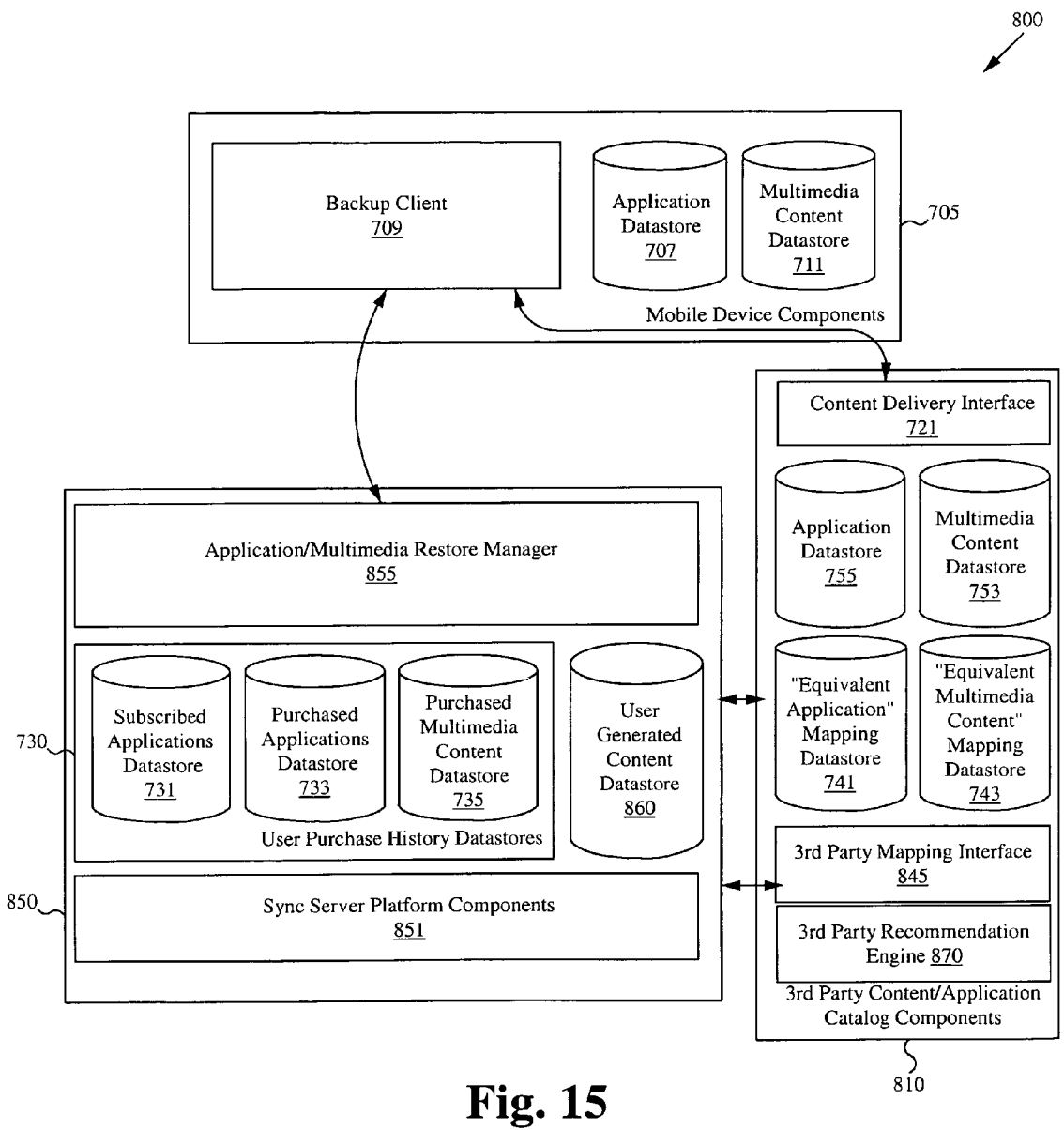
Figure 16:
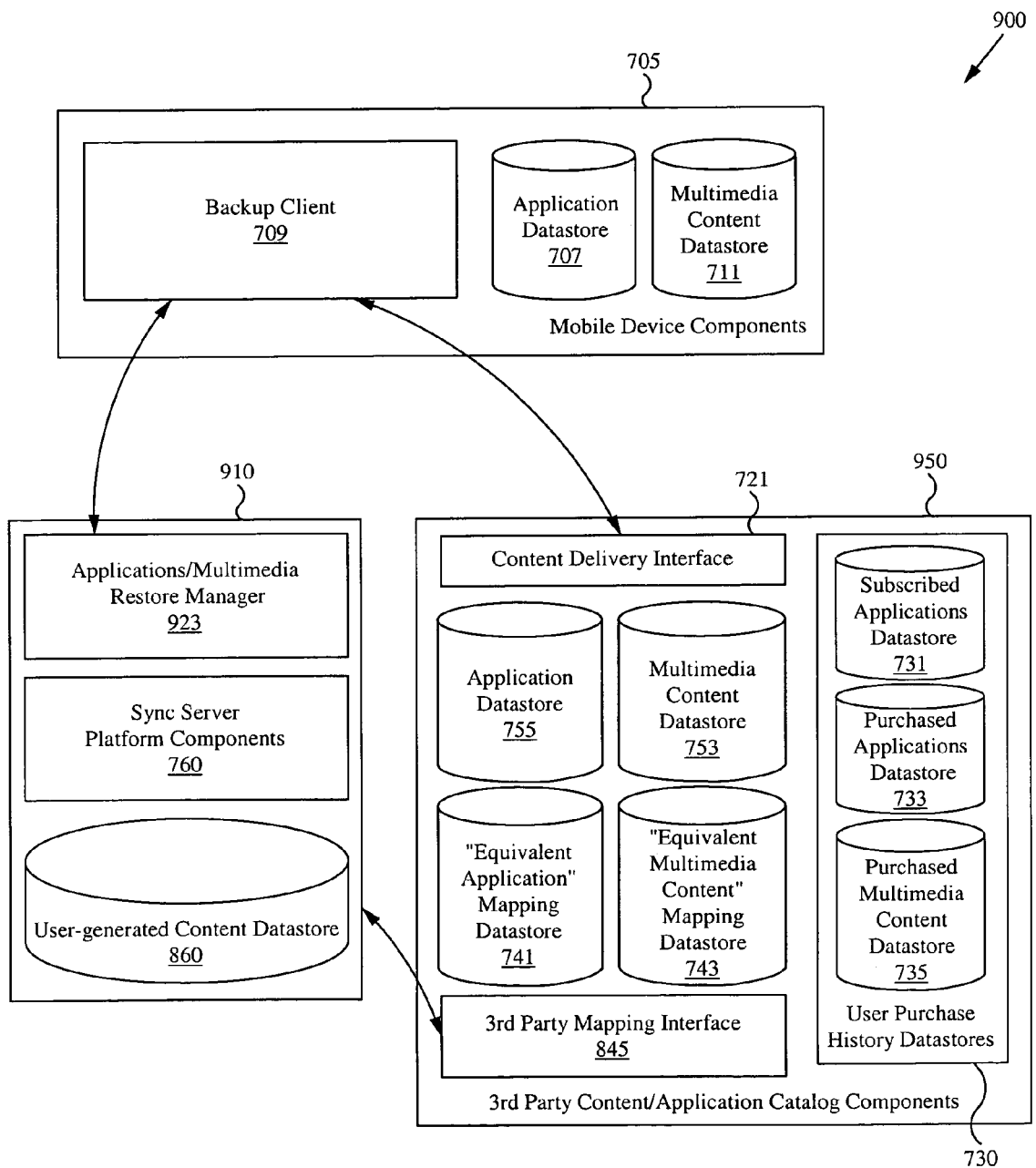
Figure 17:
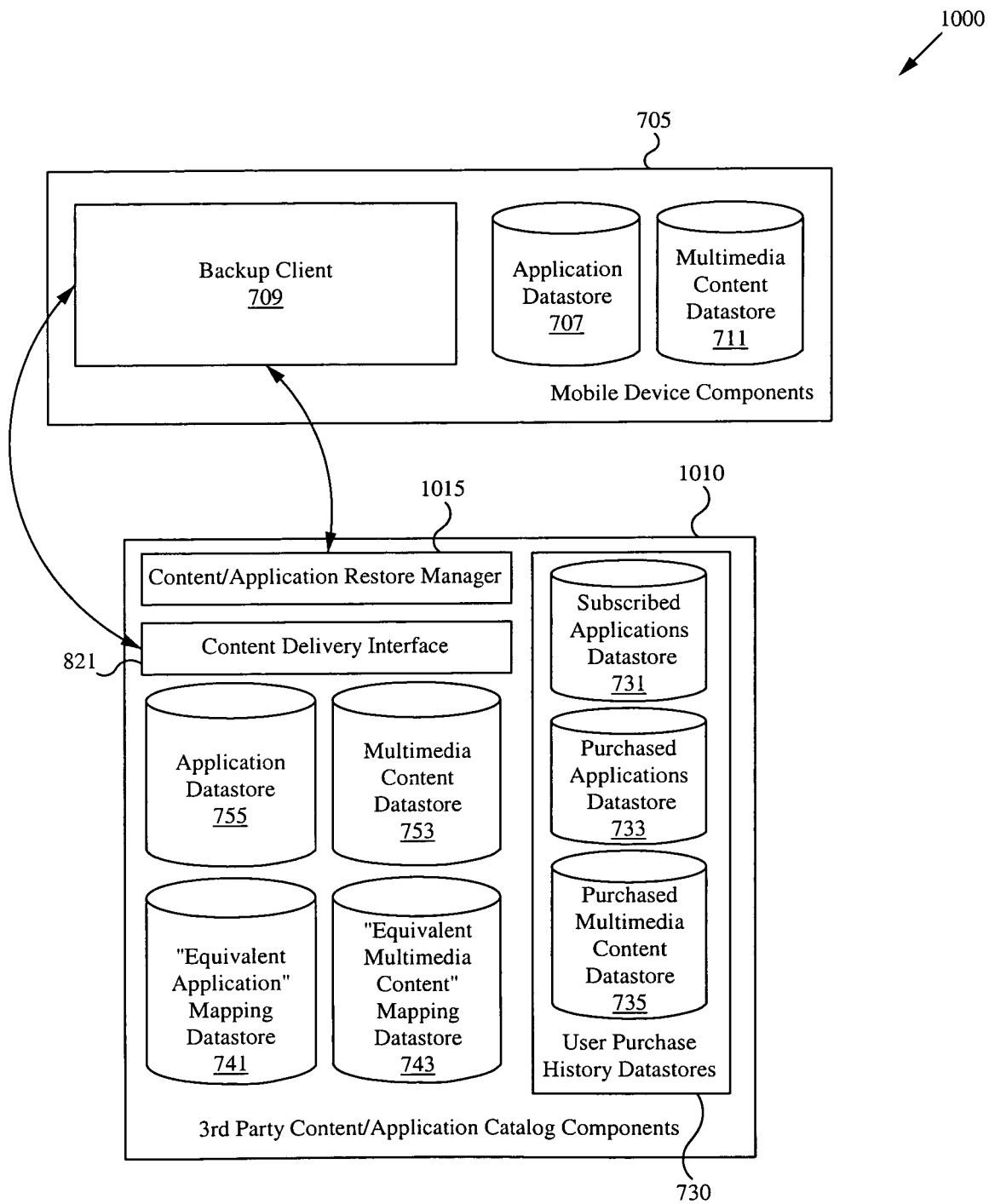

FIGS. 15-17 are high-level diagrams of backup and restore systems 800, 900, and 1000, respectively, in accordance with other embodiments of the present invention. Throughout this application, the same label refers to the same component. The systems 800, 900, and 1000 provide different levels of control over content among the mobile device operators and the third-party content providers.

The system 800 in FIG. 15 includes the mobile device 705 coupled to a synchronization server platform 850 and third-party content/application catalog components 810. Preferably, the components 810 function similarly to the intermediate platform 110 of FIG. 1. In the system 800, the operator or original device manufacturer is able to maintain control of the applications and multimedia content and its delivery system, while relying on a synchronization server platform component 851 to control what is installed on the mobile device 705. The synchronization server platform 850 includes an application/multimedia restore manager 855, the synchronization server platform component 851, the user purchase history datastores 730, and a user-generated content datastore 860.

The third-party content/application catalog components 810 includes the content delivery interface 721, the application datastore 755, the multimedia content datastore 753, the "Equivalent Application" mapping datastore 741, the "Equivalent Multimedia Content" mapping datastore 743, a third-party mapping interface 845 and a third-party recommendation engine 870.

As shown in FIG. 15, the client 709 is coupled to the application/multimedia restore manager 855 and the content delivery interface 721, preferably using an HTTP interface. The synchronization server 850 is coupled to the third-party mapping interface 845, also preferably using an HTTP interface. In this embodiment, a third-party controls equivalent mapping information.

In operation, the mobile device 705 communicates with the content delivery interface 721, which recognizes the mobile device 705 by the URL used to request content, such as described above. The components 810 store applications and multimedia (755 and 753), from which some requests for content can be satisfied. When content requested is not hosted on the components, the components 810 determine equivalent content, if any, using the mapping data stores 741 and 743, and then communicate with the synchronization server platform 850 using the third-party mapping interface 845. The synchronization server platform responds by transmitting the requested content, or its equivalent, to the mobile device 705, such as described above. In some embodiments, the synchronization server platform only transmits user generated content. In some embodiments, the synchronization platform is a facilitator of downloads and the actual transfer of content is between the client and third party content providers. The third-party recommendation engine 770 operates similarly to the recommendation engine described below. In some embodiments, the third-party recommendation engine 770 allows input from third-party vendors to recommend digital content.

FIG. 16 shows a system 900 for backing up content in accordance with another embodiment of the present invention. In the system 900, purchase information, application equivalency, and content delivery are all provided by a third party. The system 900 includes the mobile device 705 coupled to a platform 910 and a third-party content/application catalog of components 950. The third-party content/application catalog of components 950 is similar to the catalog of components 810, except that the user purchase history datastores 730 is included on the catalog 950 but not on the catalog 810.

FIG. 17 shows a system 1000 for backing up content in accordance with another embodiment of the present invention. The system 1000 includes the mobile device 705 coupled to a third-party content/application catalog of components 1010. The third-party content/application catalog of components 1010 is similar to the catalog of components 950, except that third-party mapping interface 845 in FIG. 15 is replaced with a content/application restore manager 1015, which is coupled to the backup client 709.

Figure 18:
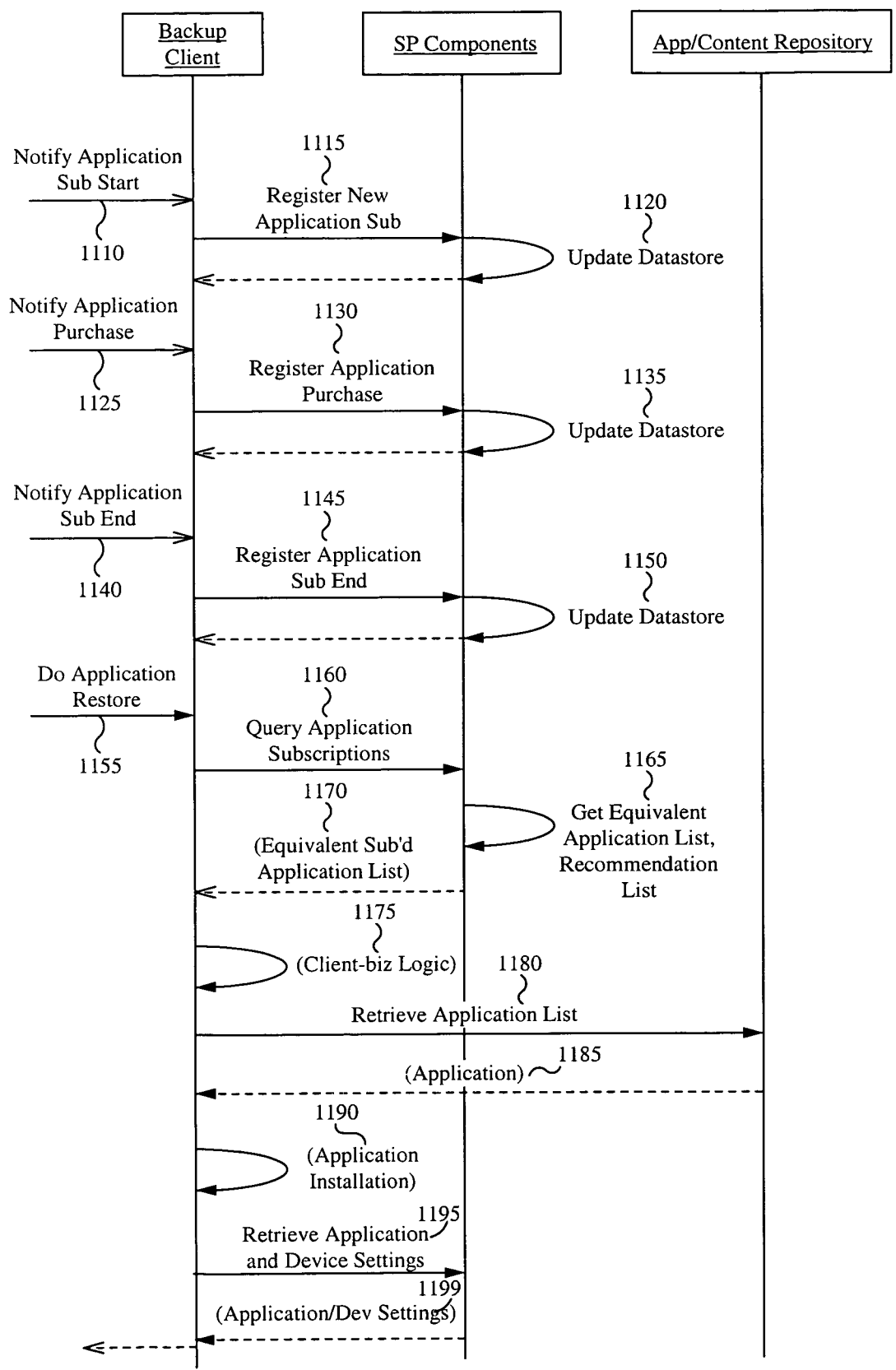
FIG. 18 is a sequence diagram for acquiring and restoring content in accordance with one embodiment of the present invention.

FIG. 18 is a sequence diagram 1100 of interactions between a mobile device client, a synchronization platform (SP) server, and a content repository in accordance with one embodiment of the invention. In the step 1110, the user starts a routine for acquiring (e.g., purchasing, licensing, taking a subscription to, etc.) content, and in the step 1115, the client communicates with the server to register the new application, thereby updating the appropriate application datastore in the step 1120. In the step 1125, the user selects to purchase the application, and in the step 1130, the client registers the purchased application on the server, thereby updating the application datastore in the step 1135. In the step 1140, the user indicates that she is done acquiring new content, and in the step 1145 the client notifies the server that the purchasing is complete. The datastore is updated in the step 1150.

Later, when the device is to be restored, such as when it has been deactivated and is to be reactivated, in the step 1155, the client notifies the server to restore the device. In the step 1160, the device sends a command to query the subscriptions that have been acquired for the device. In the step 1165, the server retrieves a list of subscribed applications, including equivalents, and returns this list to the client in the step 1170. In the step 1175, the client presents this list to the user, allowing her to select the content that she wants. In the step 1180, the client requests the applications (original, equivalent, upgrades, list of applications, etc.), which are returned to the client in the step 1185. In the step 1190, the applications are installed on the device. In the step 1195, the mobile device requests the settings for the applications and device, which are retrieved in the step 1195 and installed on the device in the step 1199.

Querying Third-Party Content Providers

As discussed above, third-party content providers support a queryable interface, which allows the synchronization platform to retrieve, for a given user and for a given device, a list of previously purchased content, metadata about items in the content catalog, equivalency data about previously purchased content, and a mechanism for retrieving equivalent content on a new device.

The list of previously purchased content can include a unique identifier that the synchronization platform presents to the content provider on subsequent calls to these interfaces, which provides an instance of content (e.g., "Who Let The Dogs Out Ringtone in MP3@ 128 kbps). Metadata can include information such as the name, description size, and format of a particular content item in the catalog. Equivalency data can include, given a previously purchased content ID, new content ID appropriate for a given device platform ID. A preferred mechanism for retrieving equivalent content includes an interface that returns an HTTP Uniform Resource Locator (URL) via which binary data can be retrieved. When this interface is accessed, a third-party content provider can apply any digital rights management (DRM) desired, such as the remaining number of downloads allowed. It will be appreciated that mechanisms other than HTTP are able to be used in accordance with the present invention.

Third-party content providers are able to be queried in many ways. As one example, a third-party content provider is queried by accessing it using a URL that contains the query command. In this example, the URL contains a base URL path (here, "/la/f1 cpi") and a string that includes an operation code, an operation version number, and a user telephone number. The URL has the general form:
https://address/base URL path/cpi?op=operationcode&v= versionnumber&u=deviceid
where the address is the domain of the third-party content provider.

Thus, for example, if the address of the third-party content provider is "contentprovider.com," the query is to retrieve a list of user content purchased by the user (operationcode=1), the operation version is 1, and the user is identified by the telephone number 15555551212, then the querying URL is https://contentprovider.com/al/f1 cpi?op=1&v=1&u= 15555551212

Accessing the third-party content provider using the URL will return results such as a list of persistent, unique content instance identifiers.

In another example, the query is to retrieve content details such as metadata about a particular instance on content owned by a third-party content provider. In this example, the querying URL is given as:
https://contentprovider.com/al/f1 cpi?op=2&v=1&cid= A123897ADFAD
where the operation code is 1 and the operating system version number is 1. The string A123897ADFAD is the content instance ID in question. Accessing the third-party content provider using this URL will display the returned results such as delimiter separated fields containing metadata about content instances such as content file name, content description, content size, content format description, content encoding description, and content author.

In a similar manner, using an appropriate operation code and associated parameters, a content portability interface can be queried to return a list of correct equivalent content and to return content URLs usable by the synchronization platform to download the appropriate version of a particular premium content item.

Content Migration

Figure 19A:
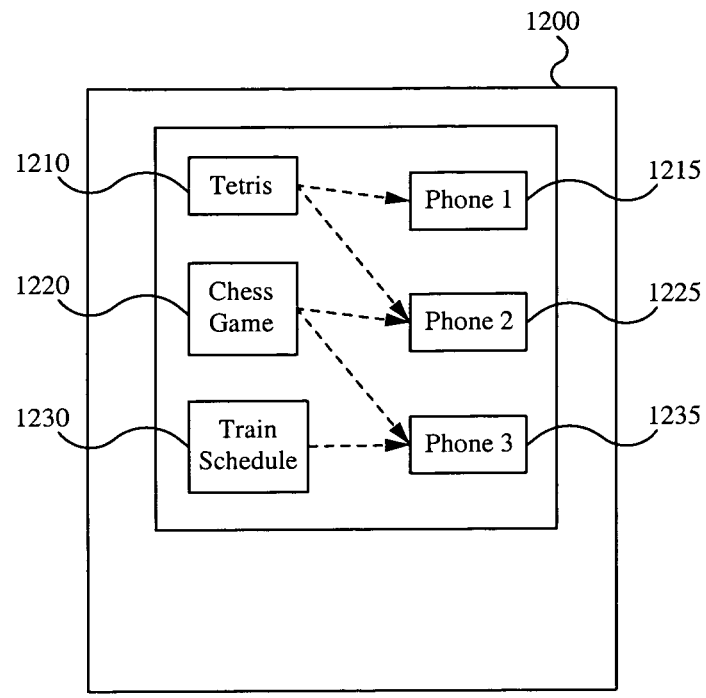
FIG. 19A shows an interface for selecting content and configuring one or more mobile devices to store the selected content, in accordance with one embodiment of the present invention.
Figure 19B:
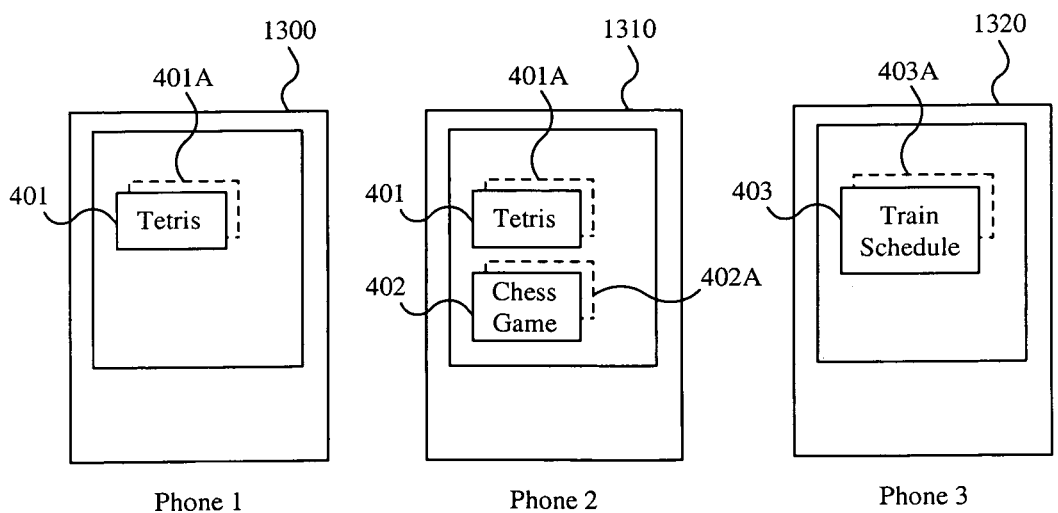
FIG. 19B shows the selected mobile devices of FIG. 17A, after being configured to store the selected content, in accordance with one embodiment of the present invention.

Embodiments of the present invention provide an interface for configuring or updating mobile devices to access content available to other mobile devices. FIG. 19A, for example, shows a system 1200 that displays icons 1210, 1220, and 1230, corresponding to Tetris, a Chess game, and a Train schedule application, respectively, and icons 1215, 1225, and 1235, corresponding to a first mobile device (Mobile device 1), a second mobile device (Mobile device 2), and a third mobile device (Mobile device 3). As shown on FIG. 19A, by the dotted lines, the icon 1210 is dragged and dropped to the icon 1215, the icon 1220 is dragged and dropped to the icon 1225, and the icon 1230 is dragged and dropped to the icon 1235. The result of this is that a link to the game Tetris on a content provider (e.g., a URL), such as described above, is stored on the mobile device 1. As shown in FIG. 19B, the icon to the Tetris 401 and the corresponding link 401A are stored on the Mobile device 1 and the Mobile device 2, such as shown in FIG. 9. Similarly, an icon to the Chess game 402 and its associated link are also stored on the Mobile device 2, and an icon to the Train schedule application 403 and its associated link 403A are stored on the Mobile device 3. Preferably, the icons 401-403 and the associated links 401A-403A are transmitted to the Mobile devices 1-3 wirelessly.

In one embodiment, the system 1200 is programmed to receive icons and associated links from any one of the Mobile devices 1-3. As one example, the system 1200 receives an icon and related link from the Mobile device 1. The icon is then displayed on the system 1200, alone or in a list of other icons. The icon and associated link are then selected and transferred to the Mobile devices 2 and 3, as discussed above.

It will also be appreciated that while the system 1200 is programmed to transfer content to mobile devices, the system 1200 can also be used to offer new content for the Mobile devices 1-3. These new offers can be based on previous acquisitions for any one or more of the Mobile devices 1-3, such as found in purchase history databases discussed above or other business intelligence. The system 1200 can be programmed to offer content, list prices for content, and transmit content to mobile devices. In accordance with one embodiment, links to content are automatically and periodically transferred from one mobile device to another so that the two are synchronized.

In operation, links to content are stored on a platform remote to a mobile device. When content is to be restored on the mobile, the mobile device communicates with a platform that associates the content with one or more content providers. The platform contacts the one or more contact providers, which directly transmit the content to the mobile device. Replacement content, such as upgrades, equivalent content, related content, and the like, can be offered to the mobile device user, who can then select the replacement content, for a regular fee, a reduced fee, or even for no fee. Replacement content can be determined from a history of the user's past purchases, which is stored and used for this purpose.

In the operation of other embodiments, a link to content is stored on the mobile device; when an icon on the mobile device is selected, the mobile device communicates directly with the content provider, which transmits the content to the mobile device. In the operation of still other embodiments, links to content are stored on a central platform and transmitted to selected mobile devices. In this way, a mobile device can be configured so that it can access content previously accessible to another mobile device.

Licensed Content

In another aspect, a content migration/promotion method and system enable users to change from a first mobile device to a second mobile device with easier transferability of their digital content including licensed or subscription content. One of the possible licenses for a mobile application or other content is a subscription where a user pays a fixed fee on an ongoing basis. Application subscriptions are able to include free, pre-paid and other billing models.

Users buy most of their digital content (ringtones, music, wallpapers, videos, and so on) when they activate a new device. This occurs because users wish to personalize their new device, as these devices are often shipped with little digital content. Unfortunately, this process is often difficult and tedious, as it requires accessing multiple stores, websites, or on-device shops. The content migration/promotion method and system utilize a variety of ways to ease and automate this process. Users of a backup-system such as described by U.S. patent application Ser. No. 12/151,440, filed on May 6, 2008, and entitled, "WIRELESS TELEPHONE DATA BACKUP SYSTEM, which is incorporated by reference herein, benefit especially, as the content acquisition is able to occur during their restore process.

Users who do not use a backup solution are still able to benefit by having content promoted to their device via the device itself, or a web site which offers content promotion specifically for the user or his device type (or both).

Additionally, a system allows content authors or license holders to specify and control the nature of the promotions relating to their content. This system interacts with the system which promotes content to control the nature of the content promoted.

Additionally, a system manages the process of performing a migration from an old device to a new device. This system includes features allowing for migration-time promotion of digital content.

Figure 20:
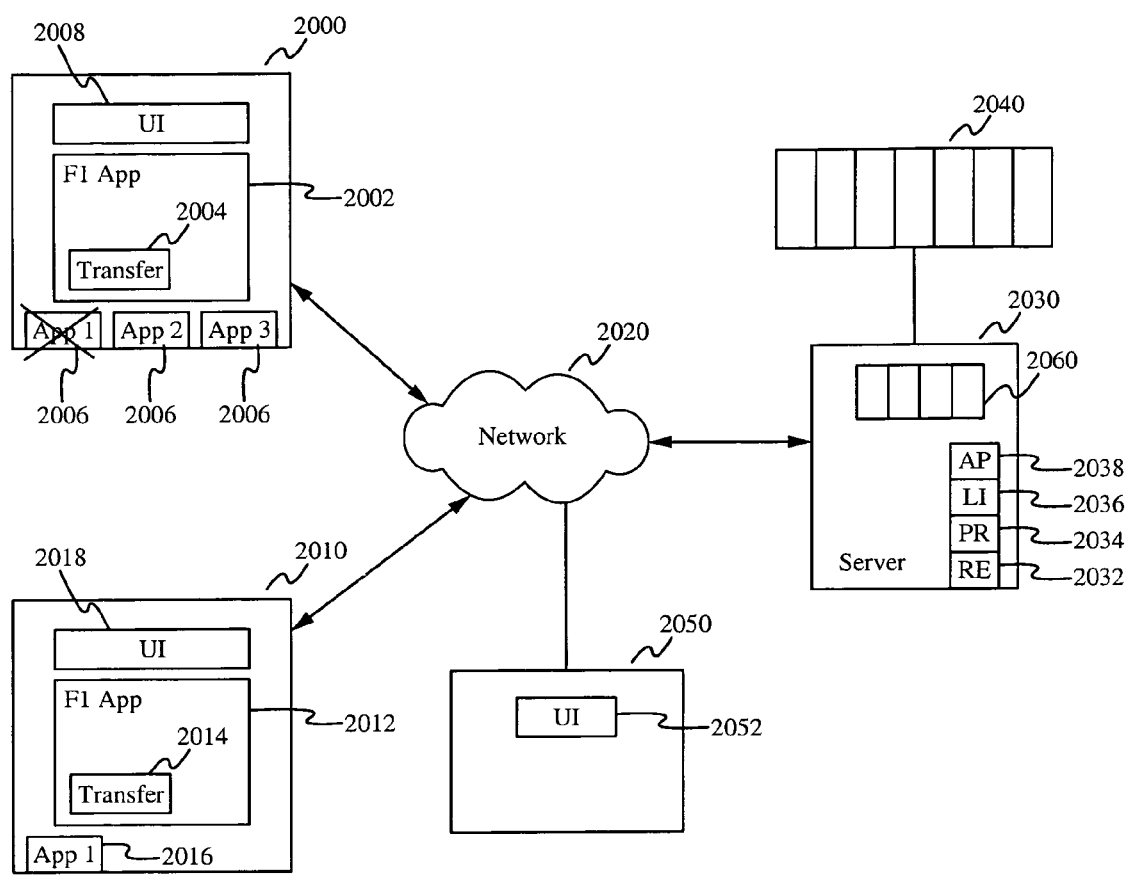
FIG. 20 illustrates a diagram of a system able to be used to promote digital content in accordance with embodiments of the present invention.

FIG. 20 illustrates a diagram of a system able to be used to promote digital content. A first device 2000 includes a communication application 2002 configured for communicating with a server 2030 including backup and restore operations as described above. Included with the communication application 2002 is an application transfer extension 2004 configured for enabling a content transfer. In some embodiments, the communication application 2002 is downloaded from a server. In some embodiments, the communication application 2002 is pre-installed on the first device 2000. In some embodiments, the communication application 2002 is downloaded over cable or a wireless network. In some embodiments, the communication application 2002 is separated into a backup application and a restore application. Digital content 2006 is able to be stored on the first device 2000. Examples of digital content 2006 includes games, applications, music, wallpapers and so on. Additionally, a user interface 2008 is included on the first device 2000 to present a user with information, enable a user to make selections and perform other actions.

A second device 2010 also includes a communication application 2012 configured for communicating with the server 2030 including backup and restore operations. The communication application 2012 includes an application transfer component 2014 configured for enabling content transfer including receiving content. In some embodiments, the communication application 2012 is downloaded from a server. In some embodiments, the communication application 2012 is pre-installed on the second device 2010. In some embodiments, the communication application 2012 is separated into a backup application and a restore application. Digital content 2016 is able to be stored on the second device 2010. A user interface 2018 is also included on the second device 2010.

The first device 2000 and the second device 2010 communicate with the server 2030 through a network 2020. The network 2020 is able to be any network including, but not limited to, a cellular network, the Internet, LAN, WAN, cable and other networks. The network is able to be wired or wireless. For example, a migration is able to occur over a USB cable coupled to the server 2030 over a LAN/WAN.

The server 2030 is configured for performing backup, restore, synchronization, promoting, licensing and other operations described herein. In some embodiments, the server 2030 is also operatively coupled to content datastores 2040 of content providers to be able to acquire the digital content. For example, when a user chooses to re-acquire digital content for the second device 2010, the server 2030 acquires the digital content 2016 from the content datastores 2040 and transfers the content to the second device 2010. In some embodiments, the digital content 2016 is stored on the server 2030. In some embodiments, lists 2060 of the content, as described above, are stored on the server 2030. As described above, the lists 2060 include pointers/references/links to the digital content. In some embodiments, the lists 2060 point to the third-party content providers which provide the digital content.

The first device 2000 and the second device 2010 are able to be any device including, but not limited to, a cellular phone, a mobile device, a wireless device, a laptop computer, a personal computer, a gaming console, and any other computing device. Similarly, the server 2030 is able to be any device capable of serving data includes those listed immediately above.

In some embodiments, a computing device 2050 such as personal computer is able to couple to the network 2020 to provide modifications of the digital content backed up, synchronized or to be restored. The computing device 2050 includes a user interface 2052. The user interface 2052 is able to provide an interface for a user to select digital content to be restored on a second device. For example, if a user is planning on switching to a second device 2010 from a first device 2000, the user is able to input the type of device the second device is and then based on that type of device and the current digital content stored on the first device, the user interface 2052 presents possible digital content for the second device such as the same music or an upgrade to an application.

In some embodiments, content is transferred to multiple devices. For example, after a user purchases content on a first device 2000, then migrates the content to a second device 2010 and then migrates or shares the content to a third device such as a laptop. Although only two devices are shown in FIG. 20, any number of devices are able to migrate and transfer data provided the proper licensing rules are followed.

In some embodiments, a recommendation engine 2032 is implemented. The recommendation engine 2032 is able to be implemented on the server 2030 or another device. The recommendation engine gives recommendations when promoting digital content. In one implementation, the recommendation engine recommends an upgrade to an application or a service. For example, if a user had Tetris v1.0 on his first device, but Tetris 3D now exists for the second device, the recommendation engine will prompt the user to upgrade. In another implementation, if an application or service is no longer available, the recommendation engine is able to recommend a similar application or service. For example, if a user had Tetris, but now Tetris does not exist and there is no upgrade available, the recommendation engine is able to recommend a similar application or an application that people who had Tetris also have. In yet another implementation, contact information is able to be used to recommend digital content. For example, based on people's contact lists or other relationships with other people, the system is able to recommend digital content that the other contacts have stored on their devices. For example, if Person A has Persons B, C and D stored in his contacts list, when Person A switches devices, the recommendation engine is able to review what digital content Persons B, C and D have in their devices and make recommendations based on what they have. For example, all have downloaded, a golf game, so the golf game is recommended to Person A.

In some embodiments, additional applications and/or modules within the applications are implemented on the server 2030 or another device within the system. A promotional application 2034 includes modules for selecting a promotional offer from a database of promotional offers configured to the particular wireless device type and for offering digital content related to the promotional offer to a user. In some embodiments, the promotional application 2034 also includes a database or has access to a database containing promotional offers. In some embodiments, the promotional application 2034 also includes a module for determining the pricing of the promotion. For example, some licensed digital content is able to be sent to the second device 2010 for the full price, a discounted price or for free. Additional promotional operations are able to be executed by the promotional application 2034.

A licensing module 2036 performs licensing and subscription rights management. In some embodiments, licensing and subscription rights management includes determining licensing rights held by a user for a digital content, validating license rights and other licensing inquiries. Licensing rights are able to include a use limitation, pricing requirements, determining a remaining portion of a use right and/or applying a value of the remaining portion of the rights against an upgrade price. For example, a license is able to be based on tokens and when the tokens are depleted, the digital content is no longer accessible. However, if an upgrade occurs before the license has expired (e.g. the tokens are used up), then the remaining tokens are able to be applied towards the purchase of the upgrade. In some embodiments, if the user does not use all of the credits for a digital content, it is possible to credit his account for the remaining credits. In some embodiments, the licensing and subscription rights management includes being able to request a tracking from the first device 2000 regarding the number of times that the application has been executed to determine a remaining portion. In some embodiments, the licensing and subscription rights management includes being able to request a tracking from the first user device 2000 regarding the amount of time that the application has been executed to determine a remaining portion. In some embodiments, the licensing and subscription rights management includes capabilities to purge, lock and unlock digital content. In some embodiments, the purge functionality is implemented automatically based on a determined condition, such as the transfer of the digital content to a device owned by the same user. In some embodiments, the licensing and subscription management includes determining that an upgrade is available for a licensed application and offering and/or sending the upgrade to users' devices containing the application. In some embodiments, the licensing and subscription management includes performing a billing transaction to reflect a negotiated transaction price. In some embodiments, performing the billing transaction occurs at a billing entity which is located within or remote from the server 2030.

In some embodiments, an application comparison module 2038 compares application inventory of a first device 2000 against a transaction record stored remote to the first device 2000.

In some embodiments, fewer or additional modules are able to be included in the devices and the server. Furthermore, in some embodiments, the applications and hardware described above, for example in FIGS. 14-17, are also able to be included within the devices and server.

In an exemplary implementation, a user initially purchases the first device 2000 and acquires several applications 2006 such as a game, a ringtone and a song which each have licenses. When the user chooses to purchase the second device 2000, the second device 2000 does not contain the game, the ringtone and the song. Through the user interface 2018 of the second device 2010, the user is able to be queried about acquiring the same game, ringtone and song on the second device 2010. The user is then able to choose which digital content 2016 he would like to re-acquire, if any. Once the user chooses digital content 2016 to re-acquire, the server 2030 retrieves the digital content 2016 from the content datastores 2040 and transfers the digital content 2016 to the second device 2010. The transfer includes fulfilling any necessary license requirements.

Figure 21:
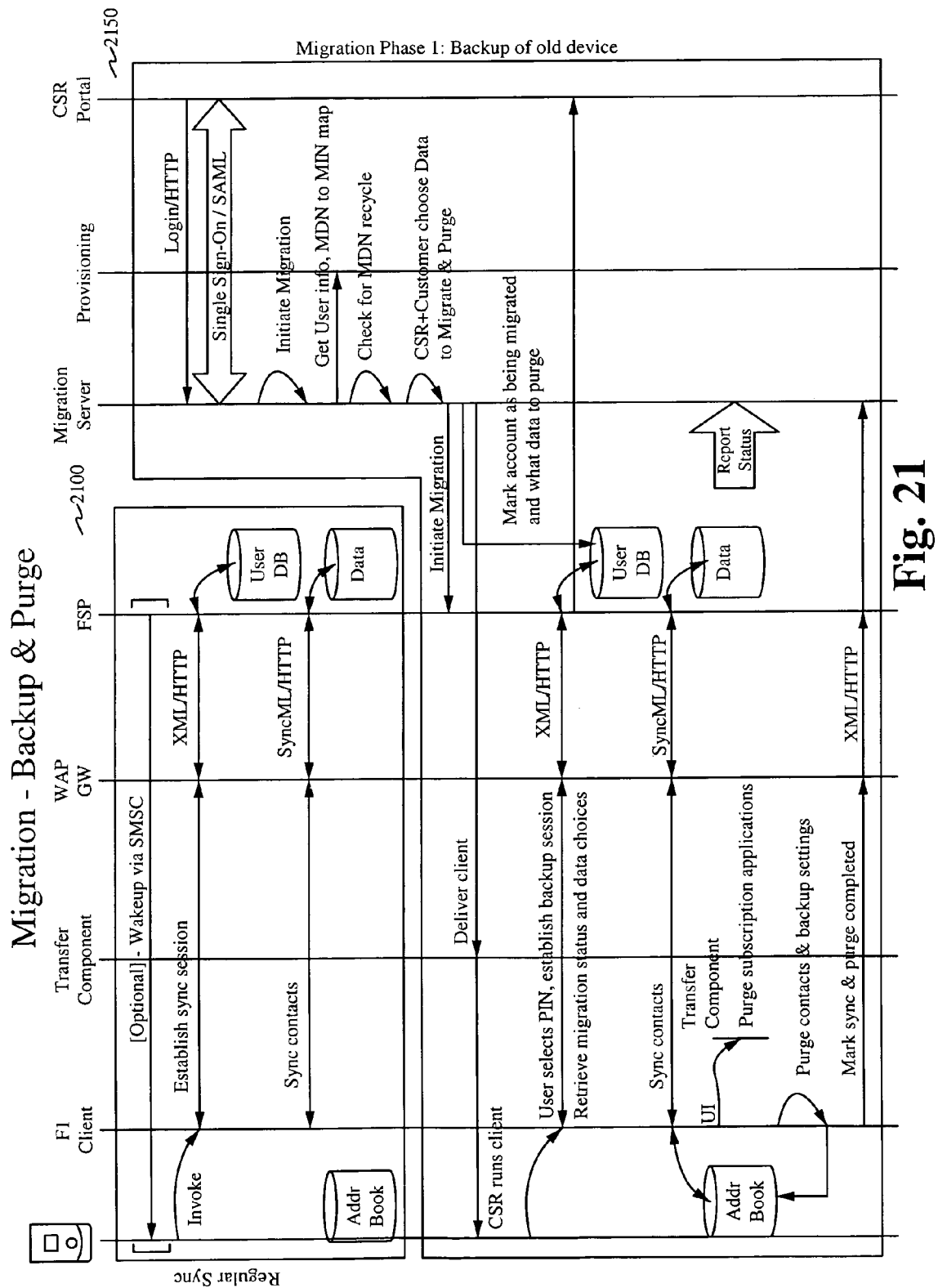
FIG. 21 illustrates a diagram of migration including backup and purge in accordance with embodiments of the present invention.

FIG. 21 illustrates a diagram of migration including backup and purge operations. The synchronization process 2100 is shown. With the configuration described herein, synchronization is able to be performed as described in U.S. patent application Ser. No. 8,442,943, filed Aug. 18, 2008 and issued May 14, 2013, and entitled, DATA TRANSFER AND SYNCHRONIZATION BETWEEN MOBILE SYSTEMS USING CHANGE LOG, which is incorporated by reference herein. Briefly, the sync process includes establishing a sync session between a device and a sync server so that the changes on the device are able to be synchronized with by the server.

Migration, which is also referred to as transferring digital content from a first device to a second device, includes a backup process 2150 as shown. Initially, a user signs on or authenticates himself. Migration is then initiated. User information is retrieved including identification numbers or addresses. In some embodiments, it is determined if any of the numbers are recycled. Digital content is then selected to migrate and possibly purge. In some embodiments, the digital content is selected by a user of the device. In some embodiments, the digital content is selected by a representative with or without the assistance of a user of the device. For example, some implementations allow a user to perform the migration on his own and some implementations allow or require a user to obtain assistance from a customer service representative for the migration. Then, the migration is initiated, and a backup client application is delivered to the application transfer server and the device such as a mobile device. The backup client application is run either by the user or the representative. Running the backup client application establishes a backup session. In some embodiments, the user selects a PIN before the backup session is established. On the server side, the account is marked as being migrated. In embodiments where the data is to be purged, the data is marked to be purged. Billing records are also generated. The backup status is returned to the device, for example, letting the user know that the digital content has been backed up properly. Additionally, contact data is synchronized. In some embodiments, licensed or subscription applications are purged. In some embodiments, instead of the data being purged, the data is locked or somehow prevented from being accessed. In some embodiments, a user interface is presented to allow a user to choose which applications to backup and/or purge. Then, the sync, and purge if included, are marked as completed. The purge is included typically to prevent a licensed application from existing in two locations (or on two separate devices) at once with only one license. However, in some embodiments, due to looser licensing requirements, the application or digital content does not have to be purged. In some embodiments, fewer or additional steps are included in the backup process of a device.

Figure 22:
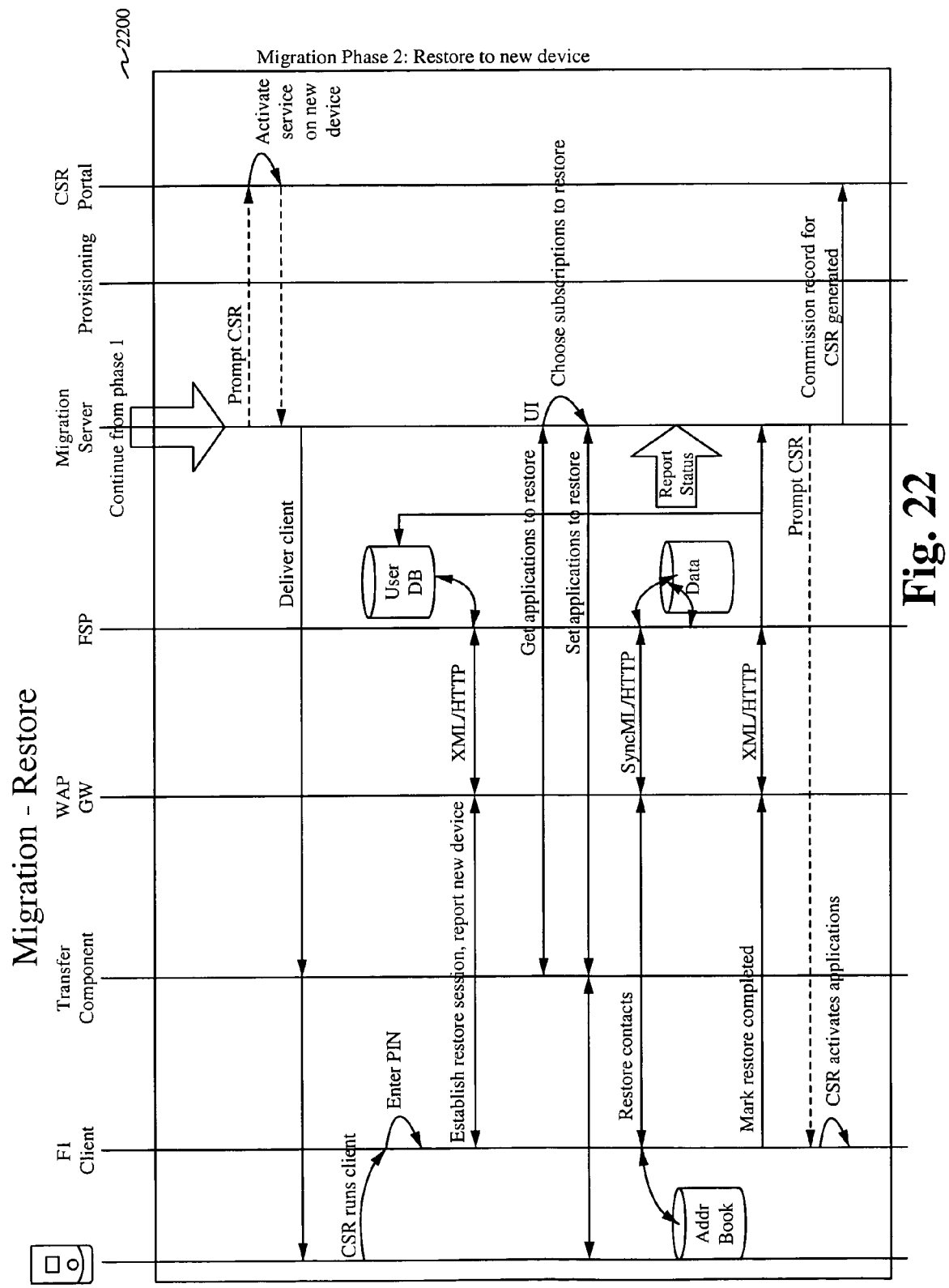
FIG. 22 illustrates a diagram of migration including a restore process in accordance with embodiments of the present invention.

FIG. 22 illustrates a diagram of migration including a restore process 2200. Thus, after digital content and contact information is backed up from the first device, the restore process is implemented to populate or restore a device with the same or similar information. A restore client application is initiated and delivered to the application transfer server and the device. The user or representative runs the restore client application. In embodiments using a PIN, the user is requested to enter in his PIN for authentication. Other implementations of authentication are able to be implemented. A restore session is then established. Then, a list of digital content or applications are retrieved to be restored. In some embodiments, a user interface is used to allow a user to select which licensed digital content to restore or acquire. For example, if the user had a game on the first device, but now to restore that game on the second device, the fee is 50% off, the user is able to determine if he would like to restore that game on the second device. In embodiments with the user interface to select licenses or subscriptions to restore, the digital content is then set to be restored and is ultimately restored to the second device. In some embodiments, the contacts from the first device are also restored. Once the restore is completed, it is marked as completed. Either the user or representative activates the digital content once restored. In some embodiments, a commission record for the representative is generated.

Figure 23:
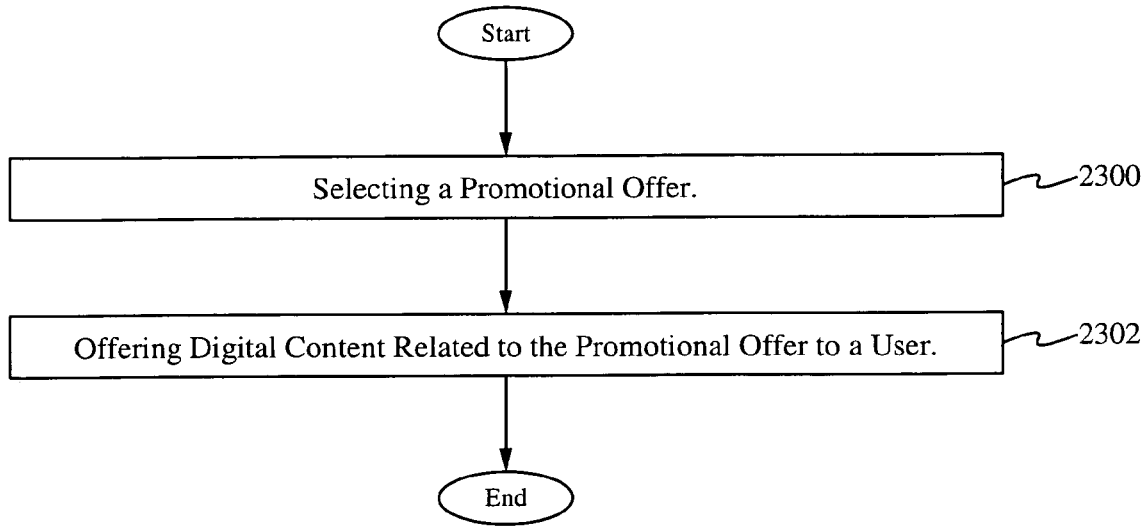
FIG. 23 illustrates a flowchart of a method of promoting the purchase of digital content configured for a particular type of wireless device in accordance with embodiments of the present invention.

FIG. 23 illustrates a flowchart of a method of promoting the purchase of digital content configured for a particular type of wireless device. In the step 2300, a promotional offer is selected from a database of promotional offers configured to the particular wireless device type or a user. In the step 2302, digital content is offered related to the promotional offer to a user. In some embodiments, the promotional offer is selected based on the recommendation engine described above. In some embodiments, the promoted digital content is offered on a mobile device. In some embodiments, the promoted digital content is offered on a web site. In some embodiments, promoting is performed after a new device purchase. In some embodiments, promoting is performed during restoration of data to a new device.

Figure 24:
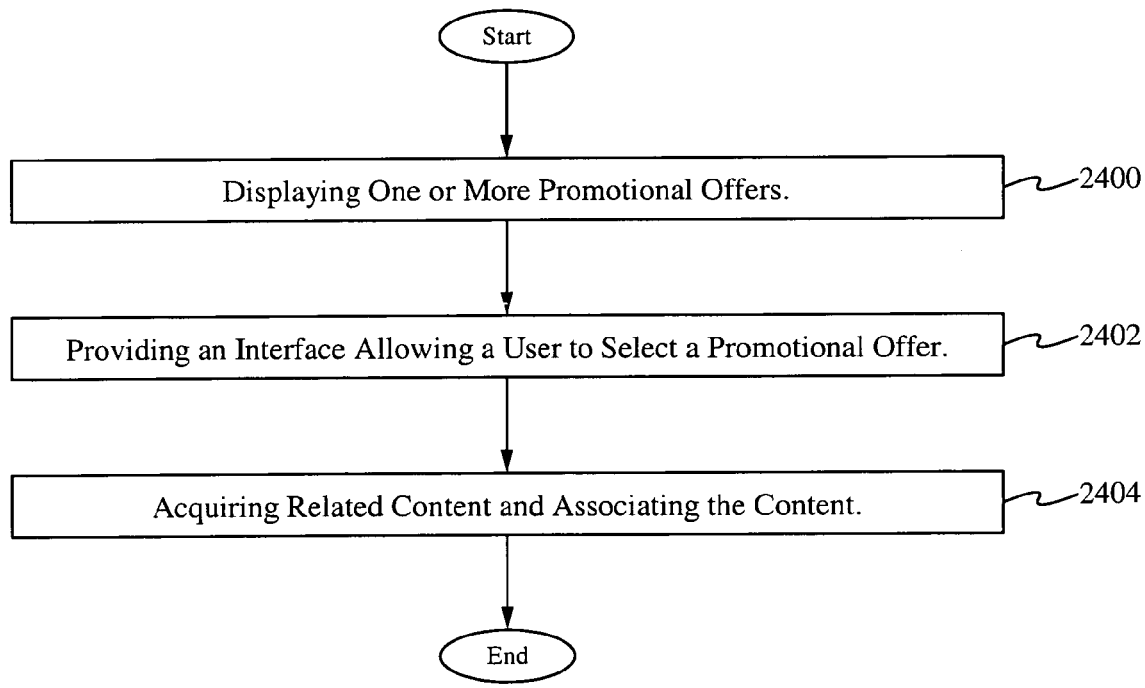
FIG. 24 illustrates a flowchart of a method of acquiring promoted digital content configured for a particular type of wireless device in accordance with embodiments of the present invention.

FIG. 24 illustrates a flowchart of a method of acquiring promoted digital content configured for a particular type of wireless device. In the step 2400, one or more content promotional offers are displayed to a user. In the step 2402, an interface allowing a user to select any of the one or more promotional offers is provided to the user. In the step 2404, responsive to the user selecting any of the one or more promotional offers, related content is acquired from one or more content datastores and associating the content with an account of the user. In some embodiments, the promotional offers are based on the recommendation engine described above. In some embodiments, the content is immediately delivered to a mobile device of the user. In some embodiments, the content is delivered to a mobile device of the user at a later time.

Figure 25:
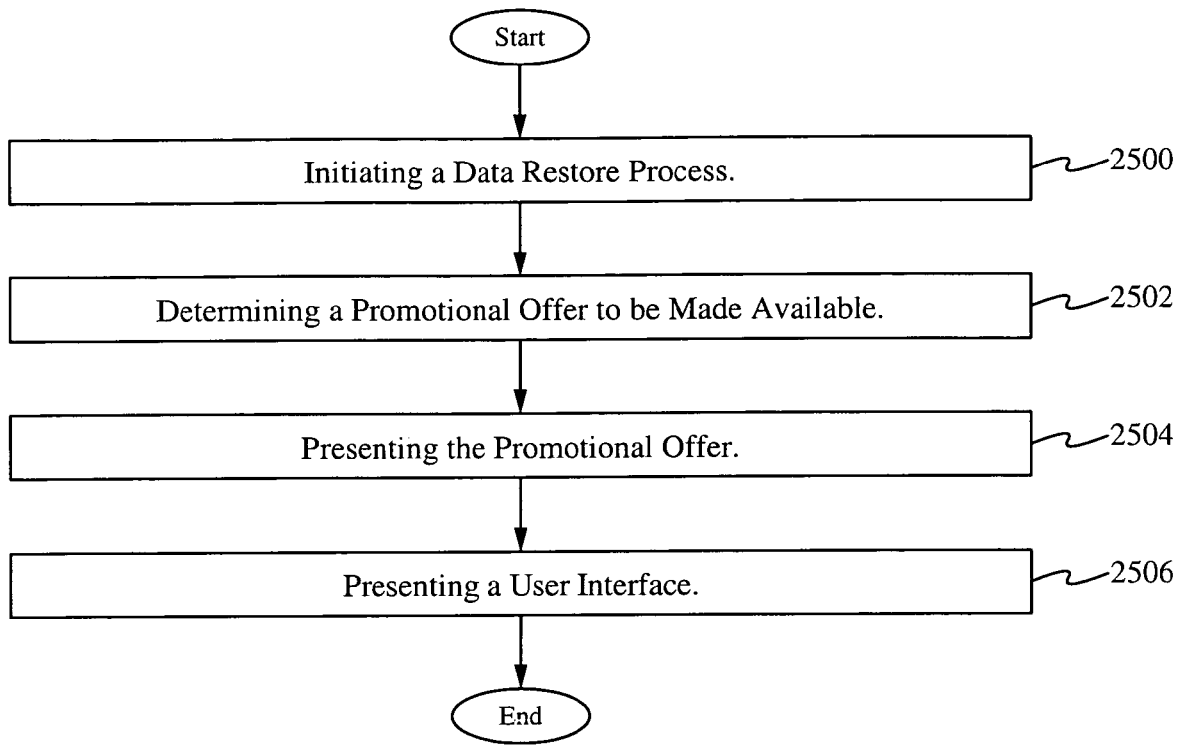
FIG. 25 illustrates a flowchart of a method of promoting digital content to a user of a backup implementation during the restore operation of the backup implementation in accordance with embodiments of the present invention.

FIG. 25 illustrates a flowchart of a method of promoting digital content to a user of a backup implementation during the restore operation of the backup implementation. In the step 2500, a data restoration process is initiated. In the step 2502, in relation to the restore process, one or more promotional offers to be made available to the user are determined. In the step 2504, during the restore process, the promotional offers are presented to the user. In the step 2506, a user interface is presented on a device allowing the user to choose promotional content to acquire. In some embodiments, the promotional offers are based on the recommendation engine described above.

Figure 26:
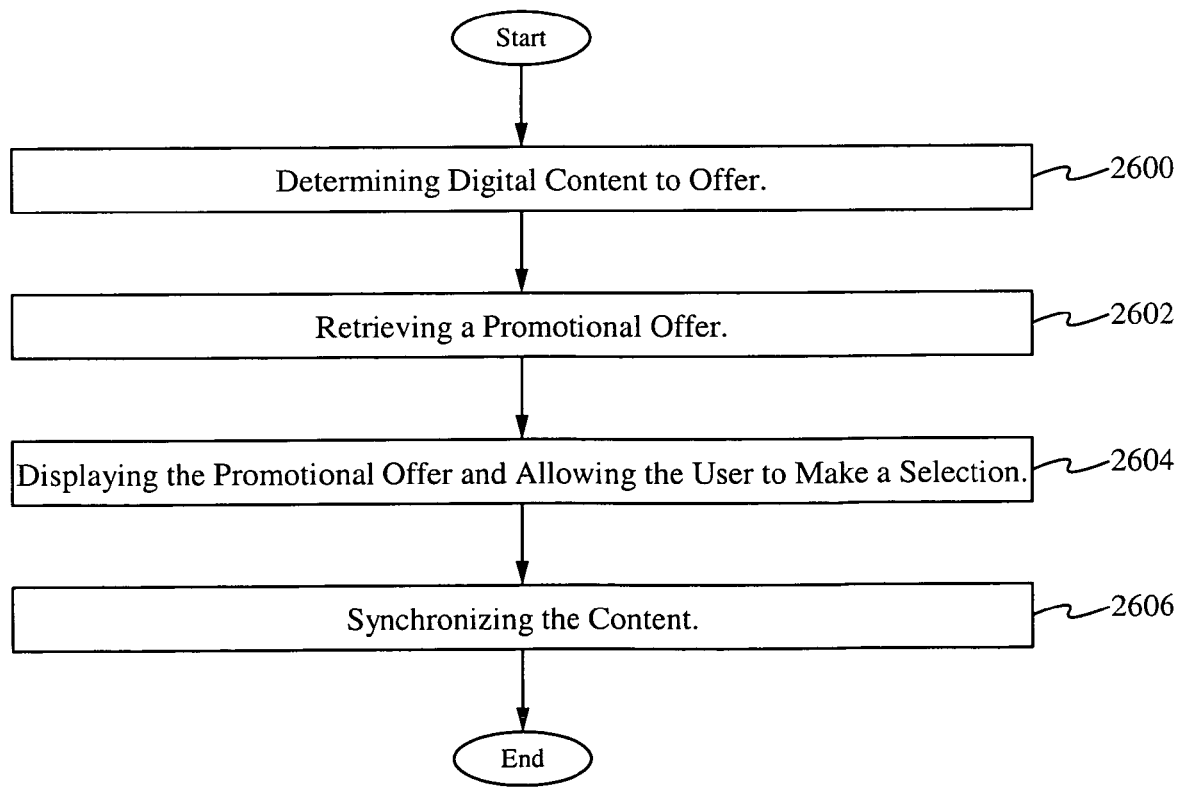
FIG. 26 illustrates a flowchart of a method of promoting digital content to users of a synchronization implementation in accordance with embodiments of the present invention.

FIG. 26 illustrates a flowchart of a method of promoting digital content to users of a synchronization implementation. In the step 2600, one or more items of digital content to offer a user are determined. In the step 2602, on devices participating in the synchronization implementation, promotional offers from the synchronization implementation are retrieved. In the step 2604, promotional offers are displayed to the user and allowing the user to make a selection of content to acquire. In the step 2606, the content to a device of the user is synchronized. In some embodiments, the promotional offers are based on the recommendation engine described above.

Figure 27:
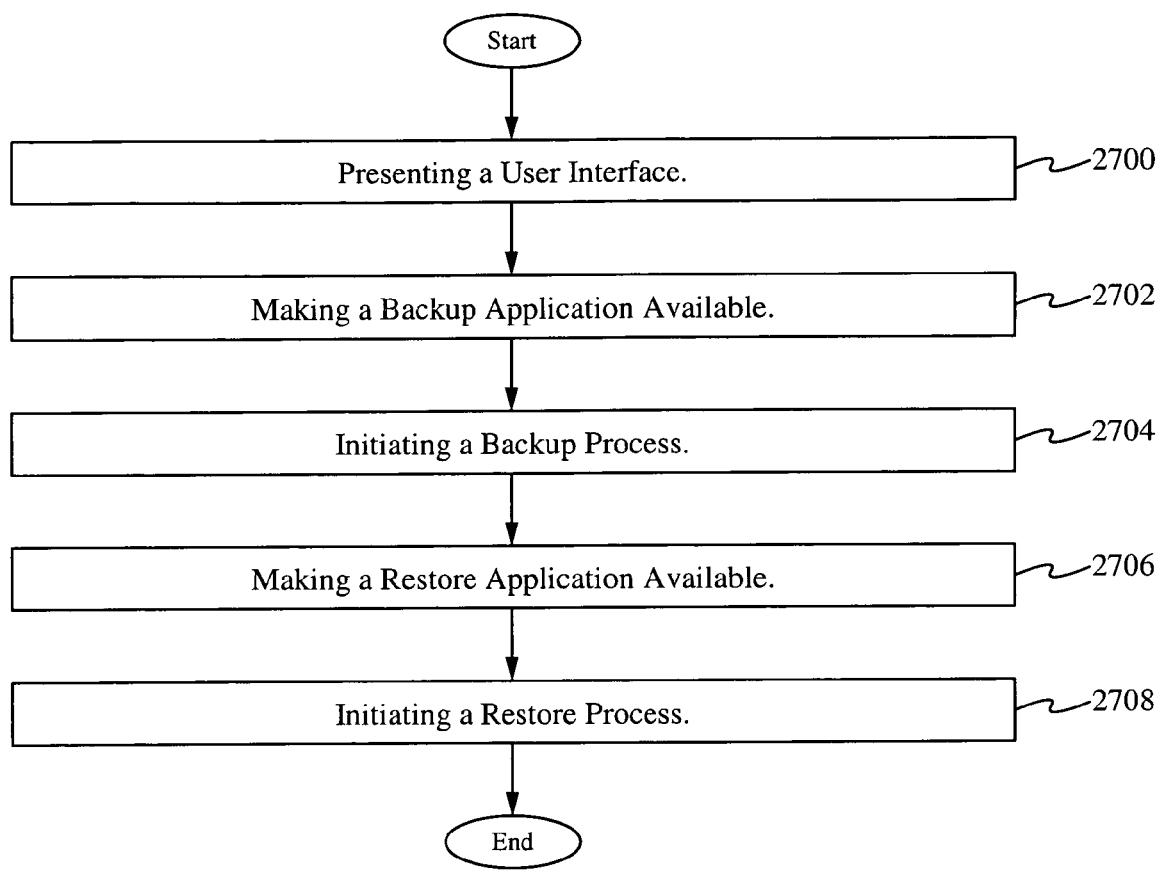
FIG. 27 illustrates a flowchart of a method of managing the process of migrating data from a first wireless device to a second wireless device in accordance with embodiments of the present invention.

FIG. 27 illustrates a flowchart of a method of managing the process of migrating data. In some embodiments, the data is migrated from a first wireless device to a second wireless device. In the step 2700, a user interface is presented, the user interface displaying one or more steps to be performed to transfer user content from the first device to the second device. In the step 2702, in response to use of the user interface, a backup application is made available to the first mobile device. In the step 2704, a backup process is initiated on the first mobile device. In the step 2706, in response to use of the user interface, a restore application is made available to the second mobile device. In the step 2708, a restore process is initiated on the second mobile device. In some embodiments, the user interface is presented to a user. In some embodiments, the user interface is presented to an agent or representative on the user's behalf. In some embodiments, the migration or transfer process includes deleting backed up data from the first mobile device. In some embodiments, the restore process includes displaying a user interface allowing the user to confirm data and content to be restored to the second device. In some embodiments, the restore process includes offering digital content promotional offers to the user. In some embodiments, making the backup application available includes automatically installing the backup application on the first device. In some embodiments, making the restore application available includes automatically installing the restore application on the second device.

In some embodiments, the data or digital content is restored to the same device. For example, if a user chooses to erase the content on his device, afterwards, the user is able to restore the content onto that same device that was previously backed up. The restore is able to include licensed digital content with proper licenses. The steps described above allow such a restoration to occur with the user interface being presented on the device, a restore application being downloaded to the device and then initiating a restore process on the device.

FIGS. 28-33 illustrate an exemplary web page 2800 displaying backed up digital content. As described above, digital content includes, but is not limited to, contact information, music, ringtones, wallpapers and applications. Within the web page 2800, there are tabs for each of the types of digital content, such as a Contacts tab 2802, a Music & Ringtones tab 2804, a Wallpapers tab 2806 and an Applications & Subscriptions tab 2808. More or less tabs are able to be included as desired or needed. For example, a video tab, call logs tab, SMS messages tab, MMS messages tab and/or a blogs tab is/are able to be included as well.

In FIG. 28, the Music & Ringtones tab 2804 is selected. Within the Music & Ringtones tab 2804, a list of music and ringtones is shown. The list of music and ringtones includes items available for purchase and previously selected or downloaded items. For example, the song "Smoked" is available for purchase, and "Booty Drop" has previously been downloaded to the device such as a mobile phone. A link next to "Smoked" allows a user to purchase the song, and a link next to "Booty Drop" labeled "Re-deliver" allows a user to select the ringtone to be redelivered to the device or another device. For example, a user downloaded "Booty Drop" to his first device, then after a period of time the user has a second device which does not have the ringtone "Booty Drop" on it. The user is able to easily select the "Re-deliver" link to have the ringtone downloaded to the second device. Additional steps are taken as described below to ensure the proper licensing is involved. In some embodiments, the content is able to be stored on both devices which is permitted by DRM settings.

Figure 29:
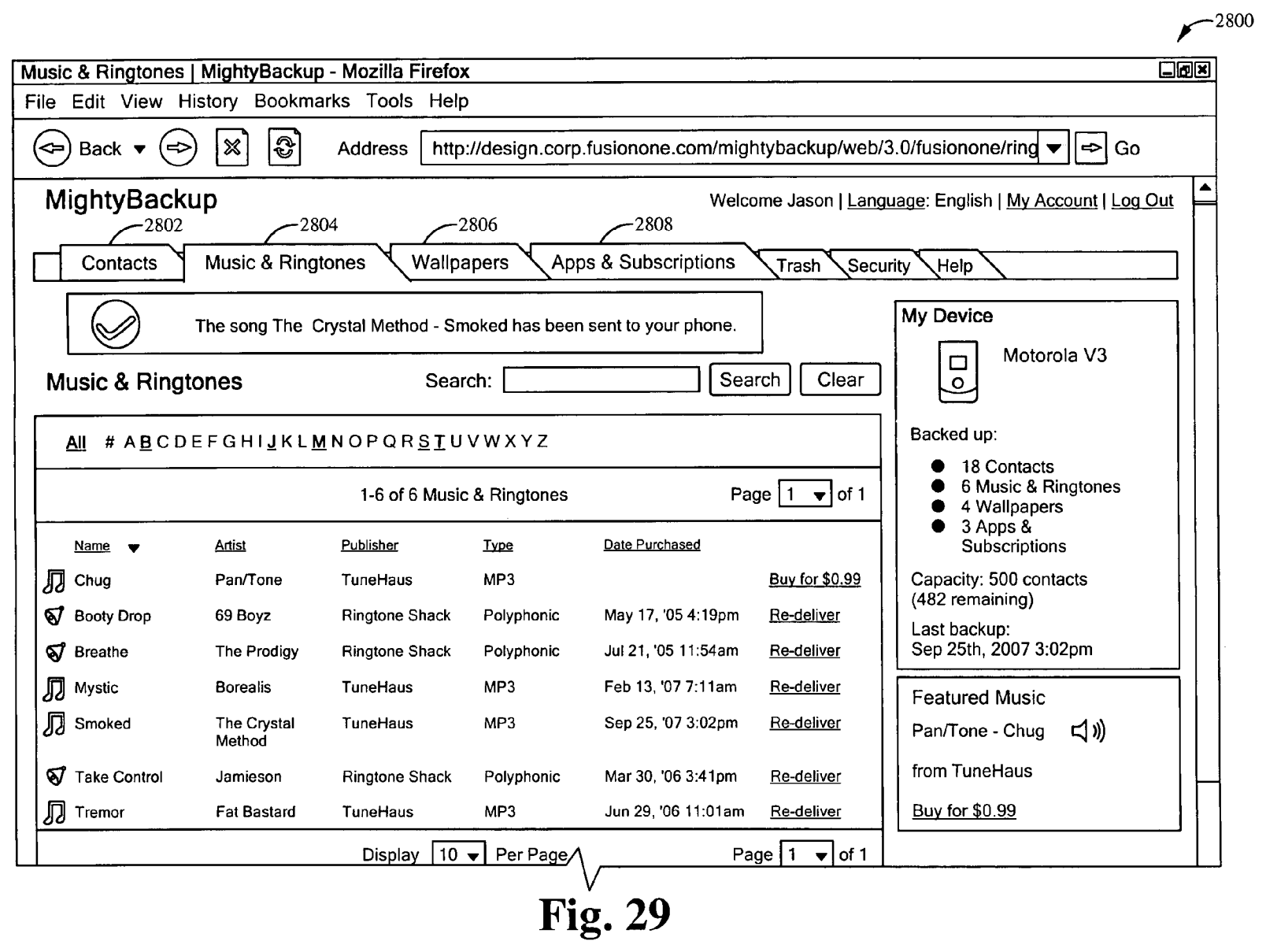

FIG. 29 shows the Music & Ringtones tab 2804 after the song "Smoked" has been purchased. The link next to "Smoked" has been changed from "Buy" to "Re-deliver" in the event that the user desires to reacquire the song.

Figure 30:
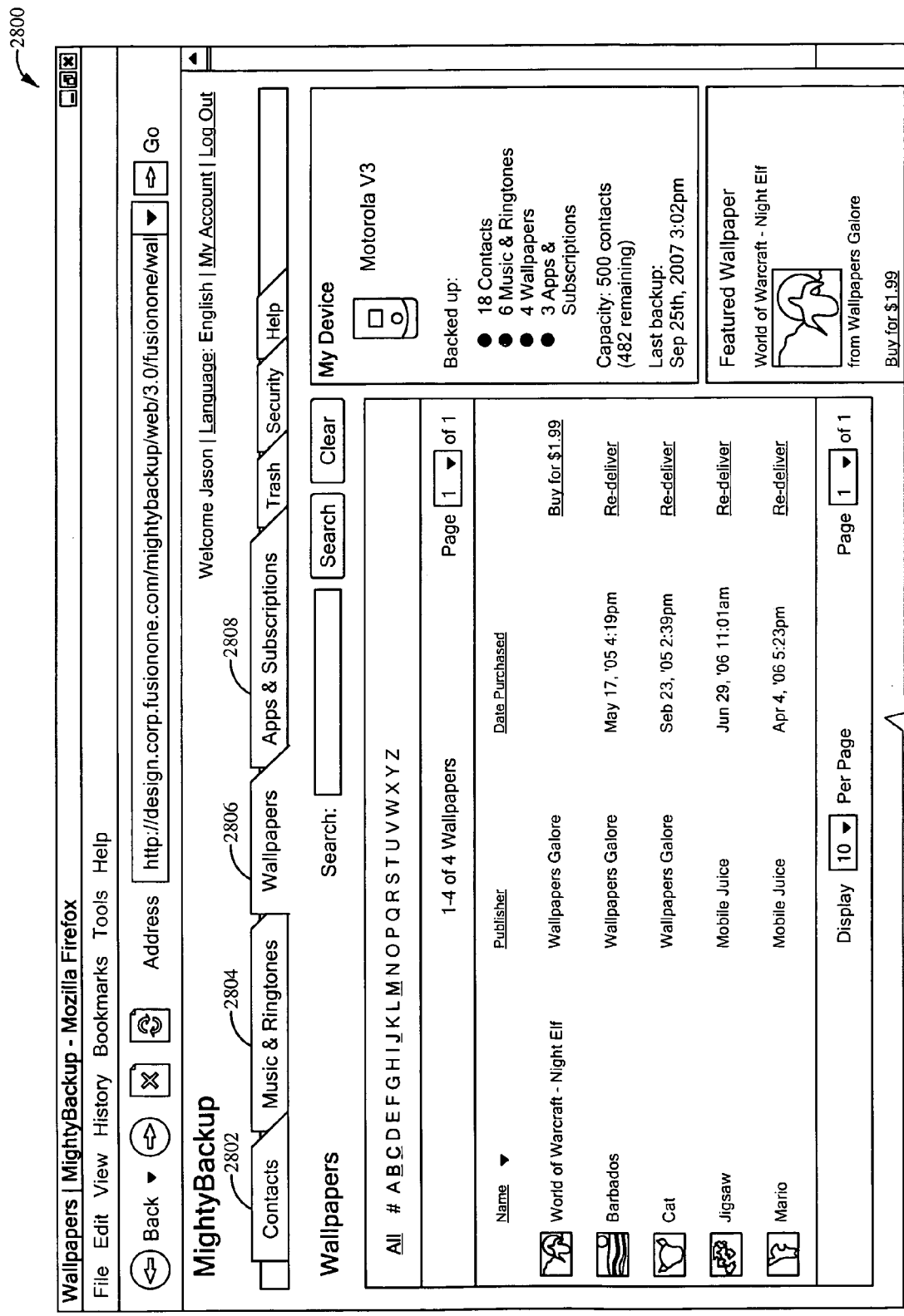
Figure 31:
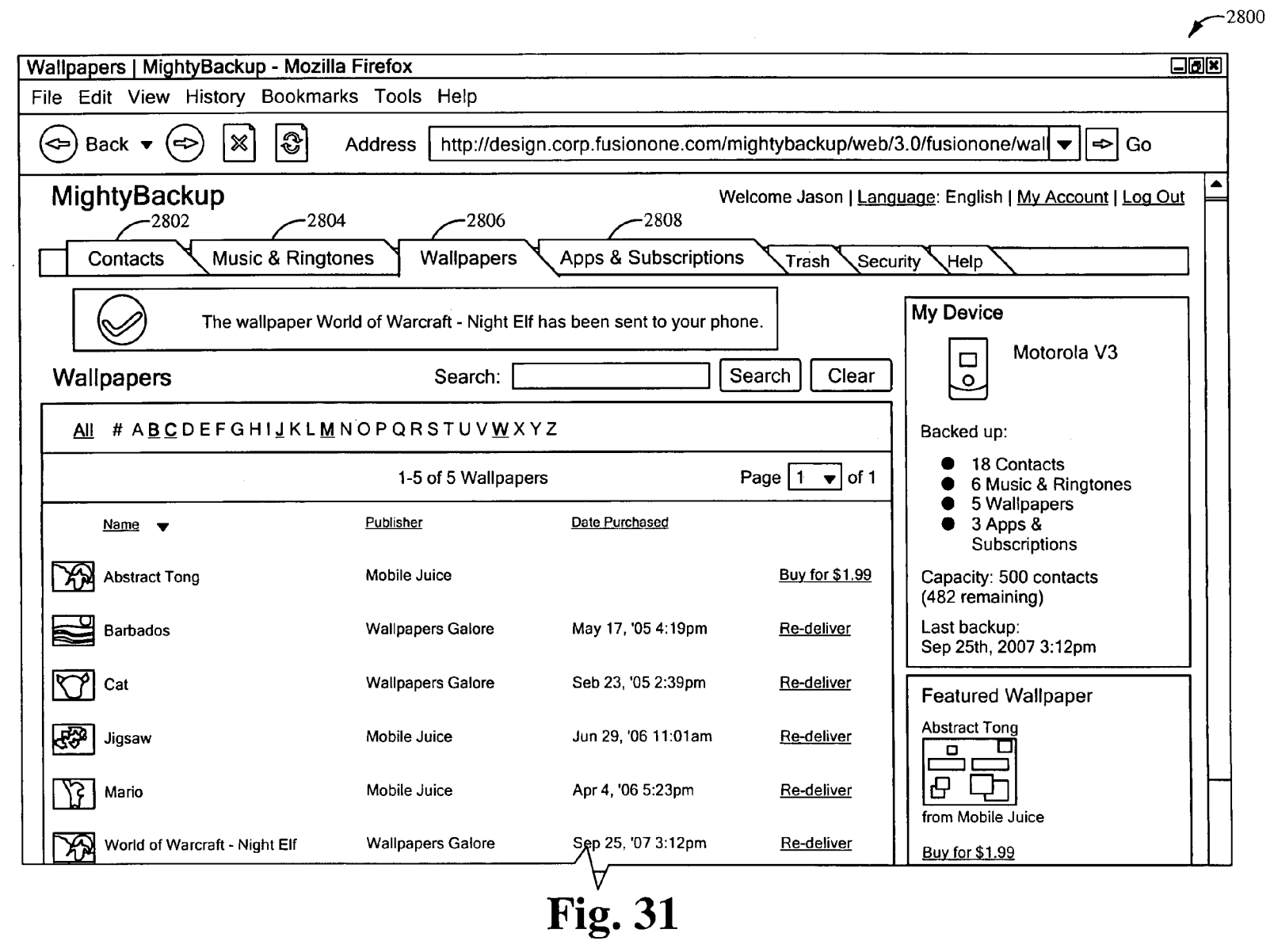

FIG. 30 illustrates the web page 2800 with the Wallpapers tab 2806 selected. Similar to the Music & Ringtones tab 2804, the Wallpapers tab 2806 shows items, in this case wallpaper images, which are either available for purchase or have been purchased and are available for re-delivery. FIG. 31 illustrates the web page 2800 with the Wallpapers tab 2806 selected and the "World of Warcraft—Night Elf" wallpaper purchased and now available for re-delivery.

Figure 32:
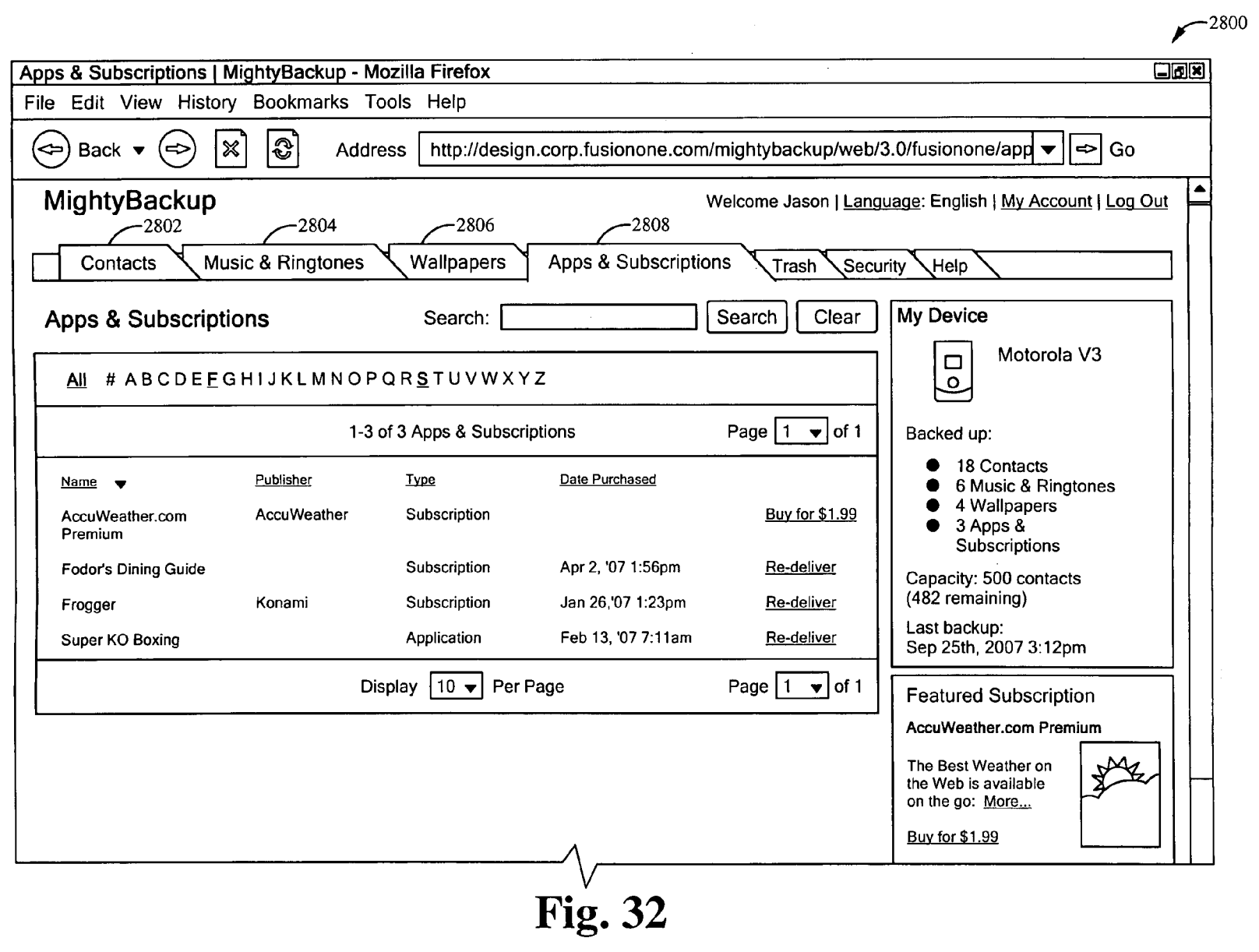
Figure 33:
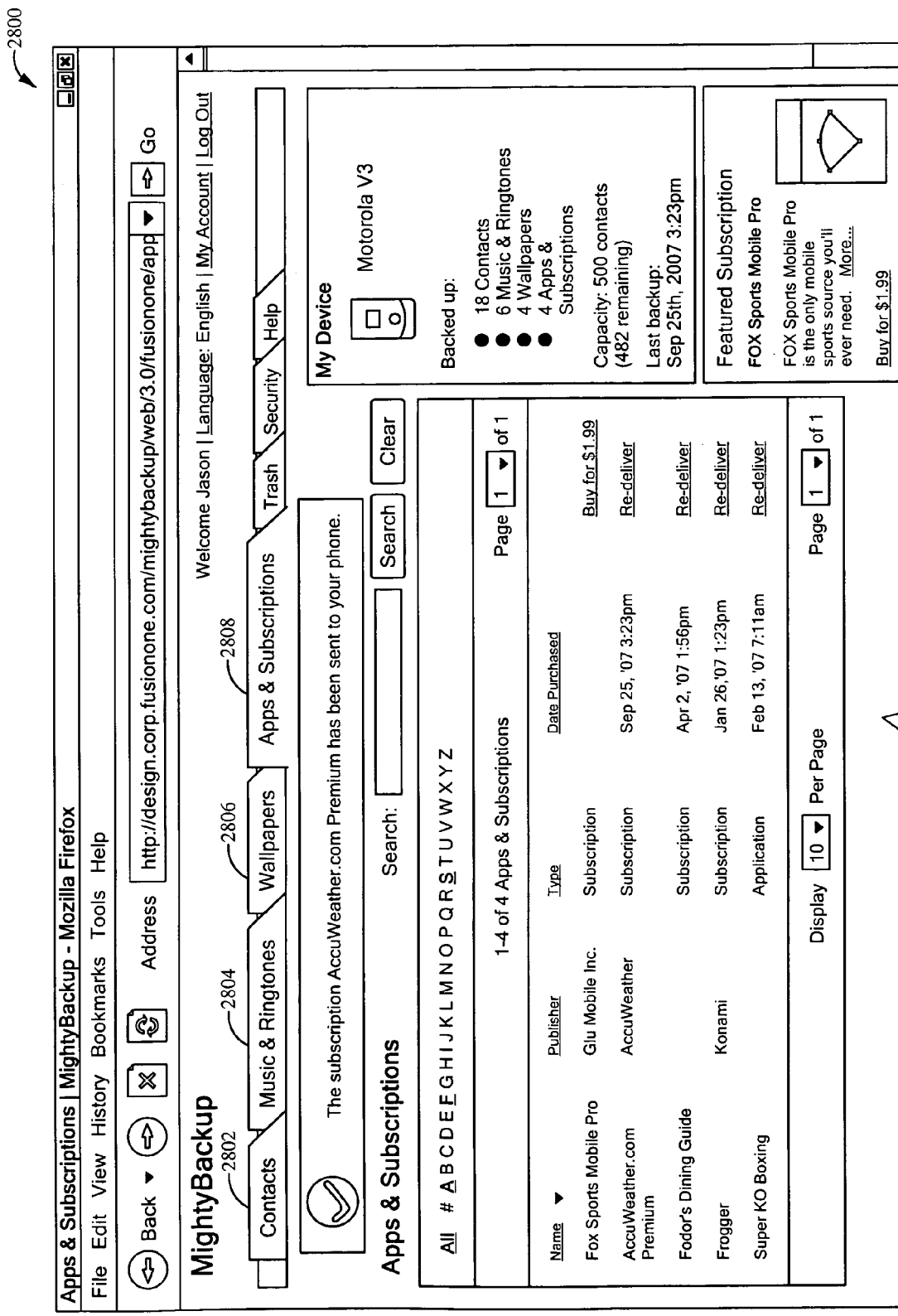

FIG. 32 illustrates the web page 2800 with the Applications & Subscriptions tab 2808 selected. Similar to the Music & Ringtones tab 2804, the Applications & Subscriptions tab 2808 shows items, in this case applications and subscriptions, which are either available for purchase or have been purchased and are available for re-delivery. FIG. 33 illustrates the web page 2800 with the Applications & Subscriptions tab 2808 selected and the "AccuWeather.com Premium" subscription purchased and now available for re-delivery.

Figure 34:
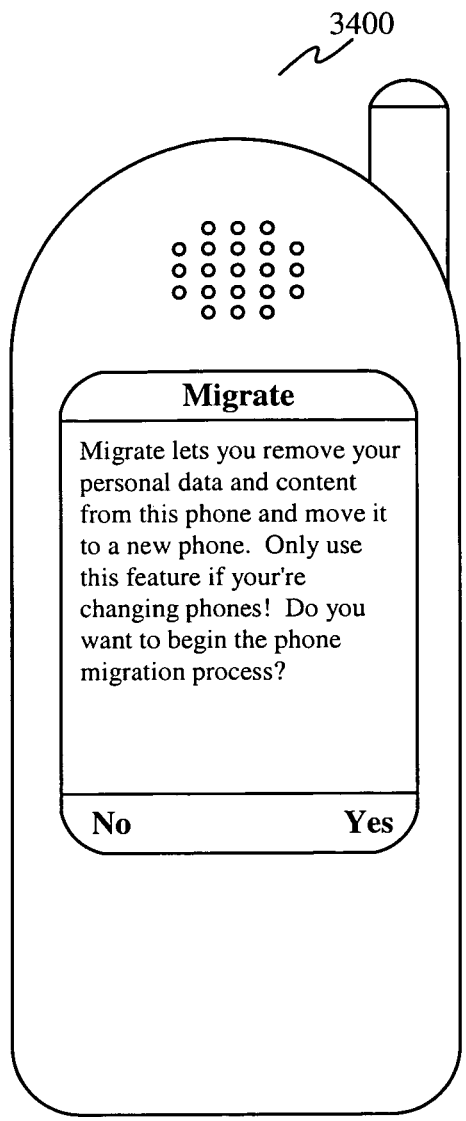
FIG. 34-45 illustrate mobile devices in accordance with embodiments of the present invention.

FIG. 34 illustrates a mobile device 3400. The mobile device 3400, as described above, is able to be utilized for many tasks. Additional tasks include migration, purging, restoring, installing and other tasks. For example, if a user chooses to migrate data, or remove personal data and content from one device and move it to another device, the user is able to respond to a migration query to begin the migration process.

Figure 35:
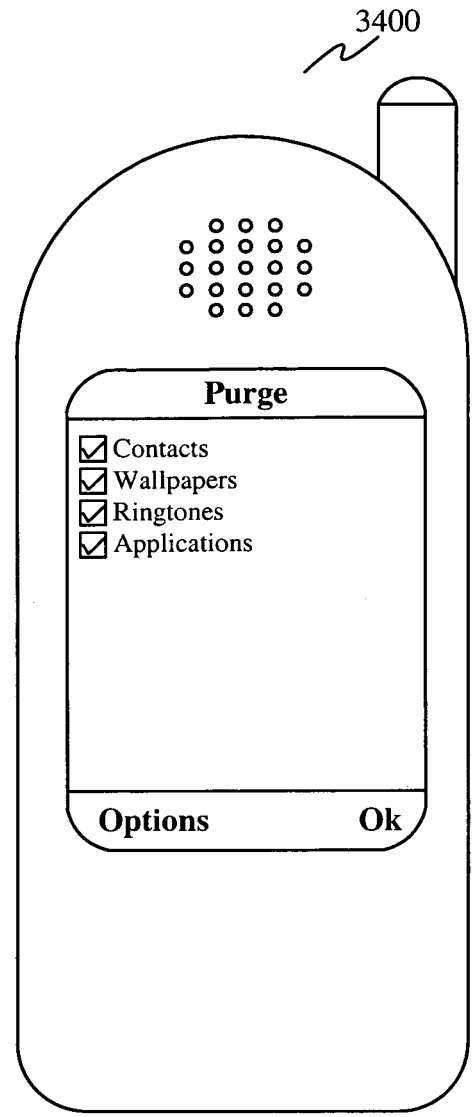
Figure 36:

FIG. 35 illustrates selections related to the purge operation on the mobile device 3400. In some embodiments, the purge operation is part of the migrate task. For example, if a company does not allow its licensed content to exist on two devices without purchasing two separate licenses, the company is able to require the user to purge the licensed content before installing it on the second device. When a user purges data from his mobile device, he is able to select which type of data/content is to be purged such as contacts, wallpapers, ringtones and applications. Additional data/content is able to be purged as well. In some embodiments, selecting migration automatically purges all user data. FIG. 36 illustrates the mobile device 3400 after a successful purge of the data/content and activation of the mobile device 3400.

Figure 37:
Figure 38:
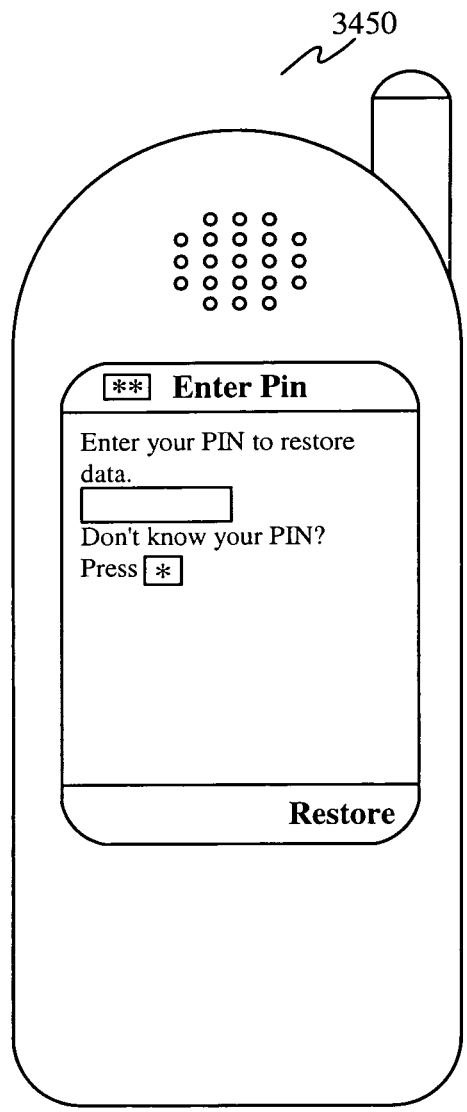
Figure 39:
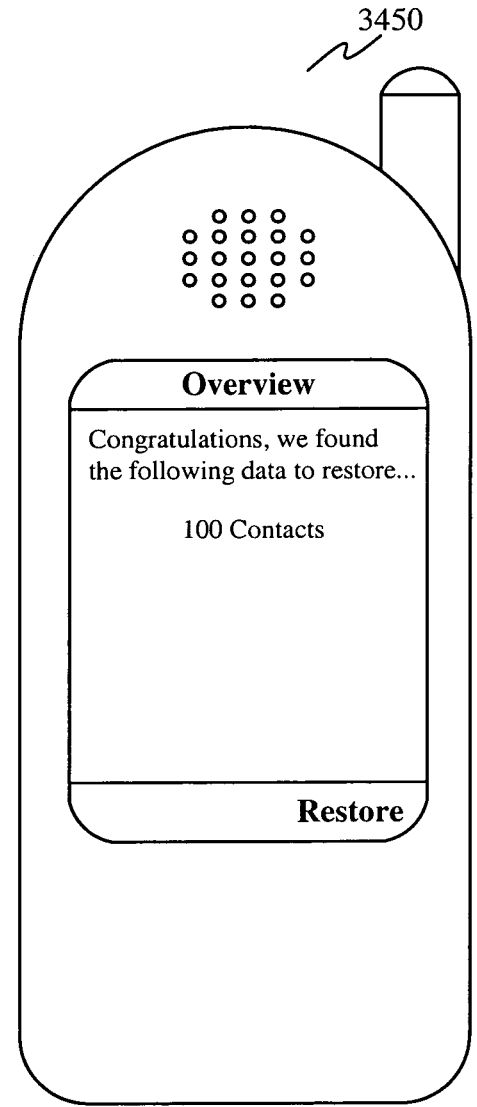

FIG. 37 illustrates initiating a restore process on a mobile device 3450. In some embodiments, a pin or password is required to be input to restore a user's data as shown in FIG. 38. FIG. 39 illustrates the restore operation in process on the mobile device 3450 with an example of 100 contacts found to be restored.

Figure 40:
Figure 41:
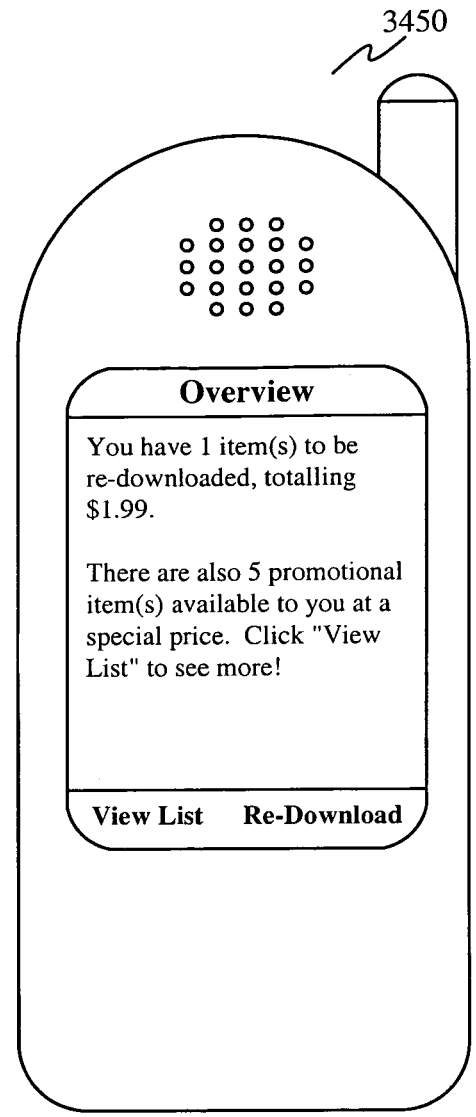
Figure 42:
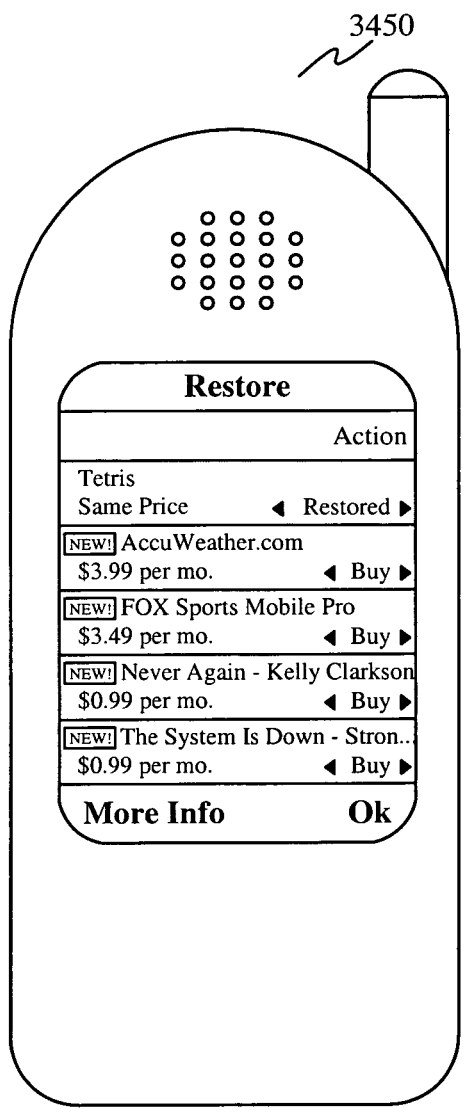
Figure 43:
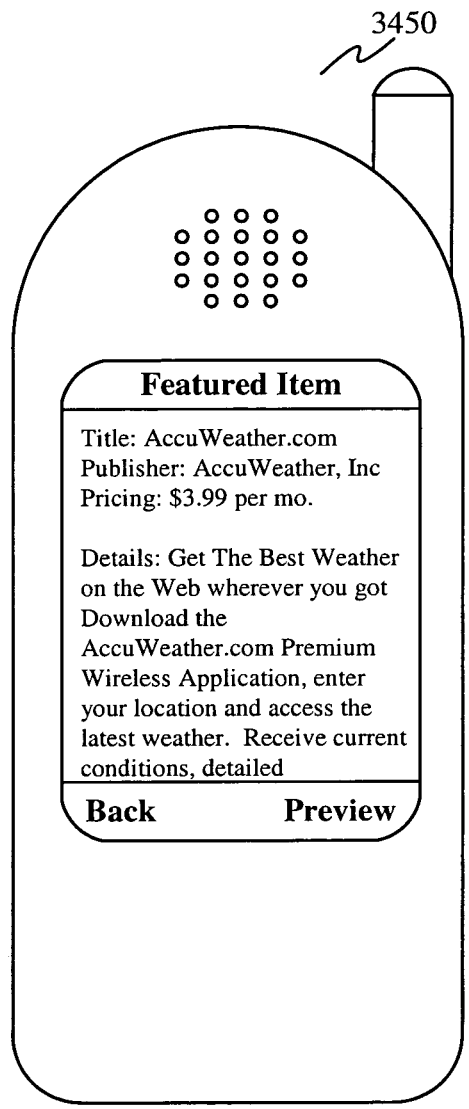
Figure 44:
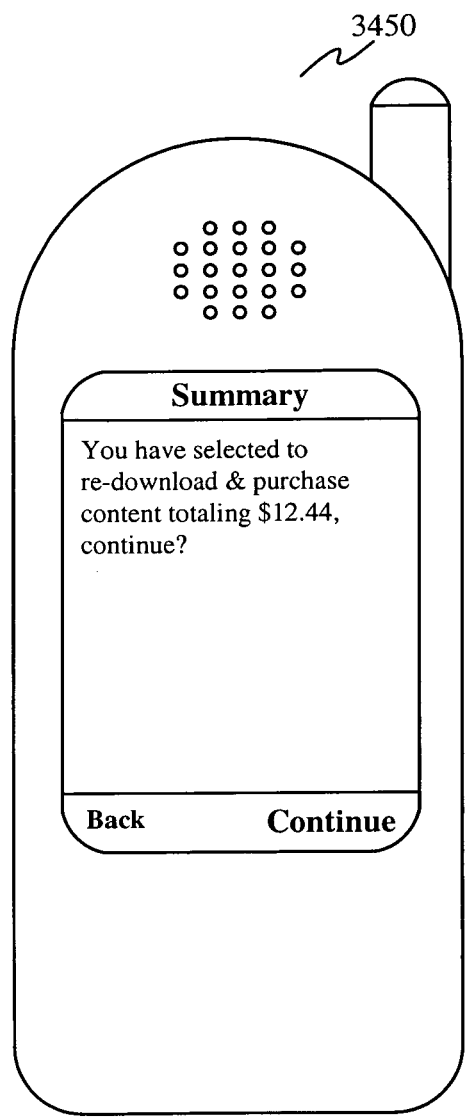
Figure 45:
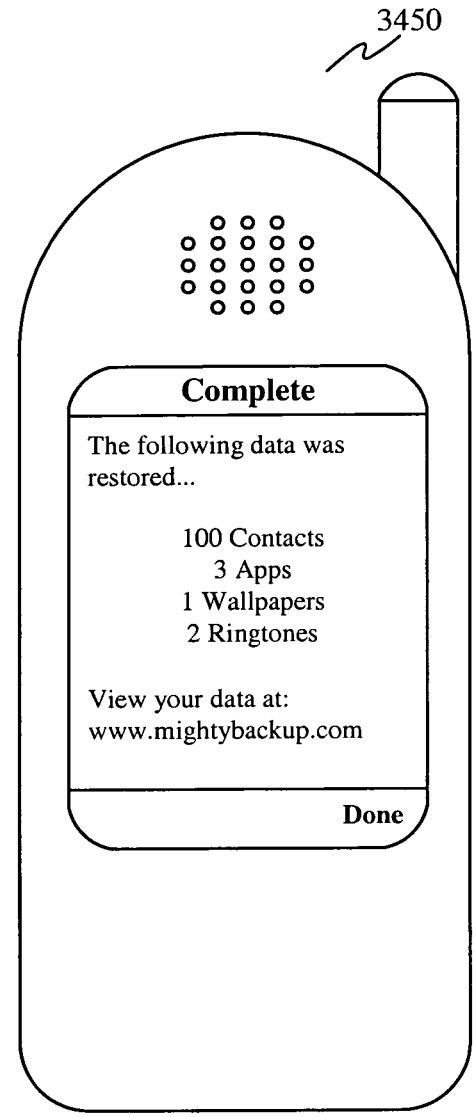

FIG. 40 illustrates promoting digital content on the mobile device 3450. For example, a notification is presented to the user regarding licensed content which is able to be repurchased at a standard cost, a reduced rate or free, depending on the content. FIG. 41 illustrates an example of an overview of items to be downloaded and promotional items available at a special price. FIG. 42 illustrates the list of items available. A featured item, as illustrated in FIG. 43, is able to be presented including additional details about the item. In some embodiments, a summary query is presented to a user to ensure the user understands the total cost of the content to be re-downloaded and/or purchased, as shown in FIG. 44. FIG. 45 illustrates a summary of the content restored. For example, a user's 100 contacts, 3 applications, 1 wallpaper and 2 ringtones are restored in FIG. 45.

FIG. 46 illustrates a web page 4600 presenting an exemplary migration portal. The exemplary migration portal includes several migration steps such as choosing a customer, choosing migration services, downloading/backup/purge, ESN change, downloading, confirming subscription price changes and restoring content. In FIG. 46, the step of choosing a customer is illustrated such that a customer enters in his customer number and selects the device type of the new device. FIG. 47 illustrates a web page 4700 where the migration portal is at the step of confirming subscription price changes, for example, price increases or decreases for applications.

To utilize the method of and system for promoting digital content, different approaches are able to be taken. In general, the digital content is promoted when a user changes from a first mobile device to a second mobile device where the second mobile device does not contain the digital content that was contained on the first mobile device. The user is able to be prompted whether he would like the digital content to be sent to the second mobile device. In some embodiments, the user is provided with a user interface to agree to receive the digital content on the second mobile device. Depending on the configuration, the user is charged full price, a discounted price or the digital content is sent free without an additional charge. Once the user accepts to receive the digital content, the appropriate data transfer occurs including re-acquiring the digital content from content providers, and ultimately the second device will receive the desired digital content. In some embodiments, the user is able to make selections of digital content to transfer on a mobile device and/or a computing device through a user interface.

In operation the method of and system for promoting digital content assists users in retaining their digital content when they change mobile devices. For example, after a few years using a first mobile device, a user purchases a second mobile device. When initializing the second mobile device, the user's contact information is ported to the second mobile device. In addition to the contact information, other digital content, including licensed digital content, is also able to be sent to the second mobile device in the appropriate manner. To ensure the licensed digital content is transferred properly, the user is able to select the digital content to be sent to the second mobile device. In some embodiments, additional content is able to promoted to a user based on relationship information.

It will be appreciated that while many of the examples included in this application refer to mobile phones and devices, other electronic devices are able to use embodiments of the present invention including, but not limited to, personal digital assistants and personal computers.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

We claim:

1. A method of promoting a purchase of digital content configured for a particular type of wireless device, comprising:
   a. the wireless device communicatively coupling with a server configured to perform restore operations;
   b. the server acquiring data to be restored on the wireless device by utilizing a list stored on the server containing location information of the data to be restored;
   c. the server validating licensing rights of the data to be restored; and
   d. based on the validation, the server:
      i. selecting a promotional offer associated with the data having validated licensing rights from a database of promotional offers configured to the particular wireless device type; and
      ii. offering digital content related to the promotional offer to a user during restoration of the data on the wireless device.

2. The method of claim 1 wherein the promoted digital content includes licensed digital content.

3. The method of claim 1 wherein the promoted digital content is offered on a mobile device.

4. The method of claim 1 wherein the promoted digital content is offered on a web site.

5. The method of claim 1 wherein promoting is performed after a new device purchase.

6. The method of claim 1 wherein the digital content includes at least one of an application, music, a ringtone, a video and an image.

7. The method of claim 1 wherein the promotional offer is selected based on a recommendation engine.

8. A method of acquiring promoted digital content configured for a particular type of wireless device, comprising:
   a. the wireless device communicatively coupling with a server configured to perform restore operations;
   b. the server acquiring data to be restored on the wireless device by utilizing a list stored on the server containing location information of the data to be restored;
   c. the server validating licensing rights of the data to be restored;
   d. based on the validation, displaying one or more content promotional offers to a user during restoration of data having validated licensing rights, wherein the one or more content promotional offers are associated with the data, wherein the data is to be restored on the wireless device;
   e. providing an interface allowing the user to select any of the one or more promotional offers; and
   f. responsive to the user selecting any of the one or more promotional offers, acquiring related content from one or more content datastores and associating the content with an account of the user.

9. The method of claim 8 wherein the promoted digital content includes licensed digital content.

10. The method of claim 8 wherein the digital content is immediately delivered to a mobile device of the user.

11. The method of claim 8 wherein the digital content is delivered to a mobile device of the user at a later time.

12. The method of claim 8 wherein the digital content includes at least one of an application, music, a ringtone, a video and an image.

13. The method of claim 8 wherein the promotional offers are based on a recommendation engine.

14. A method of promoting digital content to a user of a backup implementation during a restore operation of the backup implementation, comprising:
   a. the wireless device communicatively coupling with a server configured to perform restore operations;
   b. the server acquiring data to be restored on the wireless device by utilizing a list stored on the server containing location information of the data to be restored;
   c. the server validating licensing rights of the data to be restored;
   d. initiating a restore process;
   e. in relation to the restore process, determining one or more promotional offers of data having validated licensing rights to be made available to the user, wherein the one or more promotional offers are associated with the data, wherein the data is to be restored on a device;
   f. during the restore process, presenting the one or more promotional offers to the user; and
   g. presenting a user interface on the device allowing the user to choose promotional digital content to acquire.

15. The method of claim 14 wherein the digital content includes licensed digital content.

16. The method of claim 14 wherein the digital content includes at least one of an application, music, a ringtone, a video and an image.

17. The method of claim 14 wherein the promotional offers are based on a recommendation engine.

18. A method of promoting digital content to users of a synchronization implementation, comprising:
   a. a wireless device communicatively coupling with a server configured to perform restore operations;
   b. the server acquiring data to be restored on the wireless device by utilizing a list stored on the server containing location information of the data to be restored;
   c. the server validating licensing rights of the data to be restored;
   d. determining one or more items of digital content of data having validated licensing rights to offer a user, wherein the data is to be synchronized;
   e. on devices participating in the synchronization implementation, retrieving promotional offers from the synchronization implementation, wherein the promotional offers are associated with the data to be synchronized;
   f. displaying the promotional offers to the user and allowing the user to make a selection of content to acquire; and
   g. synchronizing the content to a device of the user.

19. The method of claim 18 wherein the digital content includes licensed digital content.

20. The method of claim 18 wherein the digital content includes at least one of an application, music, a ringtone, a video and an image.

21. The method of claim 18 wherein the promotional offers are based on a recommendation engine.

22. A device for promoting the purchase of digital content configured for a particular type of wireless device, comprising:
   a. a system for communicatively coupling with a server configured to perform restore operations;
   b. the server for acquiring data to be restored on the wireless device by utilizing a list stored on the server containing location information of the data to be restored;
   c. the server for validating licensing rights of the data to be restored;
   d. based on the validation, a first module for selecting a promotional offer from a database of promotional offers configured to the particular wireless device type, wherein the promotional offer is associated with data having validated licensing rights, wherein the data is to be restored; and
   e. a second module for offering digital content related to the promotional offer to a user during restoration of the data to the wireless device.

23. The device of claim 22 wherein the digital content includes licensed digital content.

24. The device of claim 22 wherein the digital content includes at least one of an application, music, a ringtone, a video and an image.

25. The device of claim 22 wherein the promotional offer is based on a recommendation engine.

26. The method of claim 1 wherein the data to be restored include applications.

27. The method of claim 1 wherein the data to be restored include a contact list.

28. The method of claim 1 wherein the promotional offer is indirectly related to a user of the wireless device.

* * * * *